(12) United States Patent
Dutta

(10) Patent No.: US 12,282,777 B2
(45) Date of Patent: Apr. 22, 2025

(54) PROGRAMMABLE CONTROL OF MICRO-OPERATIONS CACHE RESOURCES OF A PROCESSOR

(71) Applicant: NOKIA TECHNOLOGIES OY, Espoo (FI)

(72) Inventor: Pranjal Kumar Dutta, Sunnyvale, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 49 days.

(21) Appl. No.: 17/429,467

(22) PCT Filed: Feb. 13, 2019

(86) PCT No.: PCT/US2019/017856
§ 371 (c)(1),
(2) Date: Aug. 9, 2021

(87) PCT Pub. No.: WO2020/167303
PCT Pub. Date: Aug. 20, 2020

(65) Prior Publication Data
US 2022/0107810 A1 Apr. 7, 2022

(51) Int. Cl.
*G06F 9/38* (2018.01)
*G06F 9/30* (2018.01)

(52) U.S. Cl.
CPC ........ *G06F 9/3808* (2013.01); *G06F 9/30047* (2013.01); *G06F 9/30076* (2013.01); *G06F 9/30145* (2013.01); *G06F 9/3814* (2013.01)

(58) Field of Classification Search
CPC ...... G06F 9/28; G06F 9/3808; G06F 9/30076; G06F 9/3012; G06F 9/30189; G06F 9/342; G06F 9/30138
See application file for complete search history.

(56) References Cited

U.S. PATENT DOCUMENTS 5,630,083 A * 5/1997 Carbine .............. G06F 9/30145
  712/E9.072
8,473,724 B1 6/2013 Kenville et al.
(Continued)

FOREIGN PATENT DOCUMENTS

CN 1354852 A 6/2002
CN 103907089 A 7/2014

OTHER PUBLICATIONS

Rosner, Roni, Avi Mendelson, and Ronny Ronen. "Filtering techniques to improve trace-cache efficiency." In Proceedings 2001 International Conference on Parallel Architectures and Compilation Techniques, pp. 37-48. IEEE, 2001. (Year: 2001).*
(Continued)

*Primary Examiner* — Keith E Vicary
(74) *Attorney, Agent, or Firm* — Tong, Rea, Bentley & Kim, LLC

(57) ABSTRACT

Various example embodiments of a processor are presented. Various example embodiments of a processor may be configured to support split programmability of resources of a processor frontend of the processor. Various example embodiments of a processor are configured to support split programmability of resources of a processor frontend of the processor in a manner enabling assignment of split programmable resources of the frontend of the processor to control blocks of a program being executed by the processor. Various example embodiments of a processor are configured to support split programmability of micro-operations (UOPs) cache (UC) resources of the frontend of the processor (which may then be referred to as a split programmable (SP) UC (SP-UC), where it may be referred to as "split" since there are multiple UCs and may be referred to as "programmable" since selection of the active UC from the
(Continued)

set of multiple UCs is controllable by the program executed by the processor).

19 Claims, 25 Drawing Sheets

(56) References Cited

U.S. PATENT DOCUMENTS

| | | |
|---|---|---|
| 2002/0095553 A1 | 7/2002 | Mendelson et al. |
| 2008/0086597 A1 | 4/2008 | Davis et al. |
| 2015/0058602 A1* | 2/2015 | Wiencke ............... G06F 9/3873 712/220 |
| 2015/0186144 A1 | 7/2015 | Abdallah |
| 2020/0019406 A1* | 1/2020 | Kalamatianos ....... G06F 9/3824 |

OTHER PUBLICATIONS

Ramirez, Alex, J. Li Larriba-Pey, and Mateo Valero. "Trace cache redundancy: Red and blue traces." In Proceedings Sixth International Symposium on High-Performance Computer Architecture. HPCA-6 (Cat. No. PR00550), pp. 325-333. IEEE, 2000. (Year: 2000).*

International Search Report and Written Opinion mailed in corresponding PCT/US2019/017856 on Aug. 20, 2020, 12 pages.

Communication pursuant to Article 94(3) EPC, Application No. 19 707 988.2, Jun. 29, 2023, 5 pages.

Office Action received for corresponding Chinese Patent Application No. 201980091969.5, dated Jul. 12, 2024, 18 pages of Office Action, 3 pages of Search Report and 14 pages of translation, 35 pages total.

Baruch Solomon, Etc., Micro-Operation Cache: a Power Aware Frontend for Variable Instruction Length ISA, IEEE Transactions on Very Large Scale Integration (VLSI); vol. 11, No. 5, dated Oct. 2023, 11 pages.

EP Notice of Allowance, Application No. 19 707 988.2-1203, dated Jul. 10, 2024, 6 pages.

* cited by examiner

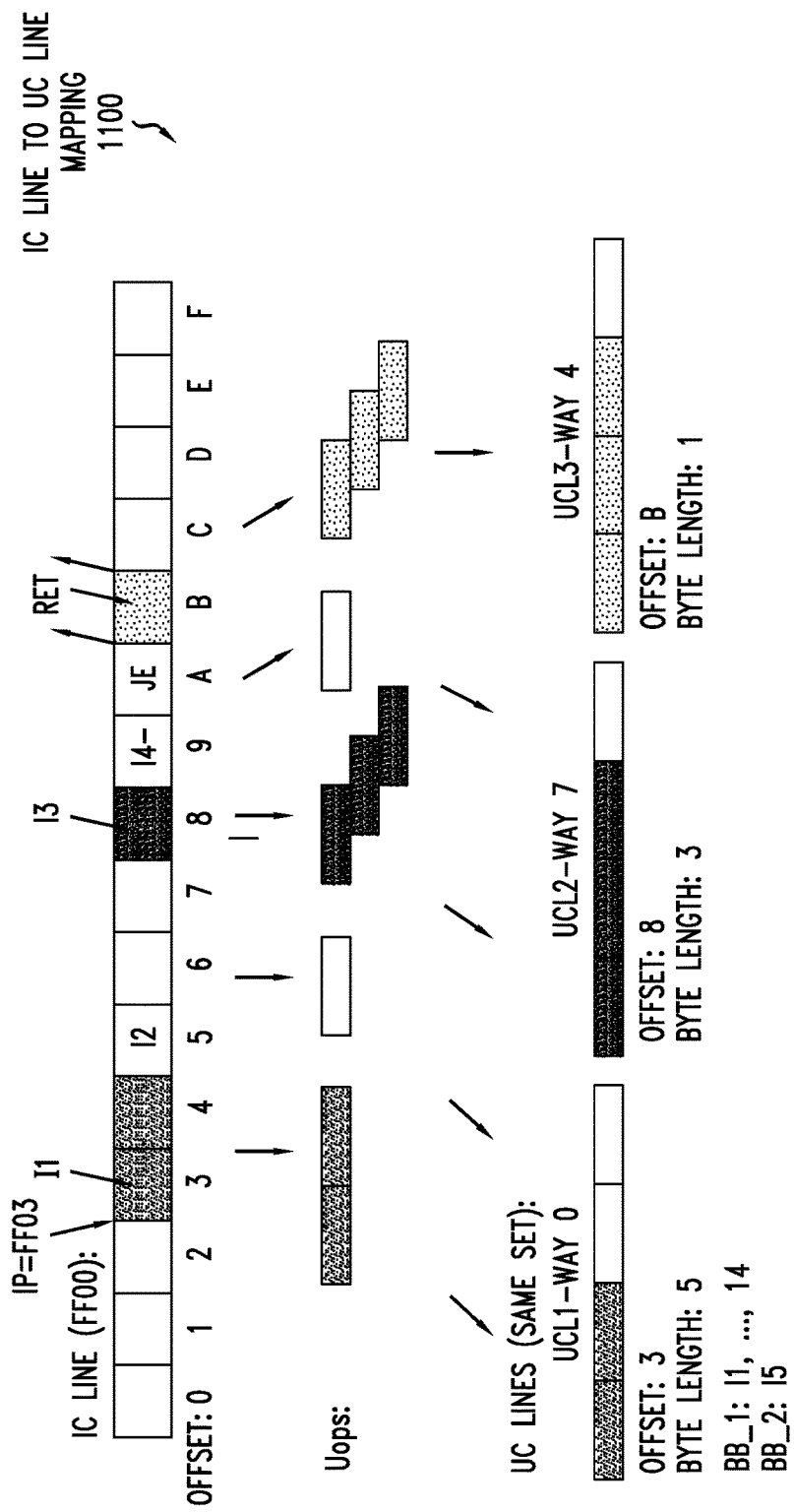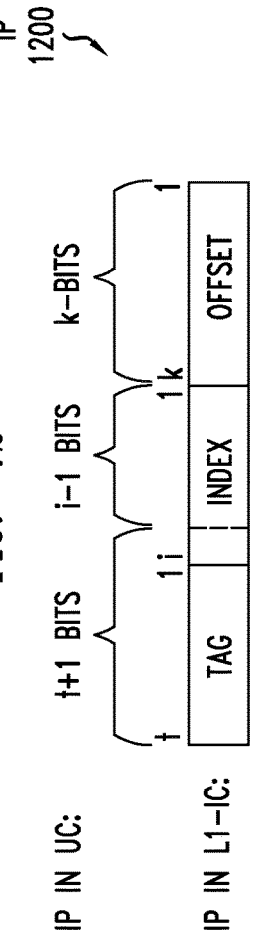

FIG. 19

COLOR SWITCH TYPE-1
INSTRUCTION
1900

| OPCODE | IMMEDIATE (COLOR INDEX) |
|---|---|
| 1-2-OR 3-BYTE OPCODE | 1-BYTE IMMEDIATE |

FIG. 20

X86 INSTRUCTION
SEQUENCE
2000

```
CLCHG 0
MOV RBP, RSP
SUB RSP, 8
MOV RSI, RDI
MOV RDI, RAX      } DECODED AND STORED IN UC-0
MOV qword [RBP-8], 0
MOV AL, 0
CLCHG 4
MOV RSI, 0
MOV RAX, RSI
ADD RSP, 8        } DECODED AND STORED IN UC-4
.....
```

FIG. 21

X86 INSTRUCTION SEQUENCE 2100

```
main:
        CLCHG 0           ⎫
        PUSH RAX          ⎪
        CCALL fact, 4     ⎬ DECODED AND STORED IN UC-0
        MOV RDI, RAX      ⎪
        RET               ⎭

; CALCULATE THE FACTORIAL OF RDI
fact:
        PUSH RBP                    ⎫
        MOV RBP, RSP                ⎪
        MOB RBX, qword [RBP+16]     ⎪
        CMP RBX, 1                  ⎪
        CJLE fact_set_1,2           ⎪
        MOV RCX, RBX                ⎪
        DEC RCX                     ⎬ DECODED AND STORED IN UC-4
        PUSH RCX                    ⎪
        CCALL fact, 4               ⎪
        MOV RBX, qword [RBP+16]     ⎪
        MUL RBX                     ⎪
        JMP fact_end                ⎭
fact_set_1:
        MOV RAX, 1        ⎫
        CLCHG 4           ⎬ DECODED AND STORED IN UC-2
fact_end:
        POP RBP           ⎫
        CRET 8, 0         ⎬ DECODED AND STORED IN UC-4
```

PROGRAMMABLE CONTROL OF MICRO-OPERATIONS CACHE RESOURCES OF A PROCESSOR

CROSS-REFERENCE TO RELATED APPLICATIONS

This application is based on and claims the benefit of International Patent Application No. EP2019/017856, PCT/US2019/017856, filed on Feb. 13, 2019, which is hereby incorporated herein by reference in its entirety.

TECHNICAL FIELD

Various example embodiments relate generally to processors, more particularly but not exclusively, to a processor cache for processors.

BACKGROUND

In general, processors may be based on various architectures and may be configured for various purposes. For example, one common type of processor is a central processing unit (CPU), which is a component within a computer that executes programs. When a CPU is contained on a single chip, it is often referred to as a microprocessor. Microprocessors may be based on various architectures, typically referred to as instruction set architectures (ISA), and may be configured for various purposes, such as general processing, network packet forwarding, graphics processing, and so forth.

SUMMARY

Various example embodiments of a processor may be configured to support programmability of processor frontend resources of the processor. In at least some example embodiments, a processor includes a backend, a frontend having frontend resources, and an instruction set architecture (ISA). The processor may be configured to execute a program. The frontend may be configured to decode instructions of the program to provide a set of micro-operations to the backend. The backend may be configured to receive the micro-operations from the frontend and execute the micro-operations. The ISA may be configured to support programmability of the set of frontend resources of the frontend by the program. The processor frontend resources may include micro-operations (UOPs) cache (UC) resources, branch prediction unit (BPU) resources, branch target buffer (BTB) resources, or the like, as well as various combinations thereof. In at least some embodiments, an apparatus may include a processor configured to support programmability of UC resources of the processor, where the processor includes a set of at least two micro-operation caches configured to store micro-operations decoded from instructions of a program to be executed by the processor. In at least some example embodiments, a non-transitory computer-readable storage medium stores instructions configured to cause a processor to decode, by a decoding block of the processor having at least two micro-operations caches, an instruction of a program to form a micro-operation and store the micro-operation in an active one of the micro-operations caches. In at least some example embodiments, a method includes decoding, by a decoding block of a processor having at least two micro-operations caches, an instruction of a program to form a micro-operation and storing the micro-operation in an active one of the micro-operations caches. In at least some example embodiments, an apparatus includes a processor including means for decoding, by a decoding block of the processor having at least two micro-operations caches, an instruction of a program to form a micro-operation and means for storing the micro-operation in an active one of the micro-operations caches. In at least some example embodiments, an apparatus includes means for decoding, by a decoding block of a processor having at least two micro-operations caches, an instruction of a program to form a micro-operation and means for storing the micro-operation in an active one of the micro-operations caches. In at least some embodiments, an apparatus may include a processor configured to support programmability of UC resources of the processor, where the processor includes an ISA configured to support programmability of a set of two or more micro-operations caches of the processor by a program executed by the processor. In at least some example embodiments, a non-transitory computer-readable storage medium stores instructions configured to cause a processor to execute a program including a set of instructions and support, by an ISA of the processor based on execution of the program, programmability of a set of two or more micro-operations caches of the processor. In at least some example embodiments, a method includes executing, by a processor, a program including a set of instructions and supporting, by an ISA of the processor based on execution of the program, programmability of a set of two or more micro-operations caches of the processor. In at least some example embodiments, an apparatus includes a processor including means for executing a program including a set of instructions and means for supporting, by an ISA of the processor based on execution of the program, programmability of a set of two or more micro-operations caches of the processor. In at least some example embodiments, an apparatus includes means for executing, by a processor, a program including a set of instruction and means for supporting, by an ISA of the processor based on execution of the program, programmability of a set of two or more micro-operations caches of the processor.

In at least some example embodiments, an apparatus includes a processor including a set of at least two micro-operation caches configured to store micro-operations decoded from instructions of a program to be executed by the processor. In at least some example embodiments, the processor is configured to activate, at any time during execution of the program by the processor, only micro-operations cache from the set of at least two micro-operations caches for storage of or access to micro-operations. In at least some example embodiments, the processor includes a set of instruction decoders, wherein, during decoding of one of the instructions of the program, the set of instruction decoders stores micro-operations to an active one of the micro-operations caches. In at least some example embodiments, the processor is configured to perform a lookup operation in an active one of the micro-operations caches while fetching an instruction pointer (IP) of an instruction of the program. In at least some example embodiments, the processor is configured to support selection of one of the micro-operations caches to be an active micro-operations cache based on a micro-operations cache switch instruction. In at least some example embodiments, the micro-operations cache switch instruction is an instruction configured exclusively for selection of one of the micro-operations caches to be the active micro-operations cache. In at least some example embodiments, the micro-operations cache switch instruction is an instruction configured to provide a program control function of the program and also configured to support selection of one of the micro-operations caches to be the active micro-operations cache. In at least some example embodiments, the micro-operations cache switch instruction is supported by ISA of the processor. In at least some example embodiments, the processor is configured to select a first one of the micro-operations caches as an active micro-operations cache, wherein the micro-operations cache switch instruction includes an identifier of a second one of the micro-operations caches, wherein decoding of the micro-operations cache switch instruction causes a switch of the active micro-operations cache from the first one of the micro-operations caches to the second one of the micro-operations caches. In at least some example embodiments, the processor is configured to decode a micro-operations cache switch instruction of the program to cause selection of a first one of the micro-operations caches as an active micro-operations cache, wherein micro-operations decoded from one or more subsequent instructions of the program are stored in the first one of the micro-operations caches until a next micro-operations cache switch instruction is decoded to change the active micro-operations cache to a second one of the micro-operations caches. In at least some example embodiments, the processor is configured to select a first one of the micro-operations caches as an active micro-operations cache, wherein the processor is configured to switch the active micro-operations cache to a second one of the micro-operations caches prior to decoding of a next instruction of the program that is associated with the second one of the micro-operations caches. In at least some example embodiments, the processor is configured to select a first one of the micro-operations caches as an active micro-operations cache, wherein the processor is configured to switch the active micro-operations cache to a second one of the micro-operations caches, based on a micro-operations cache switch instruction, prior to execution of a micro-operation decoded based on the micro-operations cache switch instruction. In at least some example embodiments, the processor is configured to perform the switch based on a determination that the micro-operations cache switch instruction exists in the first one of the micro-operations caches. In at least some example embodiments, the processor is configured to perform the switch during decoding and storing of the micro-operations cache switch instruction based on a determination that the micro-operations cache switch instruction does not exist in the first one of the micro-operations caches. In at least some example embodiments, the processor includes an ISA configured to support programmability of the set of micro-operations caches by the program. In at least some example embodiments, a non-transitory computer-readable storage medium stores instructions configured to cause a processor to decode, by a decoding block of the processor having at least two micro-operations caches, an instruction of a program to form a micro-operation and store the micro-operation in an active one of the micro-operations caches. In at least some example embodiments, a method includes decoding, by a decoding block of a processor having at least two micro-operations caches, an instruction of a program to form a micro-operation and storing the micro-operation in an active one of the micro-operations caches. In at least some example embodiments, an apparatus includes a processor including means for decoding, by a decoding block of the processor having at least two micro-operations caches, an instruction of a program to form a micro-operation and means for storing the micro-operation in an active one of the micro-operations caches. In at least some example embodiments, an apparatus includes means for decoding, by a decoding block of a processor having at least two micro-operations caches, an instruction of a program to form a micro-operation and means for storing the micro-operation in an active one of the micro-operations caches.

In at least some example embodiments, an apparatus includes a processor including an instruction set architecture (ISA) configured to support programmability of a set of two or more micro-operations caches of the processor by a program executed by the processor. In at least some example embodiments, to support programmability of the set of micro-operations caches by the program, the ISA is configured to support association of a control block of the program with one of the micro-operation caches. In at least some example embodiments, to support programmability of the set of micro-operations caches by the program, the ISA is configured to support sharing of one of the micro-operation caches by two or more control blocks of the program. In at least some example embodiments, the processor is configured to keep the two or more control blocks of the program spatially collocated in a program memory. In at least some example embodiments, the program includes a set of control blocks, wherein, to support programmability of the set of micro-operations caches by the program, the ISA is configured to support distribution by the program of the control blocks of the program across at least a portion of the micro-operation caches. In at least some example embodiments, to support programmability of the set of micro-operations caches by the program, the ISA is configured to support an instruction configured to switch an active one of the micro-operations caches. In at least some example embodiments, the instruction configured to switch the active one of the micro-operations caches includes a micro-cache identifier indicative of one of the micro-operations caches to be made the active one of the micro-operations caches. In at least some example embodiments, to support programmability of the set of micro-operations caches by the program, the ISA is configured to support an instruction type configured exclusively for selection of one of the micro-operations caches to be the active micro-operations cache. In at least some example embodiments, to support programmability of the set of micro-operations caches by the program, the ISA is configured to support an instruction type configured to provide a program control function of the program and also configured to support selection of one of the micro-operations caches to be the active micro-operations cache. In at least some example embodiments, to support programmability of the set of micro-operations caches by the program, the ISA is configured to support pinning of a control block of the program with one of the micro-operation caches such that micro-operations decoded based on instructions of the control block are accessed from or stored in the one of the micro-operations caches. In at least some example embodiments, first and second control blocks of the program are associated with respective first and second ones of the micro-operations caches, wherein the ISA is configured to support a micro-operations cache switch instruction which, when invoked by the program with an identifier of the second control block prior to transferring control from the first control block to the second control block, causes a switch of the active micro-operations cache from the first one of the micro-operations caches to the second one of the micro-operations caches. In at least some example embodiments, a non-transitory computer-readable storage medium stores instructions configured to cause a processor to execute a program including a set of instructions and support, by an ISA of the processor based on execution of the program, programmability of a set of two or more micro-operations caches of the processor. In at least some example embodiments, a method includes executing, by a processor, a program including a set of instructions and supporting, by an ISA of the processor based on execution of the program, programmability of a set of two or more micro-operations caches of the processor. In at least some example embodiments, an apparatus includes a processor including means for executing a program including a set of instructions and means for supporting, by an ISA of the processor based on execution of the program, programmability of a set of two or more micro-operations caches of the processor. In at least some example embodiments, an apparatus includes means for executing, by a processor, a program including a set of instruction and means for supporting, by an ISA of the processor based on execution of the program, programmability of a set of two or more micro-operations caches of the processor.

BRIEF DESCRIPTION OF THE DRAWINGS

The teachings herein can be readily understood by considering the following detailed description in conjunction with the accompanying drawings, in which:

FIG. 11 depicts an example embodiment of the structure of a UC line, with UOP slots configured to store UOPs, configured for use in the micro-operations cache of FIG. 10 and the construction of the UC lines after decoding the basic block in an IC line;

FIG. 12 depicts an example embodiment of the translation of the fields of an IP used to identify a basic block, within an IC line to the fields of the IP used by UC to store a UC line mapped from the basic block, configured for use in the micro-operations cache of FIG. 10;

FIG. 19 depicts an example embodiment of a "Color Switch Type-1" instruction implemented using the x86 instruction set architecture;

FIG. 20 depicts an example embodiment of an x86 instruction sequence that includes a "Color Switch Type-1" instruction;

FIG. 21 depicts an example embodiment of "Color Switch Type-2" instructions implemented using the x86 instruction set architecture;

To facilitate understanding, identical reference numerals have been used, where possible, to designate identical elements that are common to the figures.

DETAILED DESCRIPTION

Various example embodiments of a processor are presented. Various example embodiments of a processor are configured to support split programmability of resources of a processor frontend of the processor. Various example embodiments of a processor are configured to support split programmability of resources of a processor frontend of the processor in a manner enabling assignment of split programmable resources of the frontend of the processor to control blocks of a program being executed by the processor. Various example embodiments of a processor are configured to support split programmability of micro-operations (UOPs) cache (UC) resources of the frontend of the processor (which may then be referred to as a split programmable (SP) UC (SP-UC), where it may be referred to as "split" since there are multiple UCs and may be referred to as "programmable" since selection of the active UC from the set of multiple UCs is controllable by the program executed by the processor). Various example embodiments of a processor are configured to support split programmability of UC resources of the processor by providing a processor including a set of at least two UCs configured to store micro-operations decoded from instructions of a program to be executed by the processor. Various example embodiments of a processor are configured to support split programmability of UC resources of the processor by providing a processor including an instruction set architecture (ISA) configured to support programmability of a set of two or more UCs of the processor by a program executed by the processor. Various example embodiments of a processor are configured to support split programmability of UC resources of the processor by providing a processor including a set of at least two UCs configured to store micro-operations decoded from instructions of a program to be executed by the processor and an ISA configured to support programmability of the set of two or more UCs of the processor by the program executed by the processor. Various example embodiments of a processor are configured operation of the processor in, and associated switching of the processor between, a non-programmable mode of operation (e.g., in which the UC resources are not programmable) and a programmable mode of operation (e.g., in which the UC resources are programmable). Various example embodiments of a processor are configured to support split programmability of various other resource types of the frontend of the processor. It will be appreciated that these and various other example embodiments and advantages or potential advantages of such a processor and associated SP-UC may be further understood by way of reference to the various figures, which are discussed further below.

Figure 1:
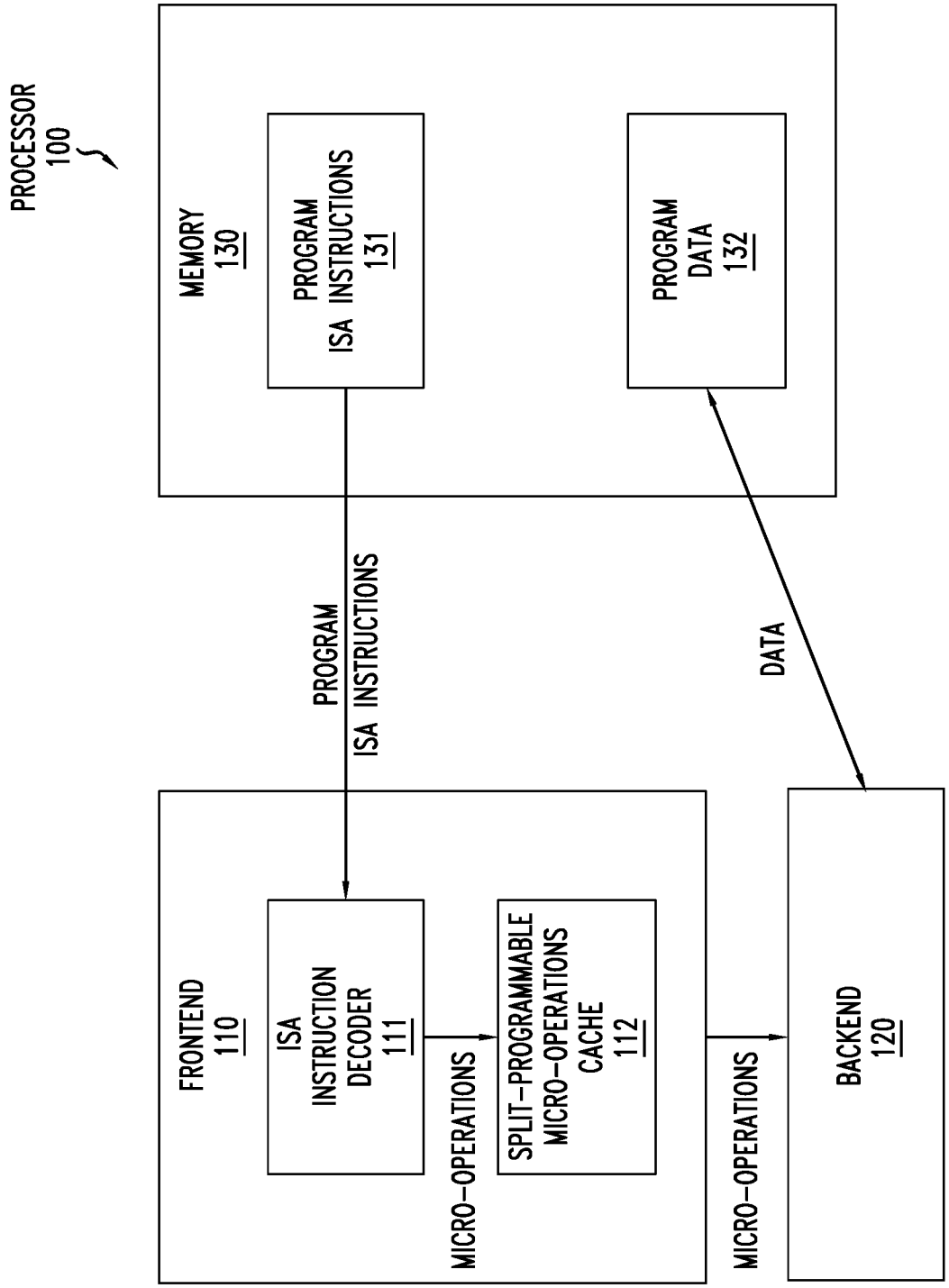
FIG. 1 depicts an example embodiment of a processor including a split programmable micro-operations cache.

FIG. 1 depicts an example embodiment of a processor including a split programmable micro-operations cache.

The processor 100 includes a frontend 110, a backend 120, and a memory 130. The frontend 110 includes an ISA instruction decoder 111 and an SP-UC 112 configured to support various functions as discussed herein. The memory 130 is configured to store program ISA instructions 131 and program data 132 for a program to be executed by processor 100. The operation of the processor 100 of FIG. 1 may be further understood by first considering various more general aspects of processors and associated processor architectures and micro-architectures.

In general, processors, such as processor 100, may be based on various architectures and may be configured for various purposes. For example, one common type of processor is a central processing unit (CPU), which is a component within a computer that executes programs. When a CPU is contained on a single chip, it is often referred to as a microprocessor. Microprocessors may be based on various architectures, typically referred to as ISAs and may be configured for various purposes, such as general processing, network packet processing, graphics processing, and so forth.

In general, a superscalar processor is the one that implements a form of parallelism called instruction-level parallelism within a processor core. A single-core processor has only one core, whereas a multi-core processor has multiple cores. It will be appreciated that the term "processor core" may be used herein to denote a core in either of these types of processors. In contrast to a core in a scalar processor that can execute at most one instruction per clock cycle, a core in a superscalar processor can execute more than one instruction during a clock cycle, typically by simultaneously dispatching multiple instructions to different execution units on the core. The processor core executes instructions in an order governed by the availability of input data and execution units, rather than by their original order in a program. In doing so, the processor core can avoid being idle while waiting for the preceding instruction to complete and can, in the meantime, process the next instructions that are able to run immediately and independently. This method of executing instructions, which is called "out-of-order" execution, allows for more throughput (e.g., the number of instructions that can be executed in a unit of time) than would otherwise be possible at a given clock rate. It will be appreciated that most superscalar processors follow out-of-order execution.

In general, ISA may be considered to be a model of a processor and is often referred to as the architecture of the processor. The ISA defines the supported data types, memory model and registers and their semantics (such as memory consistency and addressing modes for data operands), the instruction set, and the input/output model. Micro-architecture is the way a given ISA is implemented in a processor. The micro-architecture is composed of the building blocks and the electrical circuitry to implement the required logic of the building blocks. A given ISA may be implemented with different micro-architectures, which may vary in performance, physical size, cost, power consumption, and so forth. Thus, ISA serves as the interface between the program and the processor. A program that has been written for an ISA can be executed on different micro-architectures implementing the same ISA. This has enabled program compatibility between different generations of processors for a particular ISA to be easily achieved.

In general, instructions supported by processors may be structured in various ways. In some processors, for example, such as out-of-order superscalar processors, the instructions have variable lengths. Such instructions are capable of complex tasks that a single instruction may be broken down into multiple simpler tasks. These classes of processors are also known as Complex Instruction Set Computers (CISC). For example, an instruction can be an add-register-to-memory, which means "add the value in a register R1 with the value in a memory location M and then store back the result into the memory location M". Then this instruction is broken down into separate load values from memory M to a local register R2, the values in R1 and R2 are added and the result is stored in R2, and the value in R2 is stored to the memory location M. x86 is one such ISA which is implemented in processors available from various vendors. The length of x86 instructions can vary from 1B to 15B, where the simplest instructions can be encoded using one byte whereas instructions involving complex operations can be encoded using multiple bytes.

In general, CISC processors provide a number of advantages. For example, CISC processors may provide greater instruction density, which can improve the static size of the program (e.g., the amount of storage used for a given program). This is particularly important for embedded systems, since it can be a large fraction of the system cost and can influence the physical size of the system (which has impact on fitness for purpose and manufacturing cost). For example, CISC processors also may improve the dynamic size of the code (i.e., the set of instructions in the program that is executed by the processor) and reduce the amount of bandwidth used to fetch the instructions (both from memory and from cache). This can reduce cost and energy use and can improve performance. Smaller dynamic code size also reduces the size of caches for a given hit rate; smaller caches can use less energy and less chip area and can have lower access latency. For example, in CISC processors, with variable length instructions, large constants can be encoded in the instructions. Using an encoded constant, rather than loading a constant from data memory, exploits spatial locality, provides the value earlier for execution, avoids an extra instruction, and removes a data cache access. In other words, a wider access at one shot is simpler than multiple accesses of the same total size. For example, in CISC processors, extending the ISA is generally easier given support for variable length instructions and additional information can be included by using extra-long instructions.

The use of variable length instructions of an ISA, as discussed above, may provide a number of advantages. The micro-architecture of a processor, however, typically cannot execute the variable length instructions of an ISA in their native form. At the micro-architectural level of the processor, instructions are represented by fixed-length simpler micro-operations (e.g., typically referred to as "micro-ops" and abbreviated as "OPs" or "UOPs"). Variable length instructions are broken down into sequences of fixed-length UOPs. UOPs perform basic operations on data stored in one or more registers, including transferring data between registers or between registers and external buses, and performing arithmetic and logical operations on registers. For example, the add-register-to-memory instruction described previously is broken down into a sequence of separate load, add, and store UOPs. Instructions are dynamically decoded by the frontend of the processor to UOPs. After decoding to UOPs, the backend of the processor issues and executes the UOPs. This dynamic decoding also provides a cleaner separation of the "stable" and "standardized" ISA (e.g., x86) from the underlying micro-architecture of the processor that can define its own UOP set. For example, Haswell and Skylake are two different micro-architectures from Intel that support the X86 ISA, but each can define their own native UOP set. These architectures enjoy the dual benefits of a versatile backward compatible CISC frontend and a simple cost-effective backend. Moreover, the additional level of indirection enables seamless optimization of the internal UOPs, under the covers, without any change to the programmer interface. It will be appreciated that, unless indicated otherwise herein, the term "instructions" referred to variable length instructions of an ISA supported by a processor (e.g., x86). It is noted that the decoding of instructions to UOPs is not limited to ISA with variable length instructions alone, but is also applicable to ISAs that support fixed length simpler instructions. These classes of processors are known as Reduced Instruction Set Computers (RISC). Examples of such ISAs are MIPS, ARM etc.

In an out-of-order superscalar processor, an instruction typically goes through multiple stages in order to be executed. The stages are referred to as the pipeline of the processor. The first part of the pipeline of the processor is responsible for fetching instructions from an instruction store (illustratively, ISA program instructions 131 from memory 130 of processor 100). The stages from fetching of instructions until dynamic decoding of the instructions to form UOPs are referred to as the "frontend" of the processor (illustratively, frontend 110 of processor 100). The remaining stages in the pipeline of the processor (e.g., renaming, execution, and retire), that process in units of UOPs provided by the frontend, are referred to as the "backend" of the processor (illustratively, backend 120 of processor 100). It is noted that the backend of an out-of-order superscalar processor can execute multiple UOPs per clock cycle and, thus, that an efficient frontend of an out-of-order superscalar processor (e.g., the efficiency of decoding the instructions to UOPs and its adequate supply to the backend with low latency and high bandwidth) may improve the overall performance of the processor.

Based on the foregoing, the operation of processor 100 in executing a program is now further described. The frontend 110 reads the program ISA instructions of the program (which are based on the ISA supported by processor 100) from the memory 130. The ISA instruction decoder 111 of frontend 110 receives the program ISA instructions 131, decodes the program ISA instructions 131 to form a set of UOPs, and stores the UOPs in SP-UC 112. The frontend 110 provides the UOPs to the backend 120. The backend 120 receives the UOPs from the frontend 110 and executes the UOPs to provide the functions requested by the program ISA instructions 131 of the program to be executed by the processor 100. The ISA of the processor 100 is configured to provide programmable control over the SP-UC resources in the SP-UC 112 of the frontend 110 and, thus, over delivery of UOPs from the frontend 110 to the backend 120 for processing by the backend 120 to provide the functions requested by the program ISA instructions 131 of the program to be executed by the processor 100.

Figure 2:
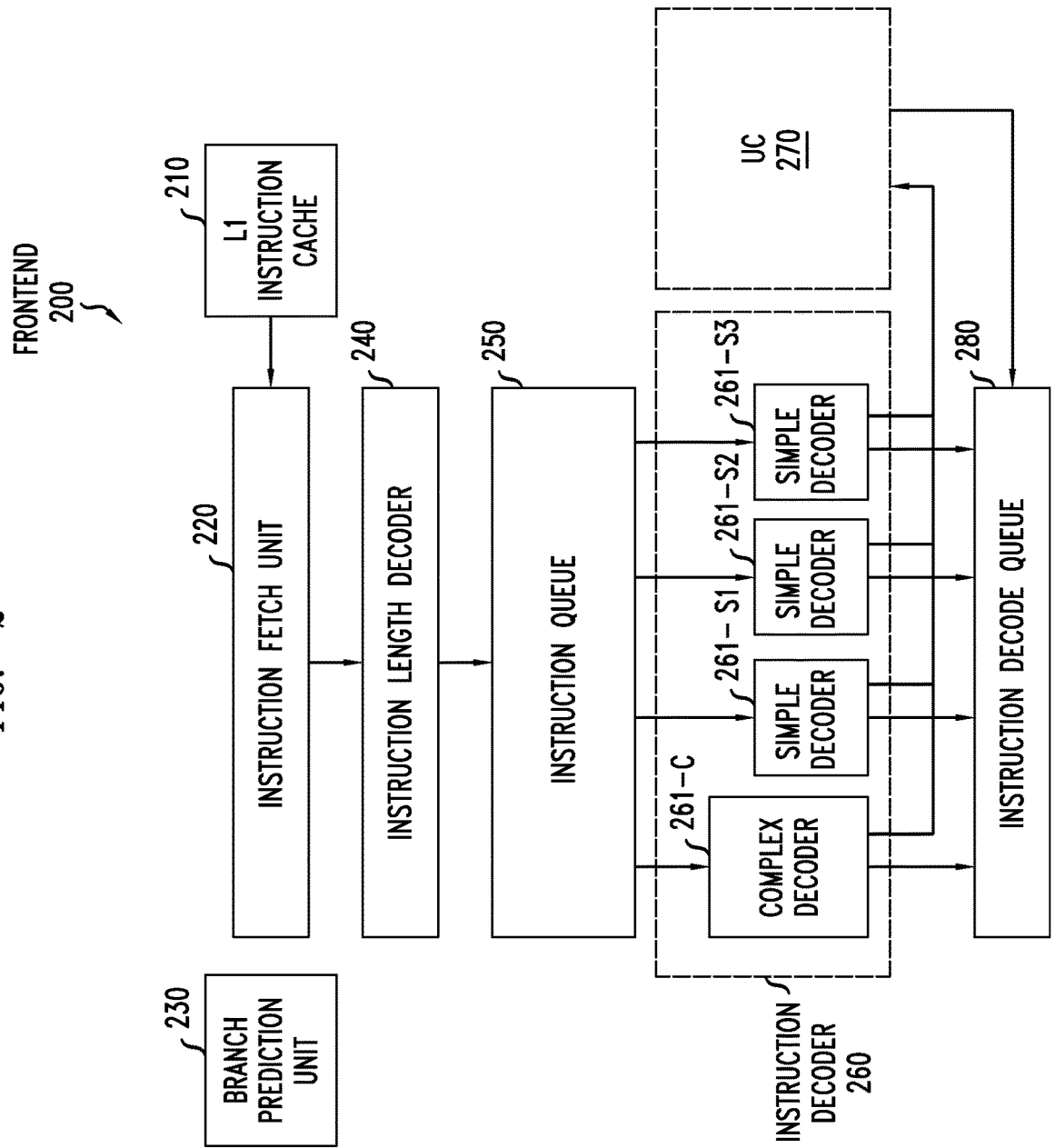
FIG. 2 depicts an example embodiment of a frontend of a processor capable of supporting split programmability of processor frontend resources.

It will be appreciated that the operation of the processor 100, based on use of the ISA of the processor 100 is configured to provide programmable control over the SP-UC resources in the SP-UC 112 of the frontend 110 of the processor 100, may be further understood by way of reference to FIG. 2.

FIG. 2 depicts an example embodiment of a frontend of a processor capable of supporting split programmability of processor frontend resources. It will be appreciated that the frontend 200 of FIG. 2 may be used as frontend 110 of processor 100 of FIG. 1.

The frontend 200 of FIG. 2 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decoder queue (IDQ) 280.

The L1-IC 210 is part of the cache hierarchy of the associated processor and may be further understood by considering the cache hierarchy processors more generally. In general, a cache is a smaller, faster memory, closer to a processor, which stores copies of the program data or program instructions from frequently used memory locations to reduce the average cost of access (time or energy). The data or program instructions are stored in the cache by blocks of contiguous memory locations, typically referred to as cache lines, wherein each cache line is indexed in the cache by the first memory address in the cache line. Caches benefit from the temporal and spatial locality of memory access patterns in a program, where spatial locality refers to use of relatively close memory locations (i.e., within a cache line) and temporal locality refers to the reuse of specific cache line within a relatively small time duration. Many processors use multiple levels of caches. For example, a common processor architecture might utilize at least three levels (L) of caches, which are typically referred to as L1, L2, and L3. The L1 cache is the smallest and nearest to the processor and, thus, faster than the other cache levels. Typically, the L1 cache is split into two portions: the L1 Instruction Cache (e.g. 32 KB is size, although other sizes may be used) which holds only program instructions and the L1 Data Cache (e.g., 32 KB in size, although other sizes may be used) which holds only program data. The L2 cache (e.g., 256 KB in size, although other sizes may be used) and the L3 cache (e.g., 2 MB in size, although other sizes may be used) are the subsequent levels which are usually unified caches (meaning that they hold both instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor looks up in subsequent levels of caches (e.g., L2 cache, then L3 cache, and so forth). If the memory address is missing in all of the available cache levels, then the processor can access the main memory to retrieve the instruction or data at the memory address. So main memory is accessed only if the memory address is missing in all caches. The missing block, once located, is brought into a cache line in the L1 cache.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220, because otherwise branch instructions (including conditional branches, jumps, subroutine calls and subroutine returns, and so forth) introduce a significant extra level of complexity in fetching streams of instructions, since the correct fetch address cannot be calculated until the branch instruction itself is executed. In general, there are two parts in this prediction. The first part is predicting the direction of the branch, i.e., taken or not taken. The second part is predicting the target address of a branch for the predicted direction.

The ILD 240 provides a pre-decode phase. The ILD 240 separates the raw byte stream from IFU 220 into a sequence of valid instructions and passes them to the IQ 250. For example, as indicated above, the length of an x86 instruction may vary between 1B to 15B and may reside in any byte address in program memory, thus, requiring segregation of the raw byte stream into instructions of variable lengths Decoding the length of several instructions per cycle adds a level of complexity, since the start addresses have to be speculatively determined. That is, the fact that the starting address of the second instruction is not known until the first instruction is decoded and its length computed, imposes serialization of the length decoding process, and parallelizing this requires determining the length of each instruction before decoding it. The ILD 240 provides complex logic, based on many parallel and speculative computations, to help achieve such parallelization (although this comes at the price of increased power consumption). It is noted that a RISC processor may not employ ILD 240, since the length of the instructions are fixed and, hence, an instruction will start at a fixed memory boundary.

The IQ 250 queues the instructions for the instructions decode phase. The IQ 250 queues the instructions, after the ILD 240 separates the instructions from the stream of raw bytes, for use by ID 260 in the instructions decode phase.

The ID 260 provides the instructions decode phase (which also may be referred to as a dynamic translation phase). In this phase, instructions are read from the IQ 205 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). The ID 260, including the set of decoders 261, also may be referred to as a Micro Instruction Translation Engine (MITE). The resultant UOPs are passed by the ID 260 to the IDQ 280, through which the UOPs may then enter the backend of the processor. For example, in an x86-based processor, simple instructions can translate into 1-4 UOPs and complex instructions can translate into 5 or more UOPs. It will be appreciated that for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a hit) in the L0-IC, then the associated UOPs are directly supplied to the IDQ 280 for further execution, thereby completely avoiding the L1-IC→IFU→ILD→MITE decoding path. If the corresponding UC line does not exist (meaning a miss) in the L0-IC, then the instruction goes through entire complex decoding cycle through the L1-IC→IFU→ILD→MITE decoding path. The ability to avoid the L1-IC→IFU→ILD→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a superscalar processor can execute several UOPs per clock cycle (e.g., 6 UOPs per cycle), the rate at which UOPs are supplied from the frontend of the processor to the backend of the processor is a key element of performance which may be achieved by high hit rate in the UC 270. The UC 270 may be implemented within the frontend 200 using a single UC (e.g., embodiments of which are presented with respect to FIGS. 3-16) or may be implemented within the frontend 200 as a split-programmable UC (SP-UC) including a set of multiple UCs (e.g., embodiments of which are presented with respect to FIGS. 17-31).

The IDQ 280 queues UOPs to be provided to the backend of the processor. The UOPs that are queued by the IDQ 280 may include UOPs decoded by the ID 260 (MITE) and UOPs delivered from the UC 270.

The frontend 200, as indicated above, is configured to support split programmability of various resource types of the frontend 200, including UC resources of UC 270. It will be appreciated that the operation of frontend 200 using split programmability of UC resources (e.g., as presented with respect to FIGS. 17-31) may be further understood by first considering the operation of frontend 200 using a single UC (e.g., as presented with respect to FIGS. 3-16).

Figure 3:
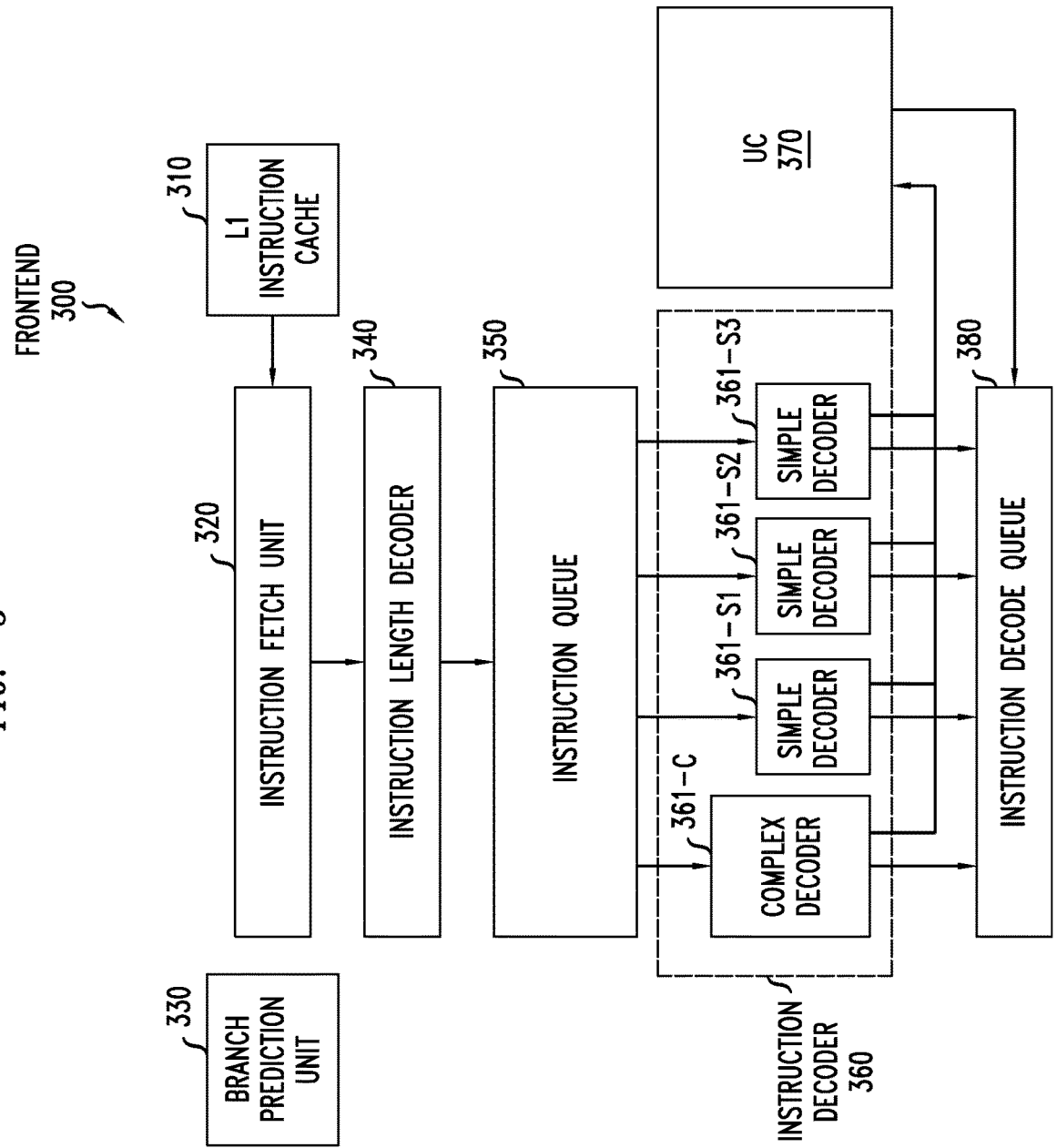
FIG. 3 depicts an example embodiment of a frontend of a processor capable of supporting split programmability and operating a single micro-operations cache.

FIG. 3 depicts an example embodiment of a frontend of a processor capable of supporting split programmability and operating a single micro-operations cache.

The frontend 300 of FIG. 3 includes an L1-IC 310, an IFU 320, a BPU 330, an ILD 340, an IQ 350, an ID 360, a UC 370 (which is a single UC and, thus, is not split programmable), and an IDQ 380. It will be appreciated that, in general, the operation of the components of frontend 300 of FIG. 3, unless indicated otherwise, may be similar to the operation of the corresponding components of frontend 200 of FIG. 2, respectively.

The frontend 300, as indicated above, is configured to support split programmability of various resource types of the frontend 200, but supports only a single UC (illustratively, UC 370). It will be appreciated that the operation of frontend 300 using split programmability of UC resources (e.g., as presented with respect to FIGS. 17-31) may be further understood by first considering the operation of L1-IC 310 (as presented with respect to FIGS. 4-5), the operation of single UC 370 (as presented with respect to FIGS. 6-12), and the use of a processor based on operation of L1-IC 310 as presented with respect to FIGS. 4-5 and operation of single UC 370 as presented with respect to FIGS. 6-12 to support execution of a program (as presented with respect to FIGS. 13-16).

Figure 4:
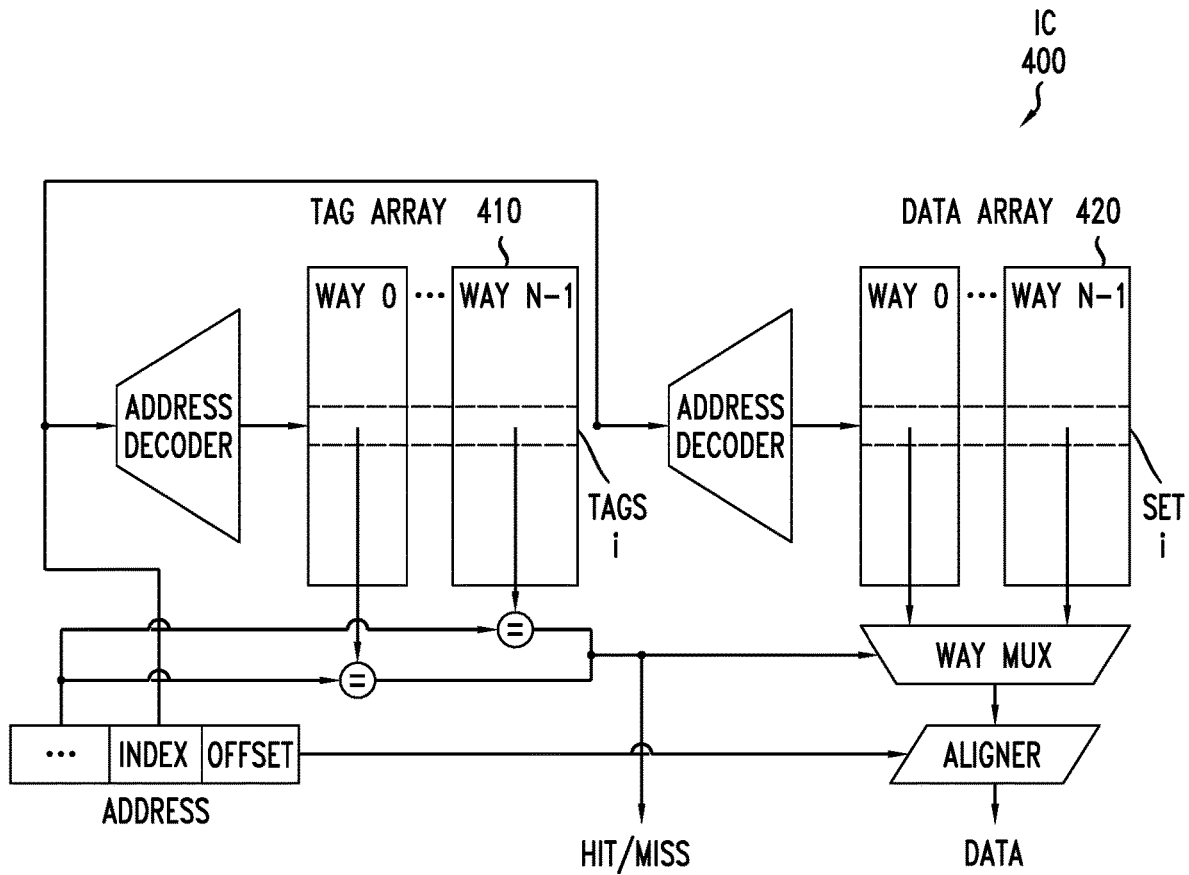
FIG. 4 depicts an example embodiment of a logical organization of an instruction cache (IC) of a frontend of a processor.
Figure 5:
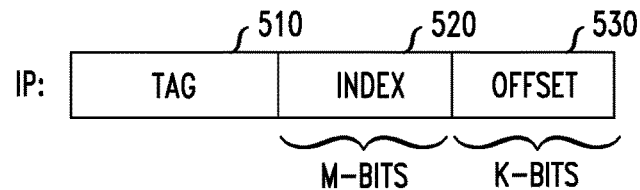
FIG. 5 depicts an example embodiment of a partitioning of an instruction pointer (IP) for mapping blocks of instructions from memory into an IC of a frontend of a processor.

As discussed further herein with respect to FIGS. 4 and 5, the micro-architecture of the L1-IC of the frontend of the processor (e.g., L1-IC 310 of frontend 300 of FIG. 3) may have partial implications on the design considerations on the UC (e.g., UC 370 of frontend 300 of FIG. 3).

In general, a cache that stores program instructions is known as an Instruction Cache (IC) and an address in instruction memory is known as an Instruction Pointer (IP). An IC stores blocks of raw bytes from instruction memory in units of "IC lines". It will be appreciated that the instructions are not yet decoded when they enter the IC, so the IC generally does not have an understanding of instructions. It also will be appreciated that, since instruction may start in any byte location, an instruction may be partially stored in an IC line and, thus, also may spill over into another IC line. In an IC, an IC line is identified by its IP, which is the IP of the first byte in the stored block. The logical organization of an IC is depicted in FIG. 4 and the partitioning of an IP for an IC is depicted in FIG. 5.

As depicted in FIG. 4, an IC 400 includes two main building blocks: a tag array 410 and a data array 420. The data array 420 stores the IC lines, while the tag array 410 is used in order to match IPs into data array entries. The data array 420 is logically organized as a group of S number of sets where each set includes N number of IC lines. The number of IC lines in a set is called the "degree of associativity" of the IC. It also may be said that a cache of associativity N is a N-way associative cache, wherein each way is an IC line. A block is first mapped into a set Si by its IP and then placed into any IC line Nj in the set Si. In order to map a block into IC 400, the IP is partitioned into three fields as depicted in FIG. 5.

As depicted in FIG. 5, an IP 500 is partitioned into an IP-tag field 510, an IP-index field 520, and an IP-offset field 530. The K least significant bits of the IP 500 are used to identify which bytes inside a IC line are to be accessed. This part of the address is called the block offset. Assuming that the size of an IC line is Q bytes, then $K=\log_2(Q)$ bits in the offset field. As indicated in FIG. 4, these K bits are denoted herein as the IP-offset (indicated by IP-offset field 530). The next part of the IP 500 is called the index. As denoted by the name, the index is used to identify the set Si in the IC. For an IC consisting of S sets, $M=\log_2(S)$ bits are used in index field. As indicated in FIG. 5, these M bits are denoted herein as the IP-index (indicated by IP-index field 520). The remaining bits of the IP 500 are the tag field. As indicated in FIG. 5, these M bits are denoted herein as the IP-tag (indicated by IP-tag field 510).

Referring now to FIGS. 4 and 5, it is noted that, since different IC lines can map to the same set Si in the IC 400 (they have the same IP-index due to overlapping M bits), a mechanism may be used to reverse-map IP-indexes to IPs. The tag array 410 serves this purpose. The tag array 410 has the same logical organization as the data array 420 (same number of sets S and associativity N). For each IC line in the data array 420, the corresponding position in tag array 410 holds some metadata: the IP-tag bits and the state of the IC line (valid, etc.).

Referring again to FIGS. 4 and 5, a lookup of an IP 500 in IC 400 may be performed as follows. To lookup an IP, a set Si in both the data array 420 and the tag array 410 is accessed using the IP-index part; however, to know if an IC line within the set corresponds to the given IP, the IP-tag bits generally need to match to an entry in set Si in tag array 410. If the IP-tag bits of the j-th entry in set Si match, then the correct data is in the j-th IC line of the corresponding data array 420 in set Si (this is called a cache hit). If no IP-tags in set Si match in tag array 410, then the requested IC line does not reside in the L1-IC (this is a cache miss). In case of such a cache miss, a request to the higher levels of the memory hierarchy is issued and it is necessary to wait for the IC line to be installed in the L1-IC before the access can proceed. This may be further understood with respect to the following example. Namely, consider an 8-way associative cache with 64 sets with a cache line size of 64B. Then, each cache line would hold a block of 64B of instructions. Here, K=6 and M=6. If the processor tries to access an instruction at IP 0xf045 (tag=0x1e, index=0x1, offset=0x5), then it looks for the cache line in set 1 bearing the tag 0x1e. If the IC line is found, then the fifth byte in the IC line is retrieved.

As depicted in FIG. 5, access to the tag array 410 and the data array 420 can occur serially or in parallel. In FIG. 5, a whole set is read from the data array 420 while the tag array 410 is accessed. The address is compared with the IP-tag entries to find in which IC line of the set reside the data for which the search is being performed. This information is fed to a multiplexor at the output of the data array 420 (the way multiplexor) that chooses one of the IC lines of the set. Finally, the offset part of the address is used to extract the appropriate bytes from the chosen IC line (this process is called data alignment). The number of bits in the IP-offset field determines the size of an IC line, i.e., size of an IC line is $\log_2$(number of bits in IP-offset field). The set in the IC is selected based on IP-index and an IC line within the set (i.e., a way in the set) is tagged with the IP-tag. In FIG. 5, IP-offset is 4-bits, IP-index is 4 bits, and IP-tag is 8-bits and, thus, for the exemplary IC line, IP-tag=0xFF and IP-index=0x0. As a result, the IC line is tagged with 0xFF in the set 0. As evident, all instructions within an IC line share the same IP-tag and IP-index. This also means that addresses of all basic blocks (i.e sequence of instructions without a control instruction—this is explained in detail later) within an IC line share the same IP-tag and IP-index. The IC 400 suffers from conflict misses when P frequently accessed IC lines map to the same set Si, and the cache associativity N is <P. In that case, one of the valid IC lines in the set Si is evicted out to accommodate a newer IC line. It will be appreciated that (1) the higher the associativity, the less conflict misses the IC 400 will suffer and (2) on the other hand, the more ways the IC 400 has, the bigger the way multiplexor becomes, and this may affect the cycle time of the processor. It is noted that certain L1-ICs may be organized as 64 sets×8 ways×64B per IC line, thereby totaling a maximum capacity of 32 KB of instructions (although it will be appreciated that other arrangements may be used, other capacities may be supported, and so forth).

As discussed further herein with respect to FIGS. 6-12, split programmability of UC resources (e.g., as presented with respect to FIGS. 17-31) may be further understood by first considering the operation of a frontend using only a single UC and the associated micro-architecture of such a UC (e.g., UC 370 of FIG. 3).

Referring again to FIGS. 2 and 3, it will be appreciated that the frontend 200 of FIG. 2 and the frontend 300 of FIG. 3 are configured to support a stream-mode of operation that supports fetching of UOPs from the UC, as presented herein in FIGS. 6-9 which are discussed further below.

Figure 6:
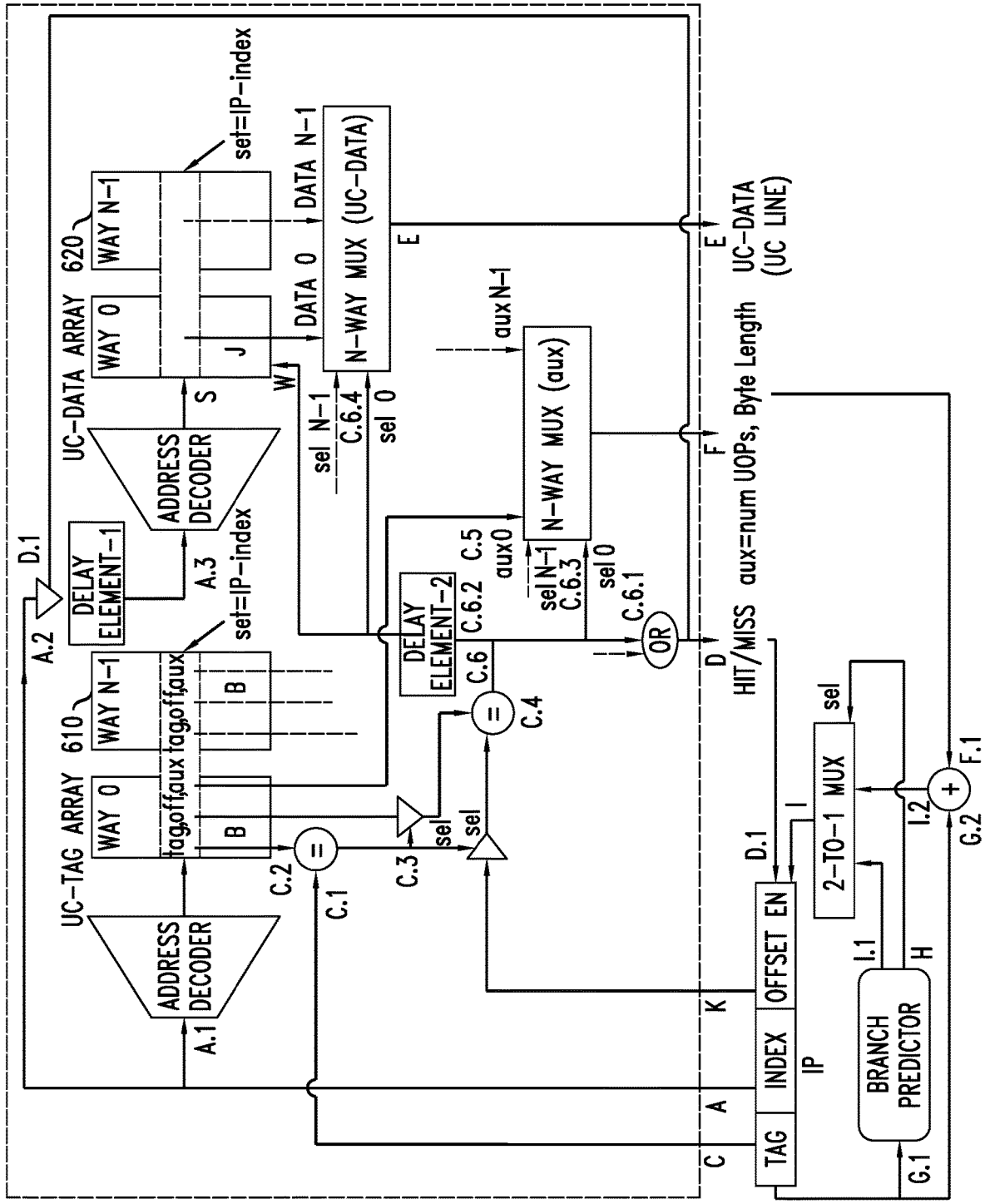
FIG. 6 depicts an example embodiment of a micro-operations cache employing an N-way associative cache.

FIG. 6 depicts an example embodiment of a micro-operations cache employing an N-way associative cache.

In FIG. 6, a UC 600 includes a UC-Tag array 610 and a UC-Data array 620. A set in the UC-Tag array 610 consists of N ways of UC-Tags. A set in UC-Data array 620 consists of N ways of UC lines. A UC-Tag consists of the tuple {IP-tag, IP-offset} of the first instruction stored in the corresponding UC line, and Auxiliary Data. In FIG. 6, these are marked as "tag", "off" and "aux" in a UC-Tag entry. The input to the UC 600 is an IP, i.e., the IP for which a search for a UC line is being performed, and the output is the UC line if it is a hit.

In the UC 600 of FIG. 6, the UC-Tag array 610 and the UC-Data array 620 are accessed serially. UC lookup may perform a UC-Tag lookup in a first cycle. Even if the UC-Tag match registers a hit, UC-Data fetching may be delayed until some later clock cycle. This UC design ensures that UC-data is read only from the one way that causes the UC-tag match; other ways in UC-Data array would be disabled entirely. By disabling non-matching ways from outputting data, further power conservation is achieved. As depicted in FIG. 6, the serialization on accessing the UC-Tag array 610 and the UC-Data array 620 is achieved by using a delay element. The delay element may be a single cycle delay element or a multi-cycle delay element (e.g., a cascaded series of latches that provision a delay path). The delay element may be tuned for longer or shorter delays, depending on the application for which it is to be used. For simplicity, UC 500 is presented herein as employing a single cycle delay element on the access path between the UC-Tag array 610 and the UC-Data array 620 (meaning that a UC lookup takes two cycles); however, it will be appreciated that a multi-cycle delay element may be used on the access path between the UC-Tag array 610 and the UC-Data array 620. In FIG. 6, for simplicity, the logic and interconnections are expanded for way 0 only. It will be appreciated that similar logic is applicable to the other ways (i.e., way 1 through way N−1).

Figure 7:
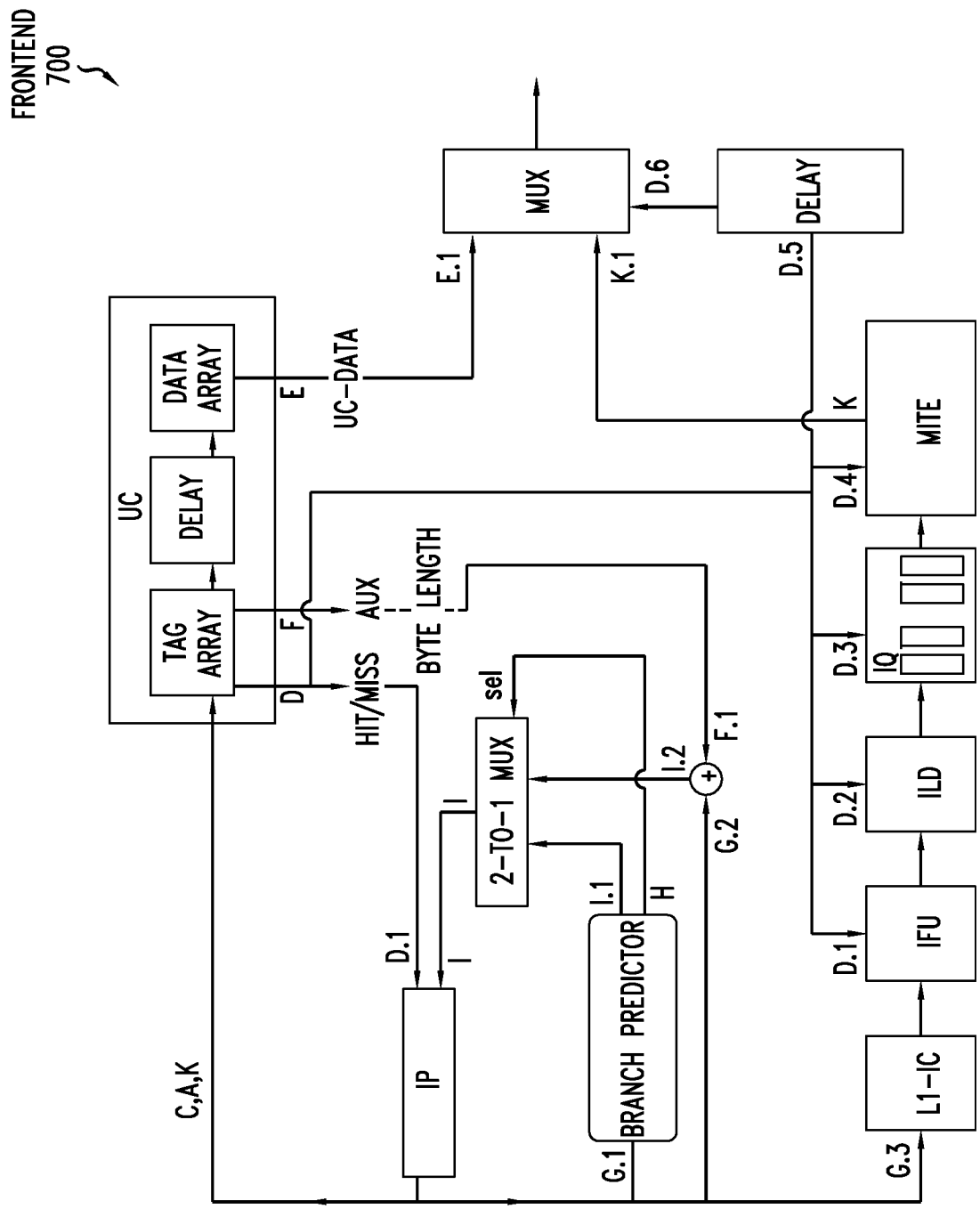
FIG. 7 depicts an example embodiment of a frontend of a processor, illustrating a micro-operations cache in conjunction with an IC, that is configured to operate in a stream-mode.

In the UC 600 of FIG. 6, UC lookup may perform a UC-Tag lookup in a first cycle and, if there is a hit in the first cycle, may perform a UC data fetch in a second cycle. As discussed further below, these operations may be further understood by considering an example embodiment of UC 600 in conjunction with an IC of a frontend of a processor that is configured to operate in a stream-mode, as depicted in FIG. 7. It will be appreciated that FIG. 7 may be considered to be extended view of FIG. 6 with related components in the frontend and the UC being abstracted out. More specifically, frontend 700 of FIG. 7 illustrates specific functions performed within the context of the first cycle (e.g., handling of hit/miss output from the UC 600 and so forth) and the second cycle (e.g., handling of the UC-Data output and so forth) of a UC lookup at the UC 600.

Figure 8:
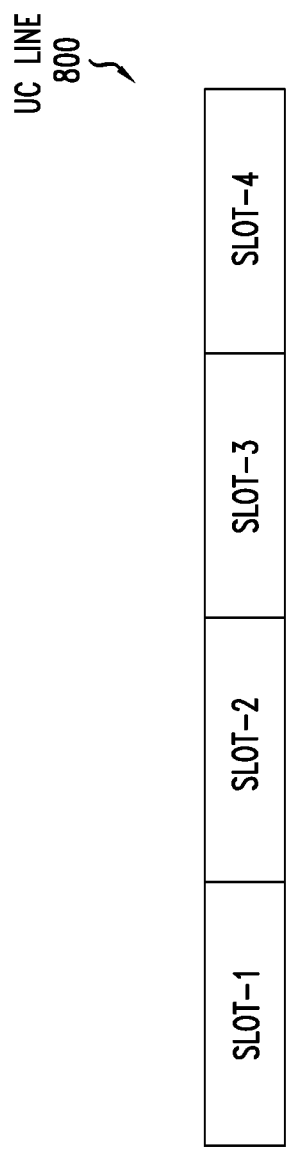
FIG. 8 depicts an example embodiment of the structure of a UC line, with UOP slots configured to store UOPs, configured for use in the micro-operations cache of FIG. 7.

In the UC 600 of FIG. 6, each set in the UC contains a number of UC lines (as the number of ways, i.e., way 0 . . . way N−1) and each UC line contains a fixed number of UOP slots. Some slots contain active UOPs, while others may remain empty. An example embodiment of the structure of a UC line, with four UOP slots configured to store UOPs, configured for use in UC 600 is presented in FIG. 8. The UC line 800 of FIG. 8 illustrates that up to four consecutive UOPs can be stored in the UC line 800. As an example, if the size of a UOP is 4B then the size of the UC line is 32B and, therefore, the fetch bandwidth from a UC hit is 4 UOPs per clock cycle.

Figure 9:
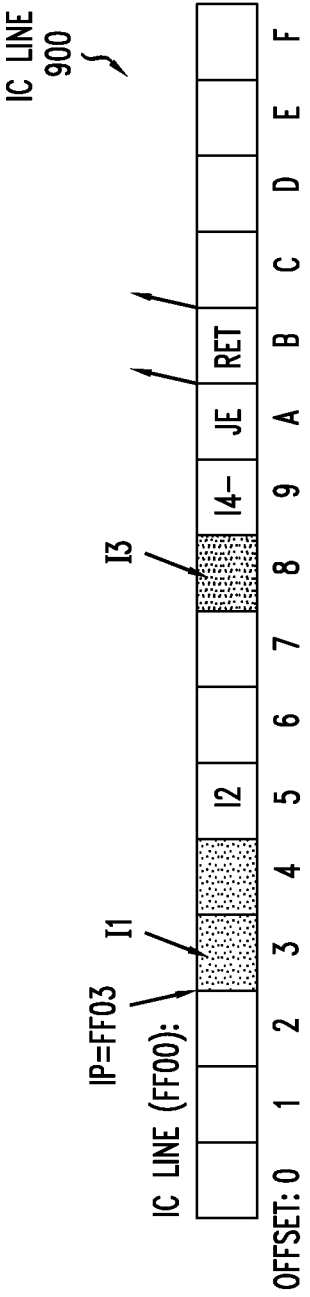
FIG. 9 depicts an example embodiment of the structure of a basic block, within an IC line which may be decoded and mapped into the UC according to the IP of the first instruction of the block, configured for use in the micro-operations cache of FIG. 7.

In the UC 600 of FIG. 6, the UC 600 stores "basic blocks" of instructions predecoded into UOPs. A "basic block" is a sequence of instructions within an IC line fetched by the processor during a certain program control flow. The basic block terminates when a control instruction (such as conditional or unconditional branch) changes the execution sequence. Herein, the term basic block refers sometimes to basic block of instructions in IC line and sometimes to the sequence of UOPs originating from such instruction sequence. The intention will be clear from the context. An example embodiment of the structure of a basic block, within an IC line which may be mapped into the UC 600 according to the IP of the first instruction of the block, is presented in FIG. 9. The IC line 900, for purposes of clarity, is depicted as being 16B in size; however, it will be appreciated that an IC line may be smaller or larger (e.g., 64B or larger). In FIG. 9, the IC line 900 contains instructions in the memory address range 0xFF00-0xFF0F. Here, assume that, in a certain program control flow, the fetching unit jumped to address 0xFF03 and fetched the instructions I1, I2, I3, I4 of lengths 2B, 3B, 1B, 2B respectively. Note that I4 is a conditional branch instruction (JE=Jump If Equal) and assume that the branch predictor (BPU) predicted jump after I4. Then, after fetching I4, the fetching unit jumped to the target memory address indicated by I4. In that case, the memory address range 0xFF03-0xFF0A containing instructions I1-I4 constitutes a basic block, which is decoded and stored in the UC. The basic block is mapped into the UC according to the IP of the first instruction in the block, i.e., 0xFF03 in FIG. 9. The UC uses the same three-part structure of the IP (e.g., as used for the IC in FIG. 5) to store the basic block. The UOPs resulting from a basic block can span over one or more UC lines, depending on the number of resulting UOPs. An access to the UC is done using the IP of the first instruction stored in the UC line. The set in the UC for a basic block is selected based on IP-index, so all UC lines of a basic block are stored in different ways within the same set. Such UC lines will bear the same IP-tag so, in order to differentiate among the UC lines, the IP-offset of the first instruction in the UC line is also stored as tag of the UC line. In that respect, the tag in UC is a tuple {IP-tag, IP-offset} which slightly differs from tags in the IC (which stores only IP-tag). This tag is stored in corresponding entry in UC-Tag array. Additionally, each UC line stores the auxiliary data containing number of valid UOPs stored in the UC line and total length of ISA instructions that originated the UOPs in the UC line. This auxiliary data is stored along with UC-Tag array and is accessed during UC lookup.

Referring again to FIGS. 6 and 7, the lookup of an IP may be performed as follows (with various inputs and outputs along the signal flow being marked within FIG. 6 and FIG. 7).

The lookup of an IP may consist of various steps performed in one or two cycles. In the first cycle (which may be denoted as Cycle-1), a UC-Tag lookup is performed (as discussed in Steps 1-8 below), a computation of a next-IP for UC is performed (as discussed in Steps 9-11 below), and an L1-IC lookup is performed (as discussed in Step 12 below). In the second cycle (which may be denoted as Cycle-2), which is only performed if there is a hit in the UC-Tag array in the first cycle), a UC data fetch is performed (as discussed in Steps 13-17 below) and a next UC-Tag lookup is performed (as discussed in Steps 18-19 below). It will be appreciated that these steps describe the signal flow across the UC 600 of FIG. 6.

In Cycle-1 of the lookup of an IP, a UC-Tag lookup may be performed (as discussed in Steps 1-8 below) as follows:

1. The IP-index (A) from the input IP is sent to the Address Decoder in UC-Tag Array (A.1).

2. Address Decoder in UC-Tag array selects/activates the set indexed by IP-index. As a result, each way in that set sends out their stored {tag, offset, auxiliary data} (B).

3. For each way in the UC-Tag array, the following is performed.
   3.1. The "tag" (C.2) is first compared with the input IP-tag (C.1). If it matches, the result is 1, otherwise 0.
   3.2. The output from Step 3.1 is fed into selectors (C.3) of two tri-state logic gates that control the inputs from IP-offset and "off" respectively. If input to the selector is 1, then a tri-state logic gate will allow its input to be switched as output, otherwise it blocks the output. So, if IP-tag does not match "tag" in Step 3.1, then selectors would block further outputs of IP-offset and "off" respectively, or otherwise would allow them.
   3.3. The IP-offset and "off" outputs from the tri-state gates are compared (C.4). If matches, then the result (C.6) is 1, otherwise the result is 0.
   3.4. The "aux" is sent to a N-way multiplexor (C.5).
   3.5. The result from step 3.3 (C.6) from each way are sent to following:
      3.5.1. As input (C.6.1) to OR gate that generates the final Hit/Miss output from the UC (D).
      3.5.2. As input to Delay Element-2 (C.6.2). In the next cycle, the Delay Element-2 generates required signals to retrieve the way from UC-Data array if this way is a hit.
      3.5.3. As selector (C.6.3) to the N-way multiplexor (mentioned in step 3.4) that selects the "aux" input (C.5) if this way is a hit.

4. The signal C.6.1 from each way are logically ORed together to generate the final Hit/Miss output from UC (D). If there is a hit, then at least one of the ways would send the signal C.6.1 as 1.

5. Based on the selector input C.6.3 from each way, the N-way multiplexor will choose one of the "aux" way (C.5) as output. If there is a hit, then at least one of the ways would send input in C.6.3 as 1 and way multiplexor would choose the corresponding "aux" line as output (F).

6. The IP-index (A) from the input IP is also sent to a tri-state logic gate (A.2). At the end of this cycle, Hit/Miss output from UC (D) is fed as selector input (D.1) to this tri-state logic gate. So, if there is a hit in this cycle then the tri-state logic gate allows IP-index as input to Delay Element-1. In the next cycle, the Delay Element-1 would send the IP-index to the Address Decoder in UC-Data array.

7. The Hit/Miss output from UC (D) is sent to IFU (D.1), ILD (D.2), IQ (D.3) and MITE (D.4), which disables the respective units if there is a Hit. This step is shown in FIG. 7.

8. The Hit/Miss output from UC (D) is sent to a Delay Element (D.5). In the next cycle, this line acts as selector input to the 2-to-1 MUX that chooses between decode path and UC to send the UOPs to IDQ. This step is shown in FIG. 7.

In Cycle-1 of the lookup of an IP, a computation of a next-IP for SP-UC may be performed (as discussed in Steps 9-11 below) as follows:

9. IP is also sent in parallel as input (G.1) to the branch predictor (BPU) to check if the execution sequence is to branch out after this IP if this IP is a hit in UC, i.e., the UC line for this IP contains a control/branch instruction that is predicted to be taken. At the end of this cycle, BPU generates two signals—Hit/Miss (H) which generates 1 if hit, 0 if a miss and next IP (I.1) if it is a hit. This step is shown in FIG. 7.

10. IP is also sent in parallel as input (G.2) to an adder to compute the next IP if BPU is not a hit. In that case the next IP would be the IP of next UC line in the sequence. By the end of this cycle, if the UC is hit for the current IP then ByteLen from the "aux" output (F) is fed as the other input (F.1) to the adder. The adder then generates the next IP (I.2) to be looked up in UC. This step is shown in FIG. 7.

11. Signals I.1 and I.2 are the inputs to a 2-to-1 MUX with selector input from the Hit/Miss line of BPU (H). If BPU indicates hit then I.1 (i.e., next IP from branch) is generated as output (I) from the MUX, otherwise I.2 (i.e., next IP in sequence) is generated as output (I). This step is shown in FIG. 6.

In Cycle-1 of the lookup of an IP, an L1-IC lookup may be performed (as discussed in Step 12 below) as follows:

12. IP is also sent in parallel to L1-IC (G.3) for lookup of the instructions starting at this IP, so that if lookup in UC-Tag array results in a Miss then the instructions are fed from L1-IC. This step is shown in FIG. 7.

In Cycle-2 of the lookup of an IP, a UC-Data fetch may be performed (as discussed in Steps 13-17 below) as follows:

13. Delay Element-1 sends the IP-index to the Address Decoder in UC-Data array (A.3). The Address decoder selects the set (S) in UC-Data array that is mapped by the IP-index.

14. Delay Element-2 (C.6.2) on each way sends the input to:
  14.1. Corresponding way line (W) in UC-Data array.
  14.2. As selector to N-way MUX based on which the MUX selects the UC-Data lines from the UC-Data array.
15. In step 14.1 only the way that is hit would send W as 1. This would activate only that way in UC-Data array. As a result, from step 10-11, UC-Data array will send out UC-Data (J) only from the way that is hit in set S.
16. In step 14.2 only the way that is hit would send the selector as 1. So, the N-way MUX outputs the UC-Data from step 12 as the final output (E) from the UC.
17. The UC-Data output from step 16(E) is sent as input (E.1) to the 2-to-1 MUX that selects between UC and decoded path. Since there is a Hit, so the selector to the MUX (D.6) is set to 1, which outputs the UC-Data to the IDQ. This step is shown in FIG. 7.

In Cycle-2 of the lookup of an IP, a next UC-Tag lookup may be performed (as discussed in Steps 18-19 below) as follows:
18. Since there is a Hit in UC-Tag lookup in the previous cycle, the 'enable' line (en) input to IP is set, which updates the IP with the input (I) received from step 11. This step is shown in FIG. 7.
19. Steps 1-12 are repeated for the new IP.

It will be appreciated that the numbering of the foregoing steps is provided for purposes of clarity in describing example embodiments and does not necessarily imply an order in which the steps are performed (e.g., at least some of the steps may be performed in a different order, at least some of the steps may be performed contemporaneously, or the like, as well as various combinations thereof).

It will be appreciated that a lookup of an IP may consist of various other steps performed in various other cycles.

Referring again to FIGS. 2 and 3, it will be appreciated that the frontend 200 of FIG. 2 and the frontend 300 of FIG. 3 are configured to support a build-mode of operation that supports fetching and decoding instructions through the path L1-IC→IFU→ILD→IQ→MITE and storing them to UC in parallel to supply to IDQ, as presented herein in FIGS. 10-12 which are discussed further below.

It will be appreciated that a mode switch occurs at the frontend (e.g., frontend 200 of FIG. 2 or frontend 300 of FIG. 3) when moving between the stream-mode and the build-mode. For example, when the frontend is in stream-mode and a UC-Tag lookup results in a miss, the frontend will switch to the build-mode.

Referring again to FIG. 6, in the UC 600 of FIG. 6, UC lookup may perform a UC-Tag lookup in a first cycle and, if there is a miss in the first cycle, may perform fetching and decoding of instructions through the path L1-IC→IFU→ILD→IQ→MITE and storing them to UC in parallel to supply to IDQ. As discussed further below, these operations may be further understood by considering an example embodiment of UC 600 in conjunction with an IC of a frontend of a processor that is configured to operate in build-mode, as depicted in FIG. 10. It will be appreciated that FIG. 10 may be considered to be a generalized view of FIG. 6, illustrating only the components and signal flows used in build-mode. More specifically, frontend 1000 of FIG. 10 illustrates specific functions performed by a block builder configured to observe the decoded UOPs output from MITE and build UC lines for storage in the UC. In this way, if the control flow of the program returns to the IP that caused the miss at the UC, the IP will cause a hit instead. The process, which may be a single-cycle or multi-cycle process, involves the following steps described below (which, it will be appreciated, describe the signal flow across the frontend of FIG. 10).

1. While the decoded UOPs from MITE are supplied towards backend (K.1), in parallel the UOPs are also sent to the UC fill buffer in Block Builder (K.2).
2. In Block Builder, UOPs from consecutive instructions are packed together to fill a UC Line. After the UC Line is built (L), it is prepared to be stored in the UC.
3. The {IP, ByteLen} of the UC line is sent to IP update logic (L.1). The IP update logic reads the IP register (M) to check if the IP of the UC line (L.1) is same as from M, which is the IP that was miss in UC earlier. If not same, then the UC line is discarded.
4. The UC line is now stored in the UC (L.2).
5. While the UC line is stored in UC (L.2), in parallel, the IP Update Logic sends the UC line's Byte Len (N) to compute the next IP in the sequence. Signal N is sent as input to a 2-to-1 MUX which takes the other input from the Byte Len of the "aux" output (F) from UC. The selector of the MUX is the Hit/Miss (D) output from UC. In build-mode, D sends a miss, so the MUX connects the signal from M as output (F.1).
6. The rest of the signal flows for updating the next IP (using BPU and signal F.1) are the same as described for stream-mode.

It will be appreciated that the numbering of the foregoing steps is provided for purposes of clarity in describing example embodiments and does not necessarily imply an order in which the steps are performed (e.g., at least some of the steps may be performed in a different order, at least some of the steps may be performed contemporaneously, or the like, as well as various combinations thereof).

It is noted that, in build-mode, the five pipeline stages through L1-IC→IFU→ILD→IQ→MITE are very costly in terms of circuitry and processing and take at least six times more cycle time than stream-mode. So, a miss in UC increases the number of cycles taken to complete execution of an instruction. These five pipeline stages in the frontend are extremely power hungry and consume about 28% of the processor power. For example, if a UC line consists of 6 UOP slots and if UC is a hit, then the UC can supply 6 UOPs/cycle to the back-end; however, on a UC miss, the build mode can supply not more than 4 UOPs/cycle, which reduces the UOP supply to the backend by at least 33%.

Figure 10:
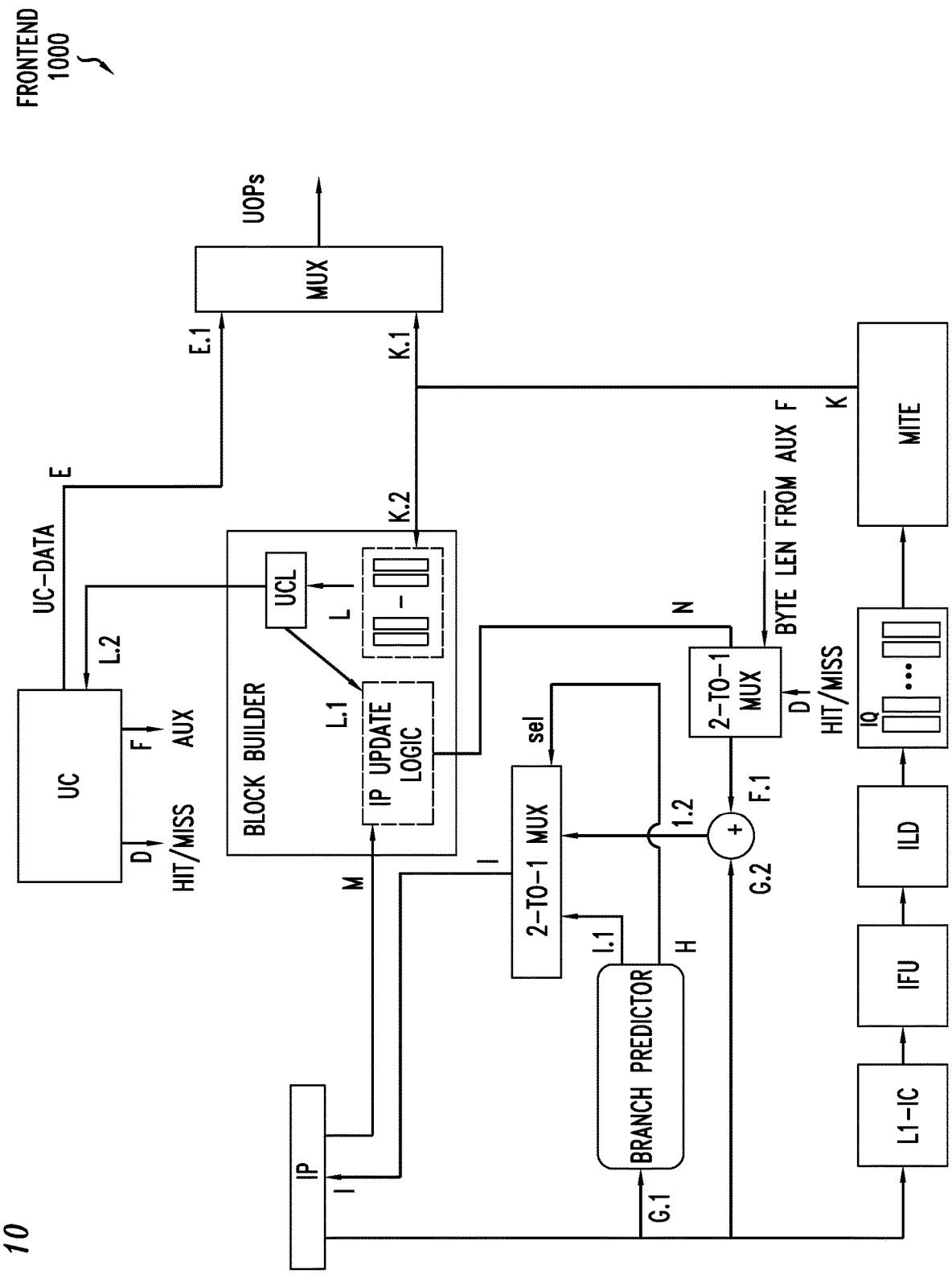
FIG. 10 depicts an example embodiment of a frontend of a processor, illustrating a micro-operations cache in conjunction with an IC, that is configured to operate in a build mode.

FIG. 11 depicts an example embodiment of the structure of a UC line, with UOP slots configured to store UOPs, configured for use in the micro-operations cache of FIG. 10. More specifically, FIG. 11 depicts an example of an IC line to UC line mapping 1100 which maps basic blocks from an IC line (e.g., an IC line as presented in FIG. 8) to UC lines. In this example, the UC line is described as consisting of 4 UOP slots.

In the example of FIG. 11, five different instructions with variable instruction-length from the same IC line are translated into UOPs. The resultant UOPs are stored in several UC lines in the UC set corresponding to IP-index. Each instruction and its UOPs are marked by same gray level color.

In the example of FIG. 11, there are two basic blocks in the same IC line: (1) BB_1 consisting of instructions I1-I4 (I4 is a JE, a conditional branch instruction) and (2) BB_2 consisting of a single RET instruction. BB_1 spans over two UC lines, marked as UCL1 and UCL2. The last UOP slot of UCL1 remains empty as the next sequential instruction (I3) requires 3 UOPs and cannot be fully accommodated in the first line. The last line (UCL3), which ends the basic block, has only 3 UOPs, leaving the last UOP slot empty.

As indicated in the example of FIG. 11, UC lines are not always fully utilized. There could be several empty slots in the last UC line of a basic block. Also, the policy of forcing all UOPs of the same instruction to share the same UC line may leave empty UOP slots in other UC lines too (e.g., UCL1 in the example). In addition, the UC may suffer some level of duplication (e.g., this may happen when control flow leads to an instruction that is already in the UC, but not as the first instruction in its UC line). In any event, this method of UC design attempts to (1) map basic blocks of instructions to UC lines with maximal line utilization and (2) store enough UOPs in each line to ensure sufficient bandwidth. These goals may conflict with each other since, intuitively, goal (1) will push for shorter lines while goal (2) will push for longer line.

As indicated in the example of FIG. 6, the UC (as with the IC of FIG. 4) may suffer from conflict misses when P frequently accessed cache blocks map to the same cache set, and the cache associativity N<P. In that case, one of the valid UC lines is evicted out to accommodate a newer basic block. In this regard, it will be appreciated that the higher the associativity of a set in UC, the less conflict misses the UC lines will suffer. On the other hand, the more ways a set has, the bigger the way multiplexor becomes, and this may affect the cycle time of the processor.

FIG. 12 depicts an example embodiment of the differences between L1-IC and UC over the fields within the IP, wherein IP is the first instruction of the basic block from L1-IC which is mapped to UC of FIG. 10. More specifically, IP 1200 of FIG. 12 illustrates that L1-C may have twice the number of sets as the sets in a single UC, so the UC discounts one bit from IP-index to select the corresponding set in the UC and also spills over the discounted bit into the IP-tag.

As discussed further herein with respect to FIGS. 13-16, split programmability of UC resources (e.g., as presented with respect to FIGS. 17-31) may be further understood by first considering use of a processor, that is based on operation of L1-IC 310 as presented with respect to FIGS. 4-5 and the operation of a frontend using only a single UC and the associated micro-architecture of such a UC (e.g., UC 370 of FIG. 3) as presented with respect to FIGS. 6-12, to support execution of a program (as presented with respect to FIGS. 13-16).

In general, there are two structural components of a program: (1) subroutines and (2) branches, which alter the execution sequence of its instructions. A subroutine is a sequence of program instructions that performs a specific task, packaged as unit. This unit can then be used in programs wherever that task should be performed. A subroutine behaves in much the same way as a program that is used as one step in a larger program or another subprogram. It is noted that these components may be better understood when described within the context of a particular processor architecture, such as x86. A subroutine can be invoked (e.g., by a CALL instruction in x86) several times and from several places during one execution of the program, including from other subroutines, and then branch back (e.g., by a RET instruction in x86) to the next instruction after the CALL, once the task being performed by the subroutine is done. Subroutines use a call stack, which is a stack data structure in memory that stores information about active subroutines of a computer program. In x86, each CALL instruction pushes a stack frame onto the call stack. The stack frame has several purposes, such as passing arguments to a subroutine, local variables used by the subroutine, and so forth, but its main purpose is to keep track of the point to which each active subroutine should return control when it executes RET. To accomplish this, the address following the CALL instruction, the return address, is pushed into the stack frame with each CALL. So, the RET instruction reads the return address saved in the latest stack frame in the call stack, pops the stack frame, and transfers control to that address. Note that the transfer of control to the return address generally happens during instruction fetching in the front-end, which happens before the RET instruction is executed by the backend, i.e., when it reads the return address from the stack frame in memory. So, the return addresses for the call stack are usually preserved in registers in the processor, called the "Return Address Stack" (RAS). Some processors also keep the addresses of RET instructions in the BPU (branch predictor) with their respective returns addresses as the predicted targets. For simplicity, the term RAS may be used herein to refer to any hardware assisted method for the frontend to transfer control to return addresses. An example of such a program is presented in FIG. 13.

Figure 13:
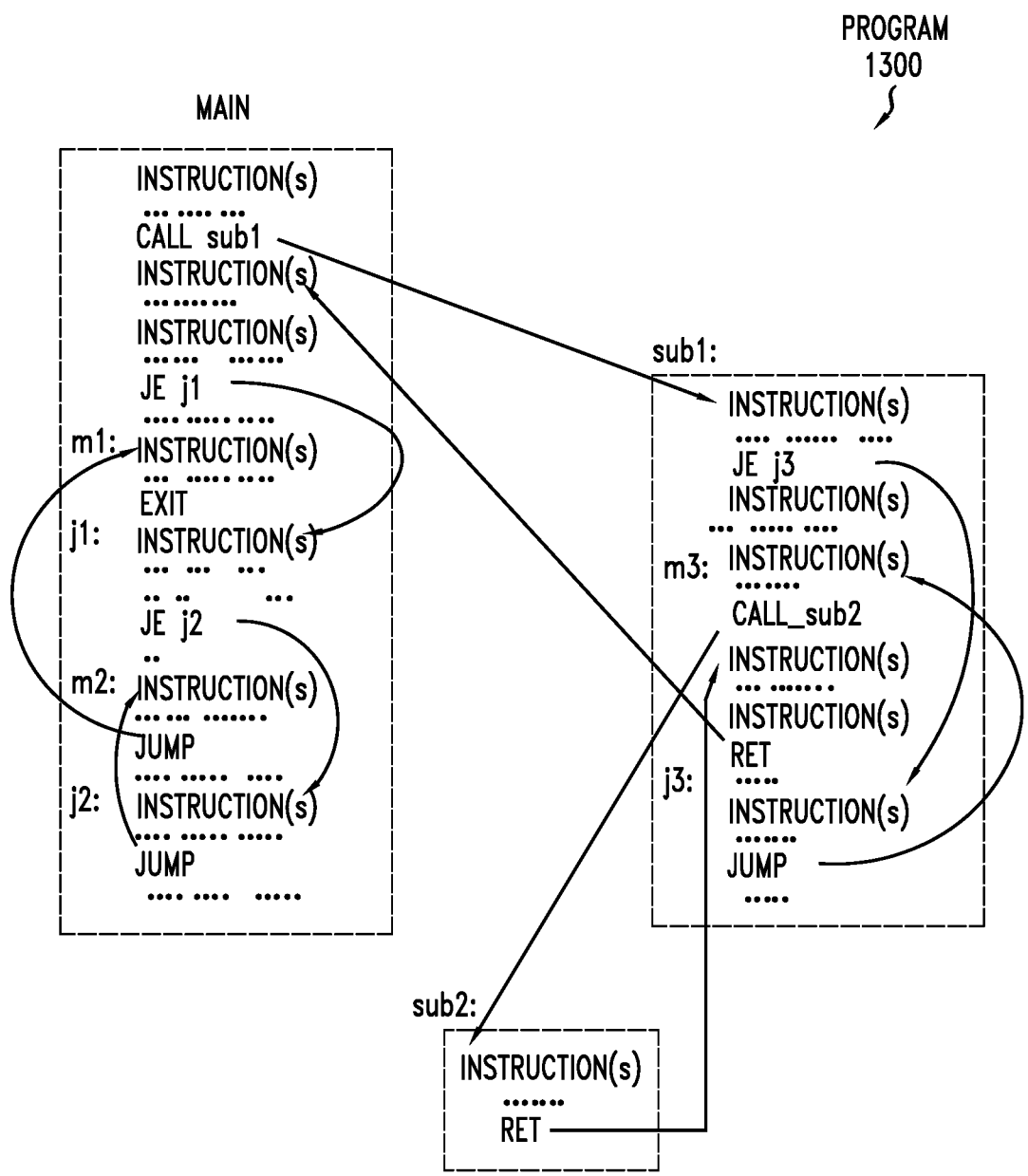
FIG. 13 depicts an example embodiment of a program for illustrating structure components, such as subroutines and branches, of the program which results in a set of control flows within the program.

FIG. 13 depicts an example embodiment of a program for illustrating structure components, such as subroutines and branches, of the program.

The program 1300 is a program to be executed by a processor. The program 1300, as indicated above, includes structure components subroutines and branches.

The processor executes the instructions in MAIN sequentially until the instruction CALL sub1. The CALL instruction interrupts the flow of MAIN by passing control to the subroutine that is specified with the CALL, which, in FIG. 13, is sub1. Then the instructions in sub1 are executed. While sub1 is executed, it also calls subroutine sub2 in instruction CALL sub2. This is an example of nested subroutine calls, i.e., MAIN→sub1→sub2. Eventually, upon completion of the instructions in sub1, the processor executes the RET instruction to return to the next instruction in MAIN after the CALL sub1.

Within a program (e.g., MAIN) or subroutine (e.g., sub1 or sub2), the sequential execution of instructions can be interrupted by branch instructions. Branches can cause a processor to begin executing a different instruction sequence within the current subroutine and, thus, deviate from its default behavior of executing instructions sequentially. A branch instruction can be either (1) a conditional branch (e.g., a JE/Jump-if-Equal instruction in x86) which may or may not cause branch depending on whether a condition is true or false or (2) an unconditional branch (e.g., JUMP in X86), which will result in a branch. In FIG. 13, in the MAIN program, JE j1 is a conditional branch instruction. JE j1 conditionally switches the execution to the code sequence starting at label j1. The label used in this example is a mnemonic for the memory address of the first instruction of a particular code sequence. After executing the sequence in j1, it uses unconditional JUMP instruction to merge back to certain point m1 in the original instruction sequence that invoked JE j1. While the instruction sequence of j1 was being executed, it encountered another conditional branch instruction JE j2. The same procedure is applicable to the JE j2, which conditionally switches the execution to code sequence starting at label j2. This is an example of nested branches. Similarly, a conditional branch JE j3 is included within subroutine sub1.

It will be appreciated that, for purposes of clarity in describing various embodiments in which a processor is configured to support execution of program instructions, the following terminology may be used herein. An instruction that switches or disrupts the sequential execution of instructions is referred to herein as a "control instruction" (e.g., in x86, such as in the example of FIG. 13, instructions such as CALL, RET, JE, JUMP, and so forth are control instructions). A target instruction sequence of a control instruction is referred to herein as a "control block" (e.g., in x86, such as in the example of FIG. 13, sub1, sub2, j1, m1, j2, m2, j3, m3 are the control blocks) and, thus, an order of execution of instructions in a program is a specific chain of control blocks where a control block can include nested control blocks. An order of execution of control blocks in a program is referred to herein as a "control flow" (i.e., flow of control), and it will be appreciated that conditional branches (e.g., in x86, such as in the example of FIG. 13, JE) can generate multiple control flows in a program since every such branch is a fork, the execution can go either way on the fork based on the condition of the fork. The term "working set" is used to denote the collection of control blocks across a "certain set of control flows" in the program. It is noted that, from the perspective of L1-IC or UC, the working set is the respective cache lines in the working set. The working set may be further understood by way of reference to FIG. 14.

Figure 14:
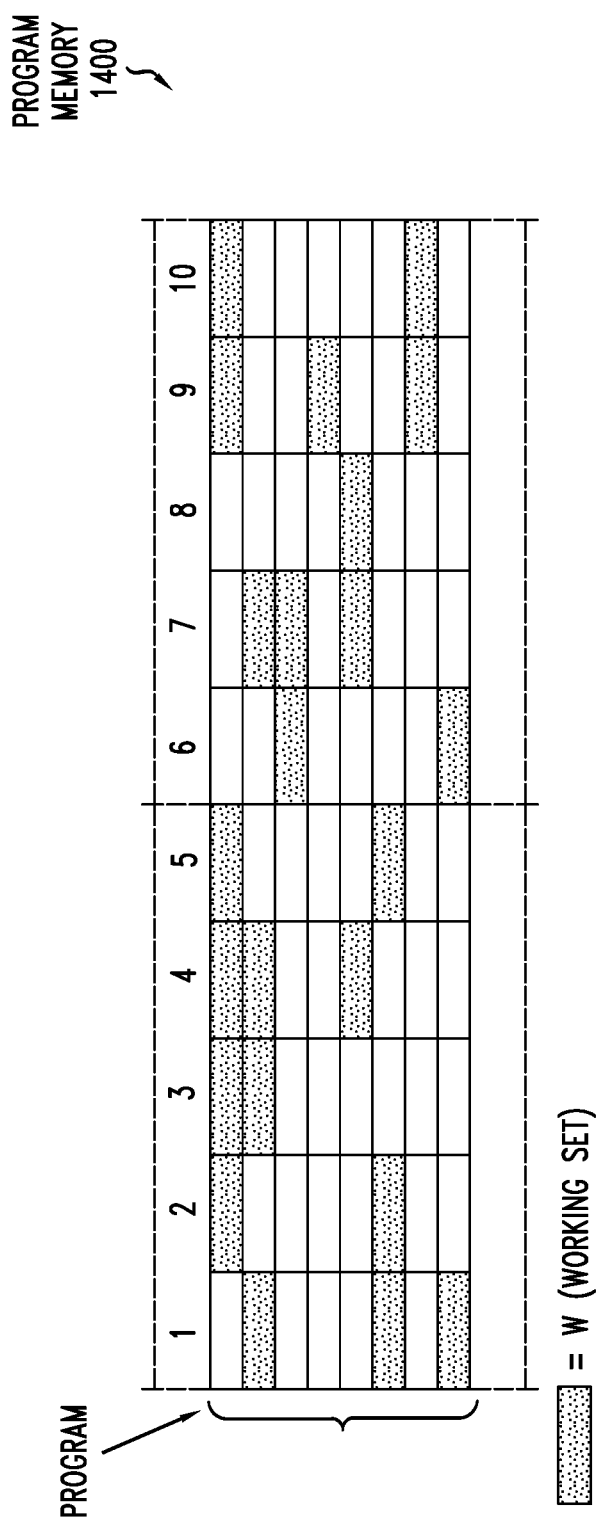
FIG. 14 depicts an example embodiment of a program memory, implemented as a two-dimensional region in memory that is divided into units of cache lines of a certain cache, for illustrating the working set of cache lines for a specific set of control flows of the program.

FIG. 14 depicts an example embodiment of a program memory, implemented as a two-dimensional region in memory that is divided into units of cache lines of a certain cache, for illustrating the working set of cache lines for a specific set of control flows of the program. In the program memory 1400 of FIG. 14, the working set for a specific set of control flows in the program are marked using "W". During execution of those control flows, only the marked cache lines are brought into the cache and the rest of the cache lines are not accessed. If a program has no control flows (which is usually quite rare), then size of the program is equal to the size of the working set.

As such, across a control flow, the processor jumps between control blocks beginning at arbitrary addresses in the program memory, which has implications on the hit rate L1-IC and UC. The hit rate on L1-IC and UC impacts the performance and power efficiency of the program. The hit rates in those caches are influenced by the following three types of misses which may occur in a set associative cache micro-architecture (e.g., such as the set associative cache micro-architecture as presented in FIG. 4): (1) compulsory miss, (2) capacity miss, and (3) conflict miss, each of which is discussed further below.

Compulsory misses are the misses on the first access to a cache line, since the cache line generally needs to be brought into the cache. This is also called the cold start miss or first reference miss. Compulsory misses are not avoidable and, as this is one time miss, it does not impact continual performance of the program.

Conflict misses occur when the number of cache lines P competing for a set are more than the number of ways N in the set. That means that P number of cache lines bear the same value of IP-index, which is used to map to the designated set. So, to accommodate a new cache line, one or more existing cache lines may be evicted from the set. The term "thrashing" may be used herein to denote eviction of cache lines due to conflicts in a set.

Capacity misses occur when cache lines are being evicted from cache because the cache cannot contain all cache lines needed for the program (e.g., where the size of the program is much larger than the overall capacity of the cache). To eliminate capacity misses in a set associative cache, the size of the program generally needs to be less than or equal to the size of the cache. This also means the cache is underutilized if the size of working set is less than size of the program (e.g., as in the example of FIG. 14), which is the most unlikely case (since it is very rare to have a program without control flows). It is noted that, in this case, there is not a conflict miss either.

If the size of the program is larger than the capacity of the cache then, before hitting a capacity miss, it is more likely that it will hit a conflict miss due to its control flows, because control flows increase the probability of P numbers of control blocks sharing the same IP-index. Thus, in a set associative cache, the hit rate of a working set is primarily driven by the rate of conflict misses.

In general, there are two classes of super high-performance programs (applications) which generally experience no conflict misses in L1-C or tolerable conflict misses in L1-C. The data accessed by these programs fit into L1-DC (i.e., L1-Data Cache) as the data is efficiently packed, so no capacity or conflict misses occur in L1-DC. Thus, the performance of these programs generally depends on the peak performance of the much smaller UC. The two classes of programs are defined as follows: (1) a Class A program is a program that entirely fits into the L1-IC, such that there are no capacity or conflict misses in L1-IC, but is larger than the capacity of the UC and (2) a Class B program is a program that is larger than L1-C and, thus, experiences conflict misses in L1-C.

The performance of these-performance programs depends on consistent supply of the largest fraction of the working set from the UC (e.g., ideal UC utilization %=(((capacity of UC)/(size of working set))×100)%. However, more practically, the effective UC utilization is much less than the ideal UC utilization, due to conflict misses incurred by its control flows in the UC. For example, if size of working set is equal to capacity of UC then the ideal UC utilization should be 100%, but in the worst case of conflict misses the effective utilization is 20%. A proof on the severity of conflict misses in single UC micro-architectures can be understood as follows. The size of the UC generally is much smaller compared to the L1-IC, for minimal access latency and lower power consumption. For example, a UC may be organized as 32 sets×8 ways×6 UOPs per UC line, totaling a maximum capacity of 1536 UOPs, wherein the size of each UOP is 4B (i.e., the overall size of the UC is 6 KB). For example, an L1-IC may be organized as 64 sets×8 ways× 64B per IC line, totaling a maximum capacity of 32 KB of instructions. In this example, while both the L1-IC and the UC have same number of ways per set, the L1-IC has twice the number of sets as of UC. So, a new UC line would be started every time the 32B boundary is passed in the IC line, i.e., at least 1 new UC line is used per ½ of IC line. Further, in the IC-to-UC mapping example presented in FIG. 7, 9B of instructions from the IC line is mapped into 3 UC lines, wherein each UC line holds up to 4 UOPs. Thus, in this example, for a UC line with holding capacity up to 6 UOPs, 9B of instructions would use 2.5 UC lines. Further, it may be extrapolated that a 32B aligned block on an IC line would map to 2.5×32/9=8.88~8 UC lines, i.e., almost the entire set in the UC. Thus, a 64B sized IC line would map to 16 UC lines and so, in this example, the UC has a probability of conflict miss that is 16 times higher than in L1-IC.

As indicated above, super high-performance applications of Class A or Class B may be utilized within various contexts. For example, one such super high-performance application of Class A or Class B is network packet processing by a processor, which implements the forwarding plane of a Network Functions Virtualization (NFV) router. The NFV router functionality may be implemented in a general purpose CISC server processor, such as x86. A simplified structure of such a network packet processing program is presented in FIG. 15.

Figure 15:
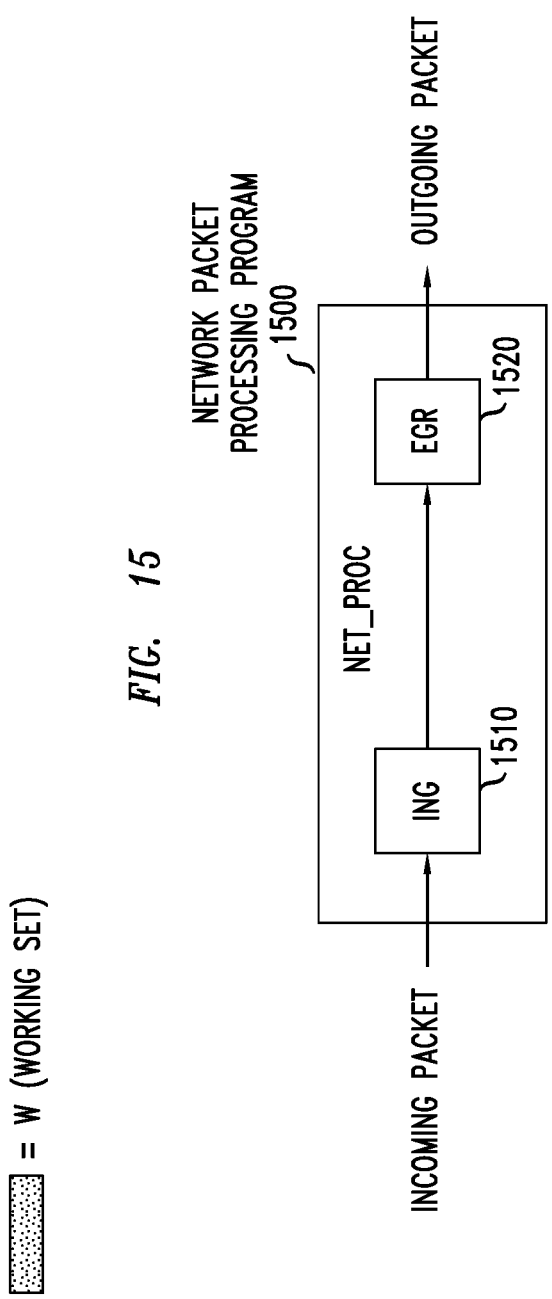
FIG. 15 depicts an example embodiment of a simplified structure of a network packet processing program configured to be executed by a processor.

FIG. 15 depicts an example embodiment of a simplified structure of a network packet processing program configured to be executed by a processor.

The network packet processing program 1500, which is referred to herein as the NET_PROC program, may be executed by a processor for supporting processing of packets. The NET_PROC program is repeatedly executed by the processor for every incoming packet. The NET_PROC program receives an incoming packet on an input port, processes the packet, and sends the packet out on an output port. Within NET_PROC, the packet is processed by a chain of subroutines that includes two top level subroutines associated with ingress of packets (denoted as ING 1510) and egress of packets (denoted as EGR 1520).

The ING 1510 subroutine may be configured to perform packet ingress functions such as decapsulation of packets, classification of packets based on various headers on the packets, determination of next-hop forwarding contexts based on classification of the packets, performing forwarding table lookups associated with the respective forwarding contexts and setting up associated input parameters for EGR 1520, or the like, as well as various combinations thereof.

The EGR 1520 subroutine may be configured to perform packet egress functions such as identification of packet forwarding contexts based on input parameters from ING 1410, performing table lookups associated with the forwarding contexts, adding or modifying the appropriate encapsulations on the forwarding contexts, sending the packets to the appropriate output ports, or the like, as well as various combinations thereof.

Figure 16:
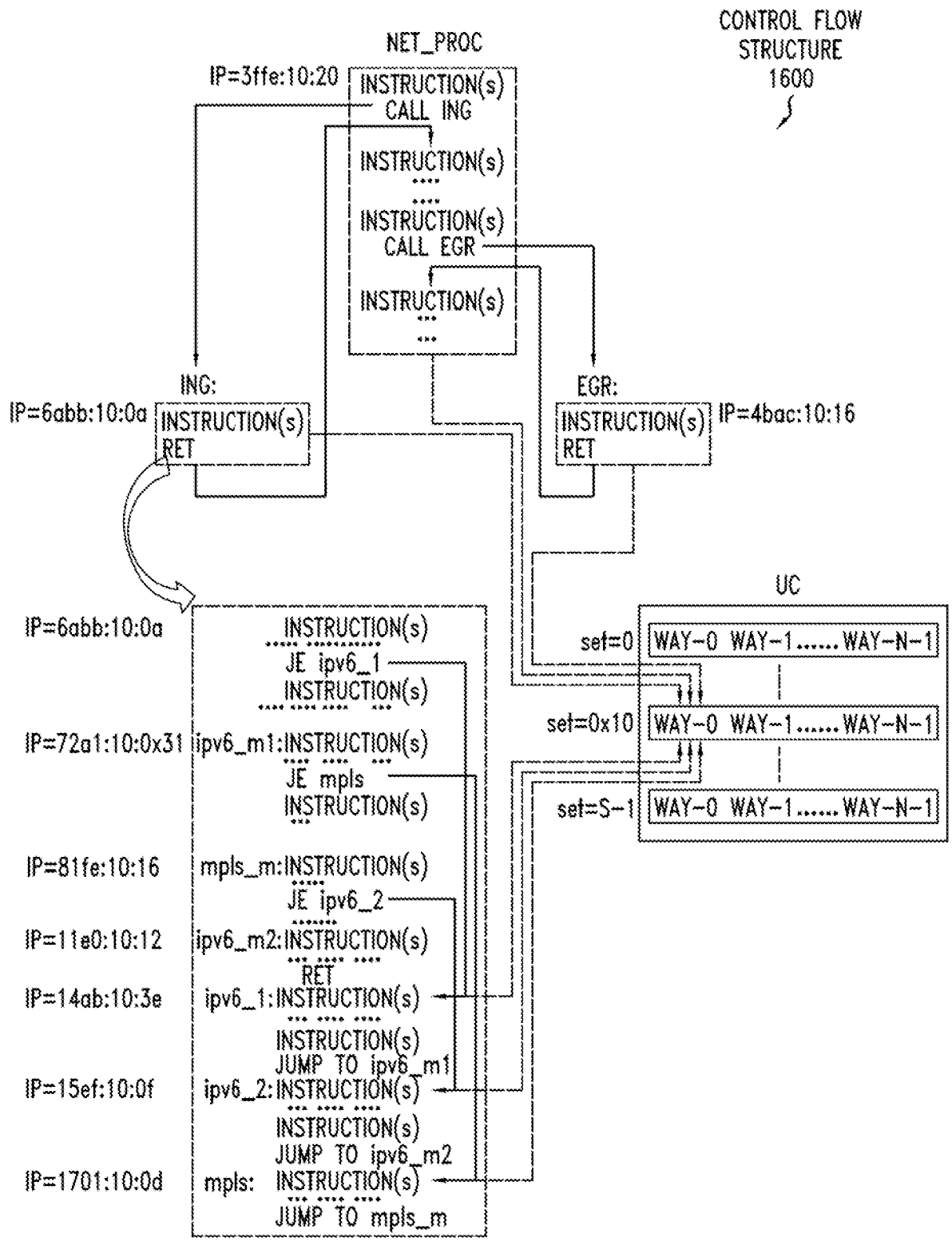
FIG. 16 depicts an example embodiment of the structure of the control flows and resultant control blocks for executing the network packet processing program of FIG. 15 using a single micro-operations cache.

FIG. 16 depicts the structure of the control flows for executing the network packet processing program of FIG. 15.

As depicted in the control flow structure 1600 of FIG. 16, the processor executes the instructions in NET_PROC sequentially until the instruction CALL ING. The CALL ING instruction interrupts the flow of NET_PROC by passing control to the subroutine that is specified after the CALL (namely, ING). Then the instructions in ING are executed. Upon completion of the execution of the instructions in ING, the processor executes a RET instruction to return to the next instruction in NET_PROC after the CALL ING instruction. The processor then executes the instructions in NET_PROC sequentially until the instruction CALL EGR. The CALL EGR instruction interrupts the flow of NET_PROC by passing control to the subroutine that is specified after the CALL (namely, EGR). Then the instructions in EGR are executed. Upon completion of the execution of the instructions in EGR, the processor executes a RET instruction to return to the next instruction in NET_PROC after the CALL EGR instruction. The above process is repeated by the processor for every incoming packet.

As depicted in FIG. 16, within NET_PROC, ING, and EGR, the sequential execution of instructions can be interrupted by branch instructions. Within ING, the processor executes the instructions sequentially until it hits the JE ipv6_1 instruction. If the packet is an IPv6 packet, then this JE instruction switches the execution sequence to the control block labeled as ipv6_1. After executing the sequence in the ipv6_1 control block, it uses a JUMP instruction to merge back to the primary instruction sequence at the instruction labelled as ipv6_m_1. The sequence executes until it hits the JE mpls instruction. If the packet is an MPLS packet, then this JE instruction switches the execution to the control block labelled as mpls. After executing the sequence in the mpls control block, it uses a JUMP instruction to merge back to the primary instruction sequence at the instruction labelled as mpls_m. The sequence executes until the JE ipv6_2 instruction. If the packet is an IPv6 packet, then this JE instruction switches the execution sequence to the control block labeled as ipv6_2. After executing the sequence in the ipv6_2 control block, it uses a JUMP instruction to merge back to the primary instruction sequence at the instruction labelled as ipv6_m_2. It will be appreciated that, while FIG. 16 describes only two top level conditional branches for handling of IPv6 packets in ING (for purposes of clarity), there could multiples of such branches for the same condition (e.g., IPv6, MPLS, or the like) and, further, a top-level conditional branch can have nested branches within. It also will be appreciated that similar control flows may exist within EGR as well (again, omitted from FIG. 16 for purposes of clarity).

It is noted that the above-described pattern of control flows in the NET_PROC can lead to severe conflict misses in UC. For example, in FIG. 16, to process an incoming packet, the instructions in NET_PROC starts at IP=3ffe:10: 20 (read in format IP-tag: IP-index: IP-offset). The instructions in NET_PROC are fetched, decoded, stored in UC, and executed in sequence until CALL ING. The subset of instructions in NET_PROC so far that share the same IP-index 0x10 are stored in the set 0x10 in UC. CALL ING switches the instruction sequence to ING starting at IP=6abb:10:0a, which bears the same IP-index 0x10. The instructions in ING are fetched, decoded, and stored in the same UC sets which also stored the instructions from NET_PROC. It is possible that, to store the instructions of ING, some or all UC lines occupied by instructions from NET_PROC are evicted due to non-availability of free UC lines in a set. For example, assume that the packet type is IPv6. Then, within ING, the JE ipv6_1 instruction switches the instruction sequence to control block ipv6_1 that starts at IP=14ab:10:3e. The instructions in control block ipv6_1 are fetched, decoded, and stored in the same UC sets which are occupied by instructions in ING so far. It is possible that, to store the instructions in ipv6_1 control block, some or all UC lines in those sets are evicted. After executing the sequence in ipv6_1 control block, the JUMP instruction merges back the execution at the instruction labeled as ipv6_m_1, which is at IP=72a1:10:0x31. So, subsequent instructions are stored in the same UC sets which also stored the instructions in ipv6_1 control block. It is possible that, to store the instructions of ipv6_m_1, some or all UC lines occupied by instructions from ipv6_1 in the common sets are evicted. Similar thrashing behavior may be observed when the control flow jumps back and forth for this IPv6 packet between control blocks ipv6_2 and ipv6_m2. Subsequently, when EGR is called by NET_PROC, the same pattern of thrashing may occur in the UC.

In view of the foregoing, it will be appreciated that, while processing every incoming packet, a majority of the instructions in the control blocks NET_PROC, ING, EGR, ipv6_1, ipv6_m_1, ipv6_2, ipv6_m2, mpls, mpls_m, and so forth may have to be fetched again from L1-IC, decoded, and stored into the UC. The location of the control blocks in the program memory are dependent on the structure of the program, which is independent of the underlying micro-architecture of the processor, especially since the micro-architecture implementation of a UC is not visible to the program. For example, the number of bits in the IP-tag, IP-index, and IP-offset fields for the UC may vary between micro-architectures, which changes the runtime foot print of a working set in the UC between respective micro-architectures. On the other hand, modifications in the program code can relocate addresses of control blocks, which changes the runtime foot print of the working set in a specific UC. It is noted that, in the context of NET_PROC, conflict misses in the UC may impact the NET_PROC program in following ways: (1) increasing the number of cycles in processing instructions, which increases the latency of the packets in the router, (2) increasing, the power consumption (e.g., by 28%), which increases the operational cost in terms of power, and (3) decreasing the instruction fetch throughput (e.g., by 33%), which decreases the packet processing throughput (e.g., by 33%).

It will be appreciated that the forwarding plane of a high-performance NFV router generally is required to consistently process and forward packets with minimum latency and with the least power consumption in order to meet optimal operational cost per bit. As such, the forwarding plane of such a high-performance NFV router generally has to extract the peak performance of the processor that is running the forwarding plane of the high-performance NFV router. As discussed further below, various example embodiments presented herein may be configured to support improved performance of high-performance NFV routers based on use of a processor configured to provide programmable control to super high-performance programs (e.g., based on use of an SP-UC including multiple UCs, as well as associated control capabilities supporting use of such an SP-UC including multiple UCs) in a manner for reducing or even minimizing conflict misses due to interference between control blocks of programs being executed by the processor.

Various example embodiments of a processor may be configured to support split programmability of resources of a processor. Various example embodiments of a processor may be configured to support split programmability of resources of a processor frontend of the processor. Various example embodiments of a processor may be configured to support split programmability of resources of a processor frontend of the processor in a manner enabling assignment of split programmable resources of the frontend of the processor to control blocks of a program being executed by the processor.

Various example embodiments of a processor may be configured to support split programmability of resources of a processor. Various example embodiments of a processor may be configured to support split programmability of resources of a processor for super high-performance applications of class A or class B in a manner for reducing or even eliminating conflict misses between critical control blocks in a working set. Various example embodiments of a processor may be configured to support split programmability of resources of a processor based on a paradigm for employing UC in a processor to minimize conflict misses between such critical control blocks. Various example embodiments of a processor may be configured to support split programmability of resources of a processor based on techniques in the architecture (i.e., ISA) and in the micro-architecture for implementation of a paradigm for employing UC in a processor to minimize conflict misses between such critical control blocks. The techniques may result in improved and guaranteed performance in the frontend of the processor for super high-performance applications, while also conserving more power in the frontend of the processor.

Various example embodiments of a processor, as indicated above, may be configured to support split programmability of a UC of a frontend of the processor. Various example embodiments of a processor may be configured to support split programmability of a UC of a frontend of a processor based on use of a UC bank containing multiple UCs where each UC in the bank is uniquely identifiable (e.g., identified with a numeric identifier) and, thus, programmable by the programs which may be executed by the processor. For example, if there are P number of UCs in the bank then UCs can be assigned identifiers as 0, 1 . . . , (P–1). At any point during the execution of the program, only one of the UCs in the bank is active i.e., used to store or access UOPs. For example, if UC-1 is the currently active UC in the UC bank, then the decoders store UOPs to UC-1 only. While fetching an IP, UC-1 is only looked up for the matching UC line. The active UC in the set is selected by a special instruction in the program that encodes the identifier of the UC to be set as active. The special instruction could be an exclusive instruction for purpose of switching the active UC or could be an existing control instruction enhanced to encode the identifier of the UC. Any of these special instructions may be termed as a "UC switch instruction" which is included in the instruction set of the ISA of the processor. When a UC switch instruction is decoded or is accessed in UC-K, it switches the active UC from UC-K to UC-M, wherein UC-M is the UC identifier encoded in the UC switch instruction. Subsequent instructions that are fetched after the UC switch instruction are stored and accessed in the UC-M until another UC switch instruction again switches the active UC. It is noted that the switching of active UC from UC-K to UC-M happens before subsequent instructions are fetched, which also means that UC switch instruction is not yet executed by the backend of the processor. Thus, switching of active UC may take place when the UC switch instruction is a hit in UC-K, or during the decode phase of the UC switch instruction (i.e., the UC switch instruction is a miss in UC-K, so it is fetched through the L1-IC→IFU→ILD→IQ→MITE path and stored into UC-K), so that subsequently fetched instructions are stored or accessed in UC-M. This paradigm of the UC is referred to herein as the Split Programmable Micro-Operations Cache (SP-UC) where it is considered to be "split" since there are multiple UCs and it is considered to be "programmable" since selection of the active UC is controllable by the program executed by the processor.

Various example embodiments of a processor, as indicated above, may be configured to support split programmability of a UC of a frontend of the processor based on SP-UC. In general, SP-UC enables a program to pin a specific control block to a specific UC-M. Once pinned, instructions in the control block are accessed or stored in UC-M. Assume, for example, that before transferring control to the control block, the active UC is UC-K. Then while transferring control to the control block, the program invokes a UC switch instruction encoded with UC-M which changes the active UC from UC-K to UC-M. Subsequently, all instructions in the control block get pinned to UC-M. On completion of execution of the control block, the active UC can be restored back from UC-M to UC-K while transferring control to the original sequence in the parent program. With this method, the program can pin performance critical control blocks into mutually exclusive UCs in the bank, thus eliminating conflict misses due to interference among them. This method also increases the spatial locality of the working set in each UC since control blocks are sequence of instructions within a narrower region in program memory. In a set associative cache, rate of conflict miss is inversely proportional to the spatial locality of the working set of the cache. If number of critical control blocks are higher than number of UCs in SP-UC, then multiple control blocks could be pinned to share a specific UC. Such control blocks are termed as an "affinity group" and it will be appreciated that conflict misses may occur due to interference among sibling control blocks within an affinity group, but should not occur between control blocks that are not part of an affinity group. The program may keep the sibling control blocks in an affinity group spatially collocated in program memory, which minimizes interference among the blocks and, thus, further reduces or eliminates conflicts misses. This approach provides absolute control to a program to distribute its control blocks among the UCs in a way that achieves improved or even optimal performance of the program.

Figure 17:
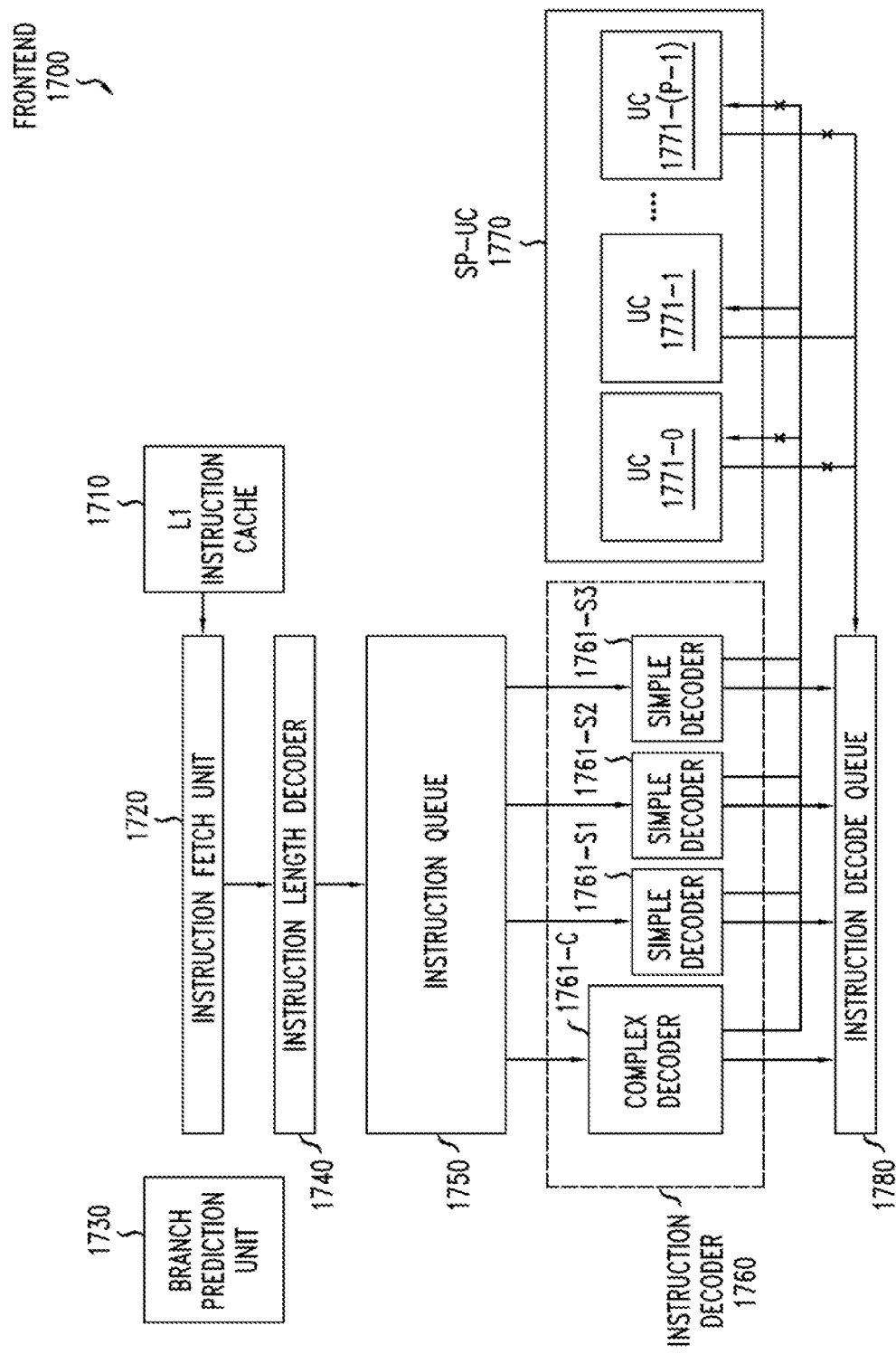
FIG. 17 depicts an example embodiment of a frontend of a processor configured to support split programmability and including a split programmable micro-operations cache.

It will be appreciated that these and various other embodiments and advantages of split programmability may be further understood by considering a frontend of a processor configured to support split programmability and including a split programmable micro-operations cache, as presented in FIG. 17.

FIG. 17 depicts an example embodiment of a frontend of a processor configured to support split programmability and including a split programmable micro-operations cache.

The frontend 1700 of FIG. 17 includes an L1-IC 1710, an IFU 1720, a BPU 1730, an ILD 1740, an IQ 1750, an ID 1760, a split-programmable (SP) UC (SP-UC) 1770 (including a set, or bank, of UCs 1771-0-1771-(P−1), and an IDQ 1780. It will be appreciated that, in general, the operation of the components of frontend 1700 of FIG. 17, unless indicated otherwise (e.g., for supporting split programmability of UC resources), may be similar to the operation of the corresponding components of frontend 200 of FIG. 2, respectively.

The frontend 1700, as indicated above, is configured to support split programmability of various resource types of the frontend 200, including support for a split programmable UC (illustratively, SP-UC 1770). It will be appreciated that the operation of frontend 200 using split programmability of UC resources (e.g., as presented with respect to FIGS. 17-31) may be further understood by first considering the operation of L1-IC 210 (as presented with respect to FIGS. 4-5), the operation of single UC 370 (as presented with respect to FIGS. 6-12), and the use of a processor based on operation of L1-IC 310 as presented with respect to FIGS. 4-5 and operation of single UC 370 as presented with respect to FIGS. 6-12 to support execution of a program (as presented with respect to FIGS. 13-16).

Various embodiments for supporting operation of a processor based on an SP-UC (such as SP-UC 1770 of frontend 1700 of FIG. 17) are configured to support a UC switch instruction. The UC switch instruction may be supported in the architecture of the processor (e.g., for the instruction set of an ISA of the processor). A UC switch instruction may be configured to encode a UC index as the UC to be switched as active. A UC switch instruction may be implemented using an exclusive UC switch instruction or enhancing an existing control instruction of the ISA of the processor.

In at least some embodiments, a UC switch instruction may be implemented using an exclusive UC switch instruction. An exclusive UC switch instruction switches the active UC without changing the execution sequence. This means subsequent instructions will be stored and/or accessed in the UC (e.g., one of the UCs 271) selected by this UC switch instruction. This type of instruction is denoted herein as "UC Switch Type-1".

In at least some embodiments, a UC switch instruction may be implemented using an existing control instruction of the ISA of the processor. An existing control instruction of the ISA of the processor may be enhanced with UC switching functionality. An existing control instruction of the ISA of the processor switches UCs while jumping the execution sequence to a control block. So, existing control instructions that jump the execution sequence to a control block (e.g., in x86, instructions such as JUMP, JE, CALL, and so forth) may be used for this purpose. This type of instruction is denoted herein as "UC Switch Type-2".

As discussed herein, the SP-UC is a component of the microarchitecture of a processor, whereas the UC switch instructions are part of the processor architecture/ISA. As such, UC switch instructions as described herein do not necessarily need to be limited to use in controlling splitting and programmability of the UC to provide an SP-UC and associated switching between UCs of the SP-UC; rather, these UC switch instructions may be used for controlling splitting and programmability of other types of processor resources and associated switching between portions of such other types of processor resources. These other resources may include other processor frontend resources in addition to the UC resources, such as the branch predictor, the branch target buffer, or the like. It also will be appreciated that various combinations of such processor frontend resources may be split and programmed in accordance with various embodiments presented herein. Accordingly, the UC switch instructions which are provided for the purpose of supporting splitting and programmability of UC resources of the processor frontend may be generalized as "resource switch instructions" or "color switch instructions" that represent a more general capability to control splitting and programmability of various processor frontend resource types for use by control blocks of programs executed by the processor and, thus, also a capability for the program being executed to attribute a "color" to a control block such that the control block is then able to use resources of that color (namely, for any of one or more resource types for which splitting and programmability are supported, respective portions of the respective resource type that have that color). In such embodiments, rather than a UC index identifying a UC for the control block being encoded within the instruction, a color index identifying a color (and, thus, the associated processor frontend resources) for the control block is encoded within the instruction. In this manner, from the perspective of the processor architecture, the colors provide a notion of pools of resources within the processor such that, when the program assigns a color to a control block, then the control block is allocated the resources of that color (e.g., one or more of UC resources in the form of a UC of an SP-UC, branch predictor resources of a branch predictor, branch target buffer resources of a branch target buffer, or the like, as well as various combinations thereof). It will be appreciated that multiple control blocks of a program may share a color (and may be referred to as an affinity group) such that the multiple control blocks are each assigned the set of resources of the assigned color. In the context of SP-UC, the color index is 1:1 mapped to a UC index (namely, SP-UC is the pool of UCs wherein each UC is assigned a color index). It will be appreciated that, given the generalization of the splitting and programmability of the UC resources to other types of resources based on color, more generic versions of the UC switch instruction also may be introduced. Namely, to support splitting and programmability of various processor frontend resource types, color switch instructions may be defined to include a "Color Switch Type-1" instruction (e.g., more generic version of the "UC Switch Type-1" instruction) and a "Color Switch Type-2" instruction (e.g., a more generic version of the "UC Switch Type-2" instruction). It will be appreciated that, in the case of splitting and programmability of various resource types based on color, where the resource being split is the UC to provide an SP-UC, the color switch instructions may then act as UC switch instructions initially introduced above (e.g., where the color value indicates the UC index in the SP-UC). It will be appreciated that the color switch instructions may be implemented using various processor ISAs; however, for purposes of clarity in describing various embodiments of color-based splitting and programmability of processor frontend resources, the color switch instructions (including implementation of the color switch instructions as UC switch instructions for supporting the SP-UC) are primarily described within the context of a specific ISA (namely, x86). It will be appreciated that encoding of color switch instructions in x86 may be further understood by first considering the encoding of x86 instructions in general, as depicted in FIG. 18.

Figure 18:
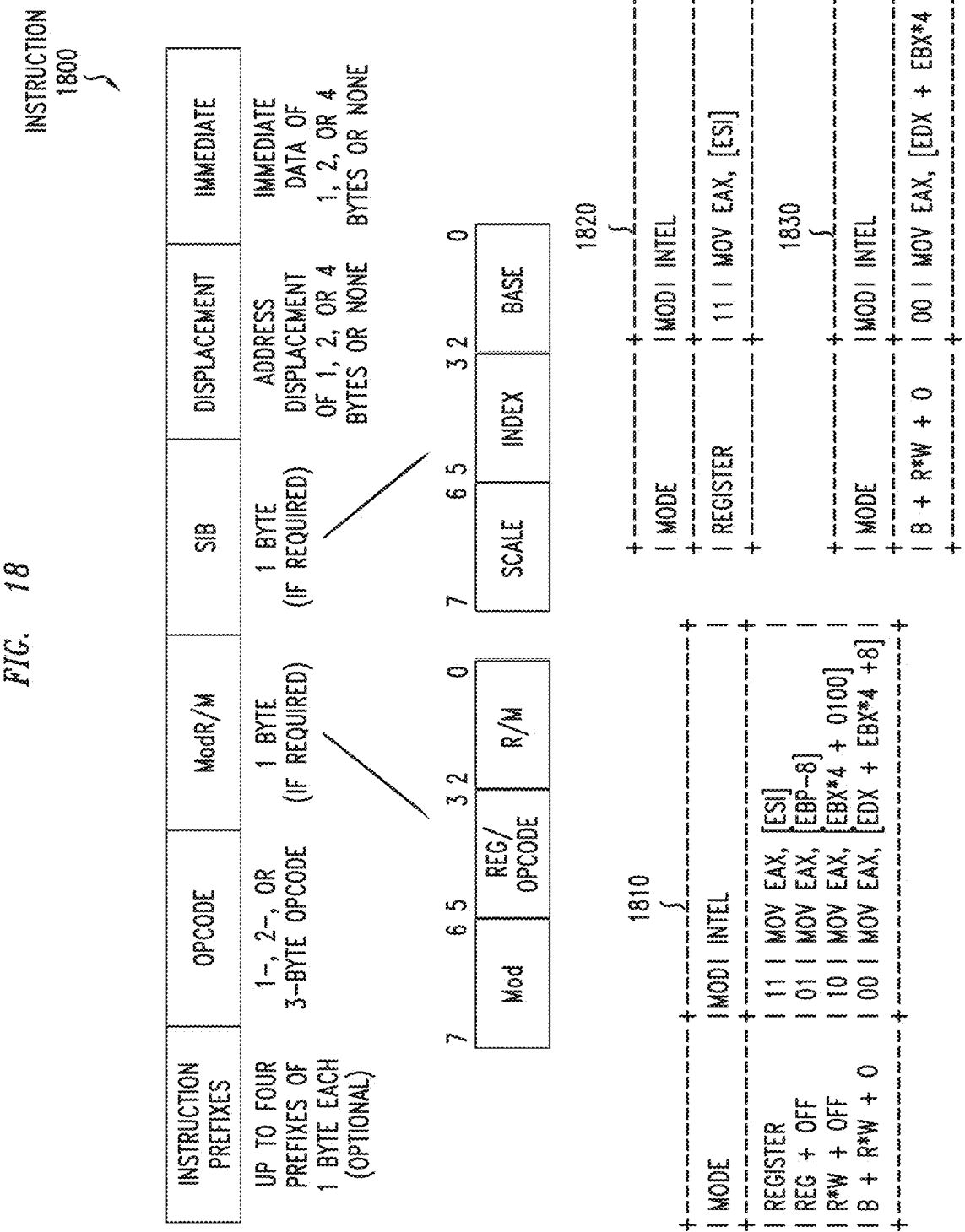
FIG. 18 depicts an example embodiment of encoding of x86 instruction set architecture instructions for illustrating encoding of color switch instructions configured to support splitting and programmability of processor frontend resources.

FIG. 18 depicts encoding of x86 instruction set architecture instructions for illustrating encoding of color switch instructions configured to support splitting and programmability of processor frontend resources.

As depicted in FIG. 18, an instruction 1800 includes a number of fields, including an Instruction Prefixes field, an Opcode field, a ModR/M field, a SIB field, a Displacement field, and an Immediate field.

The Opcode field is a single byte denoting the basic operation of the instruction. Thus, this field is mandatory and allows up to a 256 primary op code map. For example, 0x74 is the opcode for JE instruction for short jumps (i.e., conditional jump to location within relative offset of 0x7f in program memory). Alternate opcode maps are defined using escape sequences which require 2-3 bytes in the Opcode field. For example, an escape sequence is a 2-byte opcode encoded as [0f<opcode>]. Here 0f identifies the alternate opcode map. For example, 0f 84 is the opcode for JE instruction for near jumps (i.e., conditional jump to location that is too far away for a short jump to reach).

The ModR/M field is a 1-byte optional field with semantics of Mode-Register-Memory. If the instruction has an operand (i.e., based on the Opcode), then this field specifies the operand(s) and their addressing mode. The bits in this field are divided into following:
  Mod: bits 6-7 describe the 4 addressing modes for memory operand, which are shown in FIG. 18 in the context of a MOV instruction 1810. The MOV instruction as shown by 1810 of FIG. 18 transfers data between memory and register EAX.
  Reg: bits 3-5 specify the source or destination register. This allows encoding of the eight general purpose registers in the x86 architecture.
  R/M: bits 0-2, combined with Mod field, specify either, the second operand in a two operand instruction or the only operand in a single operand instruction (e.g., NOT or NEG). In the case of the two operand instruction, this field would encode the ESI register as shown by 1820 of FIG. 18. Register EAX would be encoded in Reg field.

The SIB field is a 1-byte optional field with semantics of Scale-Index-Base. This field is used for scaled indexed addressing mode (specified in Mod), as in the example shown by 1830 of FIG. 18.

Here, Scale=4 (the scale factor), Index=EBX (the register containing the index portion), and Base=EDX (the register containing the base portion).

The Displacement field is a variable length field of 1, 2, or 4 bytes. It has multiple uses cases such as: (1) in the example described for SIB, this field contains the non-zero offset value 8 or (2) in control instructions, it contains the address of a control block in program memory in either (a) the absolute value (i.e., added to the base of program memory address) or (b) relative value (i.e., offset from the address of the control instruction).

The Immediate field is a variable length field that contains a constant operand of an instruction. For example, in an instruction that adds 8 to register EAX (namely, instruction "MOV EAX, 8"), the Immediate field would contain the value 8.

The Instruction Prefixes field is a variable length optional field that can contain up to 4 prefixes, where each prefix is 1-byte field. This field changes the default operation of x86 instructions. For example, 66h is an "Operand Override" prefix, which changes the size of data expected by default mode of instruction (e.g., a change from 64-bit to 16-bit). It will be appreciated that the x86 ISA currently supports the following prefixes:
  Prefix group 1
    0xF0: LOCK prefix
    0xF2: REPNE/REPNZ prefix
    0xF3: REP or REPE/REPZ prefix
  Prefix group 2
    0x2E: CS segment override
    0x36: SS segment override
    0x3E: DS segment override
    0x26: ES segment override
    0x64: FS segment override
    0x65: GS segment override
    0x2E: Branch not taken
    0x3E: Branch taken
  Prefix group 3
    0x66: Operand-size override prefix
  Prefix group 4
    0x67: Address-size override prefix A "Color Switch Type-1" instruction may be used for controlling splitting and programmability of processor frontend resources and associated switching between portions of such processor frontend resources. A "Color Switch Type-1" instruction may be considered to be a more generic version of a "UC Switch Type-1" instruction (which is specific to splitting and programmability of UC resources of the processor frontend) and, thus, may be configured to switch the active processor frontend resource without changing the execution sequence. A "Color Switch Type-1" instruction, like a "UC Switch Type-1" instruction, may be implemented using an exclusive switch instruction. A "Color Switch Type-1" instruction, like the "UC Switch Type-1" instruction, may be used in various ISAs, such as x86 and others. An example implementation of a "Color Switch Type-1" instruction in the x86 ISA is presented in FIG. 19.

FIG. 19 depicts an example embodiment of a "Color Switch Type-1" instruction implemented using the x86 instruction set architecture. As depicted in FIG. 19, "Color Switch Type-1" instruction 1900 only includes the Opcode and Immediate fields. It will be appreciated that, since this is a new instruction, a currently unassigned value from the existing Opcode maps may be allocated to indicate the "Color Switch Type-1" instruction. The 1-byte immediate field is encoded with the index of the color to be switched to as active. This "Color Switch Type-1" instruction may be denoted with a mnemonic (e.g., "CLCHG" or another suitable value) in order to indicate that the instruction is a "Color Switch Type-1" instruction. An example of a "Color Switch Type-1" instruction in an x86 instruction sequence 2000 is presented in FIG. 20.

A "Color Switch Type-2" instruction may be used for controlling splitting and programmability of processor frontend resources and associated switching between portions of such processor frontend resources. A "Color Switch Type-2" instruction may be considered to be a more generic version of a "UC Switch Type-2" instruction (which is specific to splitting and programmability of UC resources of the processor frontend) and, thus, may be configured to switch the active processor frontend resource while jumping the execution sequence to a control block. A "Color Switch Type-2" instruction, like a "UC Switch Type-2" instruction, may be implemented by enhancing an existing control instruction of the ISA of the processor with resource switching functionality. A "Color Switch Type-2" instruction, like a "UC Switch Type-2" instruction, may be used in various ISAs, such as x86 and others. An example implementation of a "Color Switch Type-2" instruction in the x86 ISA is discussed further below.

As indicated above, implementation of a "Color Switch Type-2" instruction in the x86 ISA may be based on enhancement of existing x86 ISA control instructions for the functionality of the "Color Switch Type-2" instruction. For example, a new instruction prefix group may be defined as follows (although it will be appreciated that other prefix group definitions may be used): Prefix group 6 (0x80: Colored-Segment-Prefix-Base+<Color index>=Colored-Segment-Prefix). Here, the active processor frontend resource (e.g., UC of an SP-UC) is identified by the Colored-Segment-Prefix value. For example, assuming that the processor supports 8 UCs in an SP-UC, then the value 0x80 indicates the UC-0, the value 0x87 indicates UC-8, and so forth. In x86, when a control instruction is encoded as a "Color Switch Type-2" instruction, then the mnemonic of the instruction is prepended with an indicator (e.g., "C" or another suitable value) in order to indicate that the control instruction is a "Color Switch Type-2" instruction. For example, where "C" is used as the prepended indicator, a JUMP instruction that is encoded as a "Color Switch Type-2" instruction would be denoted with mnemonic CJUMP. Similarly, RET as CRET, JE as CJE, JLE as CJLE, CALL as CCALL, and so forth. An example of "Color Switch Type-2" instructions in an x86 instruction sequence 2100 is presented in FIG. 21 (which illustrates a program that starts with a "main" control block).

A processor that supports splitting and programmability of processor frontend resources based on colors may be configured to provide, to programs to be executed by the processor, an indication of the number of colors supported. This will enable the program to dynamically assign colors to its control blocks based on the number of colors supported. The processor may inform the program of the number of colors supported in a number of ways, such as by advertising the number of colors such that the program can discover this information, responding to requests for the number of colors from the program, or the like, as well as various combinations thereof. It will be appreciated that the manner in which the processor informs the program of the number of colors supported may vary across different ISAs. In an x86 ISA, for example, the CPUID (CPU Identification) instruction that allows software to discover details of the processor may be enhanced for this purpose. The CPUID instruction takes no parameters, as CPUID implicitly uses the EAX register in x86 to determine the main category of information returned (sometimes referred to as the CPUID leaf). The CPUID may be called with EAX=0 first, as this will return in the EAX register the highest EAX calling parameter (leaf) that the processor supports. The existing paradigm of CPUID can be extended by adding the number of supported colors as a new leaf. It will be appreciated that the manner in which the processor inform the program of the number of colors supported may be different for other ISAs.

Figure 22:
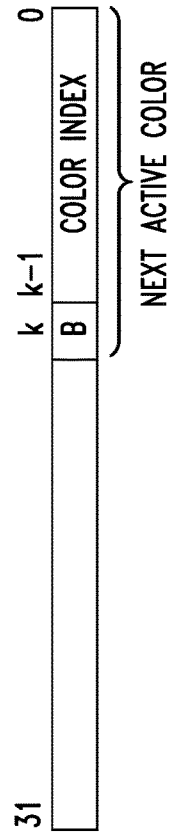
FIG. 22 depicts an example embodiment of a "Color Switch UOP" generated based on decoding of a "Color Switch" instruction.
Figure 23:
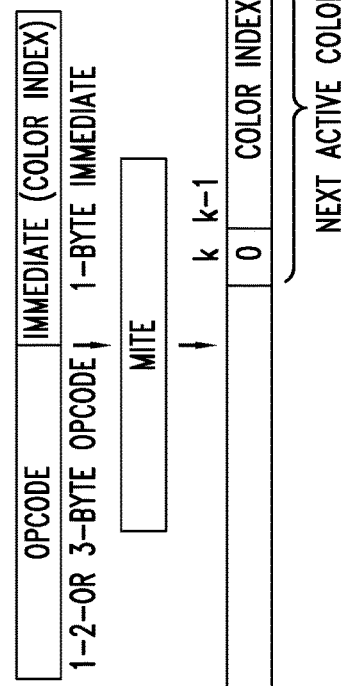
FIG. 23 depicts an example embodiment of decoding of a "Color Switch Type-1" instruction.

The decoding of Color Switch instructions results in generation of a Color Switch UOP, an example of which is presented as Color Switch UOP 2200 in FIG. 22. It will be appreciated that the exact structure of the fields within a Color Switch UOP is dependent on the underlying micro-architecture of the processor. So, the exact structure of its fields is not defined herein, but, rather, may be defined based on the underlying micro-architecture of the processor. However, rules for encoding of the next active color in the Color Switch UOP are provided herein. In at least some embodiments, for example, the next active color may be encoded in the Color Switch UOP using a Color Index field and a Branch-bit (B-bit) field (both of which are illustrated in FIG. 22). The Color Index field is a k-bit field that encodes the index of the next active color, where the number k is dependent on the number of colors supported by the processor (e.g., the number of UCs in the SP-UC). For example, if the SP-UC contains 8 UCs, then k=3 since the 8 different UCs may be uniquely identified using a 3-bit field. The B-bit field is configured to provide an indication as to whether the active color is switched or whether the active color is switched only when the execution sequence is branching to another control block after this UOP (e.g., "1" may be used to indicate that the active color is switched to the Color Index only if the execution sequence is branching to another control block after this UOP and "0" may be used to indicate that the active color is switched to the Color Index without a condition, or vice versa).

As indicated above, the decoding of a Color Switch instruction results in generation of a Color Switch UOP. A "Color Switch Type-1" instruction is decoded to a Color Switch UOP. A "Color Switch Type-1" instruction may be decoded to the Color Switch UOP depicted in FIG. 23. The decoding of a "Color Switch Type-1" instruction to the Color Switch UOP in x86 may be performed as follows: (1) the decoder, when it finds the Opcode as Color Switch Type-1, generates a Color Switch UOP, (2) the decoder copies the Immediate (Color Index) field from the instruction to the Color index bits in the UOP, and (3) the decoder sets the B-bit to 0.

Figure 24:
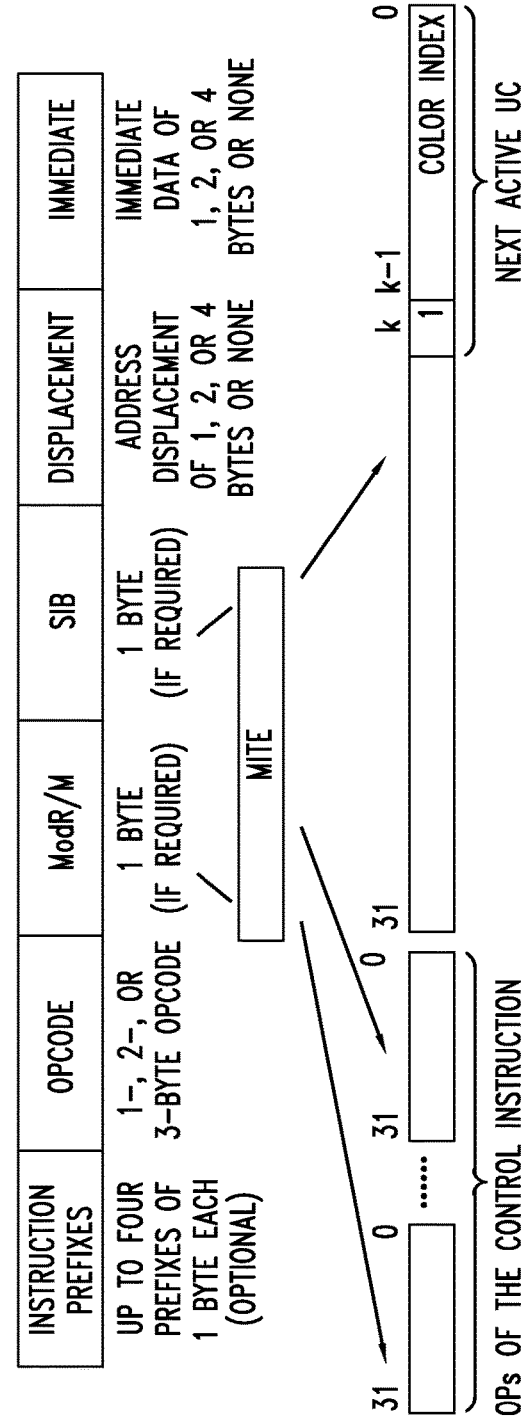
FIG. 24 depicts an example embodiment of decoding of a "Color Switch Type-2" instruction.

As indicated above, the decoding of a Color Switch instruction results in generation of a Color Switch UOP. When a "Color Switch Type-2" instruction is decoded, it generates a Color Switch UOP in addition to the UOPs that would otherwise be generated by the underlying (non-color version of the) control instruction. During decoding, the B-bit in the Color Switch UOP is set to 1 (since the next active Color is switched only if branching to a control block after fetching this instruction) and the Color Switch UOP is the last UOP among the decoded UOPs. A "Color Switch Type-2" instruction may be decoded to the Color Switch UOP and one or more other instructions as depicted in FIG. 24. The decoding of a "Color Switch Type-2" instruction in x86 may be performed as follows: (1) the decoder, if the Opcode is one of the control instructions, decodes the control instruction generate the UOPs, (2) the decoder, if the instruction contains a Colored-Segment-Prefix, adds a Color Switch UOP to the list of already decoded UOPs, (3) the decoder sets the Color Index in the Color Switch UOP as =Colored-Segment-Prefix−Colored-Segment-Prefix-Base, and (4) the decoder sets the B-bit to 0.

The processor may be configured with a micro-architecture configured to support splitting and programmability of processor frontend resources and associated switching between portions of such processor frontend resources. For purposes of clarity, the micro-architecture of the processor that is configured to support splitting and programmability of processor frontend resources and associated switching between portions of such processor frontend resources is primarily presented herein within the context of use of generic color switch instructions for the implementation of an SP-UC (such that it will be appreciated that references to the color switch instructions may be considered to be references to UC switch instructions which may be specific to UCs of an SP-UC). An example embodiment of a micro-architecture for implementation of an SP-UC is presented in FIG. 25.

Figure 25:
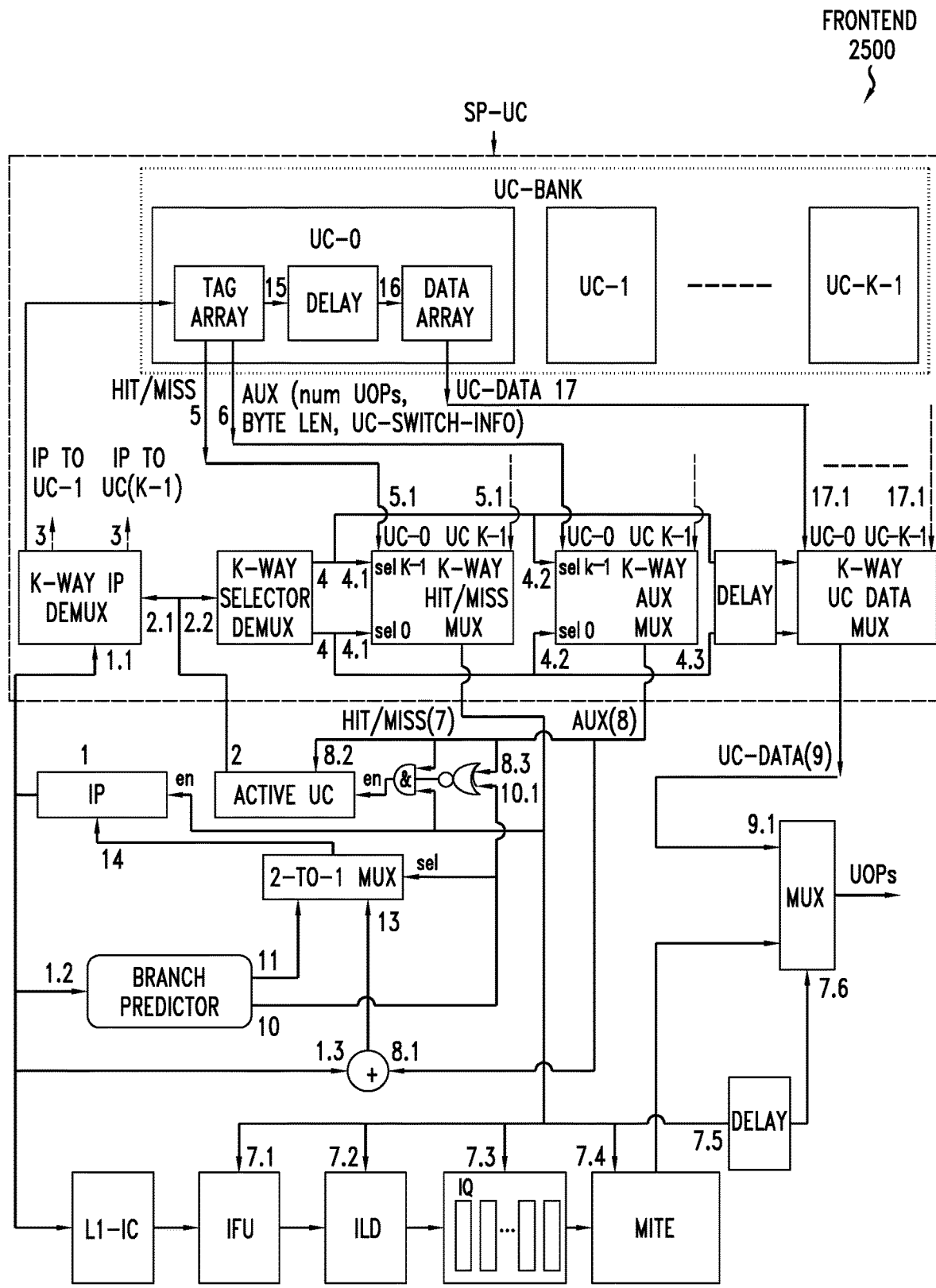
FIG. 25 depicts an example embodiment of a frontend of a processor for illustrating a micro-architecture configured for implementation of a split programmable micro-operations cache.

FIG. 25 depicts an example embodiment of a micro-architecture for implementation of an SP-UC. The SP-UC, as previously discussed, includes a bank of UCs and the circuitry to manage the inputs and outputs of individual UCs within the UC bank. The UC bank consists of K number of UCs (which are denoted as UC-0 through UC-K-1). In turn, each UC is implemented with N-way set associative UC-Tag and UC-Data arrays, similar to the micro-architecture presented in FIG. 6 (which, for purposes of clarity, is not expanded in FIG. 25). However, in the SP-UC of FIG. 25, the UC-Tag and UC-Data (i.e., UC line) entries may have following additional rules:

Rule 1: A Color Switch instruction (namely, a "Color Switch Type-1" instruction or "Color Switch Type-2" instruction) terminates a basic block. That means there can be only one Color-Switch-UOP in a UC-Line. This rule enables UC switching operations to be handled at per UC line granularity.

Rule 2: Auxiliary data in UC-Tag additionally keeps UC switch information as follows: UC-Switch-Info={UC-Index, B-bit, Valid-bit}. If the UC-Line corresponding to the UC-Tag contains a Color-Switch-UOP then Valid-bit is set to 1. The UC-index and B-bit are copied from Color Index and B-bit, respectively, from the Color-Switch-UOP in that UC-Line.

It is noted that these additional rules are expected to result in considerable simplification and efficiency of the micro-architecture of the SP-UC.

As depicted in FIG. 25, the SP-UC may be configured to provide improved IP lookup. The lookup of an IP based on the SP-UC may have various SP-UC inputs and outputs associated therewith. The inputs to the SP-UC are IP and Active UC. The Active UC Register contains the UC index for the current IP. The outputs from the SP-UC are Hit/Miss status, UC-Data, and Auxiliary Data. The lookup of an IP in the SP-UC may consist of various steps performed in one or two cycles. In the first cycle (which may be denoted as Cycle-1), a UC-Tag lookup is performed (as discussed in Steps 1-12 below), an L1-IC lookup is performed (as discussed in Step 13 below), a computation of a next-IP for SP-UC is performed (as discussed in Steps 14-17 below), and a computation of a next active UC for the SP-UC is performed (as discussed in Steps 18-20). In the second cycle (which may be denoted as Cycle-2), which is only performed if there is a hit in the UC-Tag array in the first cycle, i.e., if Hit/Miss from SP-UC results in a Hit), an SP-UC data fetch is performed (as discussed in Steps 21-23 below) and a next UC-Tag lookup is performed (as discussed in Steps 24-26 below). It will be appreciated that these steps describe the signal flow across the SP-UC of the frontend 2500 of FIG. 25.

In Cycle-1 of the lookup of an IP, a UC-Tag lookup in SP-UC may be performed (as discussed in Steps 1-12 below) as follows:

1. The IP (1) to be looked up is sent as input (1.1) to a K-way IP DeMUX. Each way output of the DeMUX is connected to IP input of a UC (3). The DeMUX activates the only way output that corresponds to the currently active UC, based on the selector input received from the Active UC register (2.1). Thus, the IP is eventually sent to the currently active UC only.

2. UC-Tag array in each UC generates the output lines—Hit/Miss (4) and Auxiliary Data (5). Auxiliary Data consists of num UOPs, Byte Length, UC-switch-info.

3. The Hit/Miss lines from each UC are connected as input (5.1) to a K-way Hit/Miss MUX. Based on the UC selected by the selector input (4.1), the MUX connects the Hit/Miss line from the selected UC as output.

4. The Auxiliary Data lines from each UC are connected as input (6.1) to a K-way Aux MUX. Based on the UC selected by the selector input (5.1), the MUX connects the Auxiliary Data line from the selected UC as output.

5. The Active UC register value is also sent as selector (2.2) to a K-way Selector DeMUX that generates selector lines (4) to control the outputs from the UCs.

6. The selector lines (4) from step 5 are fed as selector input (4.1) to the K-way Hit/Miss MUX (as described in step 3). So, this MUX connects Hit/Miss line from the active UC as the output (7).

7. The selector lines (4) from step 5 are fed as selector input (4.2) to the K-way Aux MUX (as described in step 4). So, this MUX connects Auxiliary Data line from the active UC as the output (8).

8. From the steps 1-7, it is evident that IP is looked up only in the UC-Tag array of the currently active UC. At the end of the cycle, steps 6-7 generate Hit/Miss and Auxiliary Data outputs from the active UC.

9. If there is a Hit in SP-UC, then the UC-Tag in the active UC sends an excitation signal to a Delay Element (15) to read out the corresponding UC-Data entry in the next cycle. This is described in the context of UC-0, irrespective of whether this is the active UC or not.

10. The selector lines (4) from step 5 are fed to a Delay Element (4.3) to control the K-way UC-Data in the next cycle.

11. The Hit/Miss output from SP-UC (7) is sent to IFU (7.1), ILD (7.2), IQ (7.3), and MITE (7.4), which disables the respective units if there is a Hit.

12. The Hit/Miss output from SP-UC (7) is sent to a Delay Element (7.5). In the next cycle, this line acts as selector input to the 2-to-1 MUX that chooses between decode path and SP-UC to send the UOPs to IDQ.

In Cycle-1 of the lookup of an IP, an L1-IC lookup is performed (as discussed in Step 13 below):

13. The IP is also sent in parallel to L1-IC for lookup of the instructions starting at this IP, so that if lookup in SP-UC results in a Miss then the instructions are fed from L1-IC.

In Cycle-1 of the lookup of an IP, a computation of a next-IP for SP-UC may be performed (as discussed in Steps 14-17 below) as follows:

14. The IP is also sent in parallel to the Branch Predictor Unit (BPU) (1.2). By the end of this cycle, the BPU determines if the execution sequence is to branch to another control block after the UC Line for the current IP, which is indicated in the Hit/Miss output (10). If there is a hit, then the next IP (i.e., which is IP for next control block) is indicated in its output (11).

15. The IP also is sent in parallel to an adder (1.3) where the IP gets added to the Byte Len in the Auxiliary Data (8.1) output from the SP-UC by the end of this cycle. This addition results in the next IP (13) in the sequence.

16. The next IP computed from steps 10 and 11 are fed into a 2-to-1 way MUX, wherein the way is selected by the Hit/Miss from the BPU (10). If it is a Hit then the MUX sends 11 to output (14), otherwise it sends 13 to output (14).

17. The Hit/Miss output from SP-UC (7) is input to the 'enable' (en) line of IP, which is synchronized with the clock.

In Cycle-1 of the lookup of an IP, a computation of a next active UC for SP-UC may be performed (as discussed in Steps 18-20 below) as follows:

18. The UC Index from the UC-Switch-Info is sent as data input (8.2) to the Active UC Register.

19. B-bit from the UC-Switch-Info (8.3) and Hit/Miss from the BPU (10.1) are input to a XNOR gate. The output of this gate is 1 if the active UC is to be switched to the UC index in UC-Switch-Info.

20. Valid-bit from UC-Switch-Info, Hit/Miss from SP-UC and output from step 15 are input to an AND gate. The output of the AND gate is input as 'enable' line into Active UC Register, which is synchronized with the clock. The enable line would be set to 1 if the UC-Switch-Info is valid and the UC is to be switched to the UC index in UC-Switch-Info.

In Cycle-2 of the lookup of an IP, an SP-UC data fetch may be performed (as discussed in Steps 21-23 below) as follows:

21. In currently active UC, the excitation signal from the matched UC-Tag that was sent through the Delay Element (at step 9) activates the corresponding UC-Data entry (16). This is described in UC-0, irrespective of whether this is the currently active UC or not.

22. The UC-Data lines from each UC are connected as input (17.1) to a K-way UC-Data MUX. The output of the MUX is controlled by the selector inputs (4.3) that was sent through the Delay Element (at step 10). Based on the selector input from active UC, the MUX connects the UC-Data line from the active UC as output (9).

23. The UC-Data output from step 22 (9) is sent as input (9.1) to the 2-to-1 MUX that selects between SP-UC and decoded path. Since there is a Hit, so the selector to the MUX (7.6) is set to 1, which outputs the UC-Data to the IDQ.

In Cycle-2 of the lookup of an IP, a next UC-Tag lookup may be performed (as discussed in Steps 24-26 below) as follows:

24. Since there is a Hit in UC-Tag lookup in the previous cycle, the 'enable' line (en) input to IP is set, which updates the IP with the input (14) received from step 14.

25. If enable line in Active UC Register is set to 1 then the Active UC Register is updated to the value it received in 8.2.

26. Steps 1-20 is repeated for the current IP and Active UC Register.

It will be appreciated that the numbering of the foregoing steps is provided for purposes of clarity in describing example embodiments and does not necessarily imply an order in which the steps are performed (e.g., at least some of the steps may be performed in a different order, at least some of the steps may be performed contemporaneously, or the like, as well as various combinations thereof).

It will be appreciated that a lookup of an IP may consist of various other steps performed in various other cycles.

It is noted that, for simplicity, FIG. 25 does not indicate how the active UC is switched while UOPs are supplied through the instruction decode path i.e., the build mode when IP misses the SP-UC and so instructions are fetched from L1-IC along the IFU→ILD→IQ→MITE path. As discussed further below, an extension of FIG. 25, in which the UC switching is demonstrated while UOPs are supplied through build-mode, is presented with respect to frontend 2600 of FIG. 26.

Referring again to FIGS. 2 and 17, it will be appreciated that the frontend 200 of FIG. 2 and the frontend 1700 of FIG. 17 are configured to support a build-mode of operation that supports fetching and decoding instructions through the path L1-IC→IFU→ILD→IQ→MITE and storing them to the SP-UC in parallel to supply to IDQ.

It will be appreciated that a mode switch occurs at the frontend (e.g., frontend 200 of FIG. 2 or frontend 1700 of FIG. 17) when moving between the stream-mode and the build-mode. For example, when the frontend is in stream-mode and a UC-Tag lookup results in a miss, the frontend will switch to the build-mode.

Figure 26:
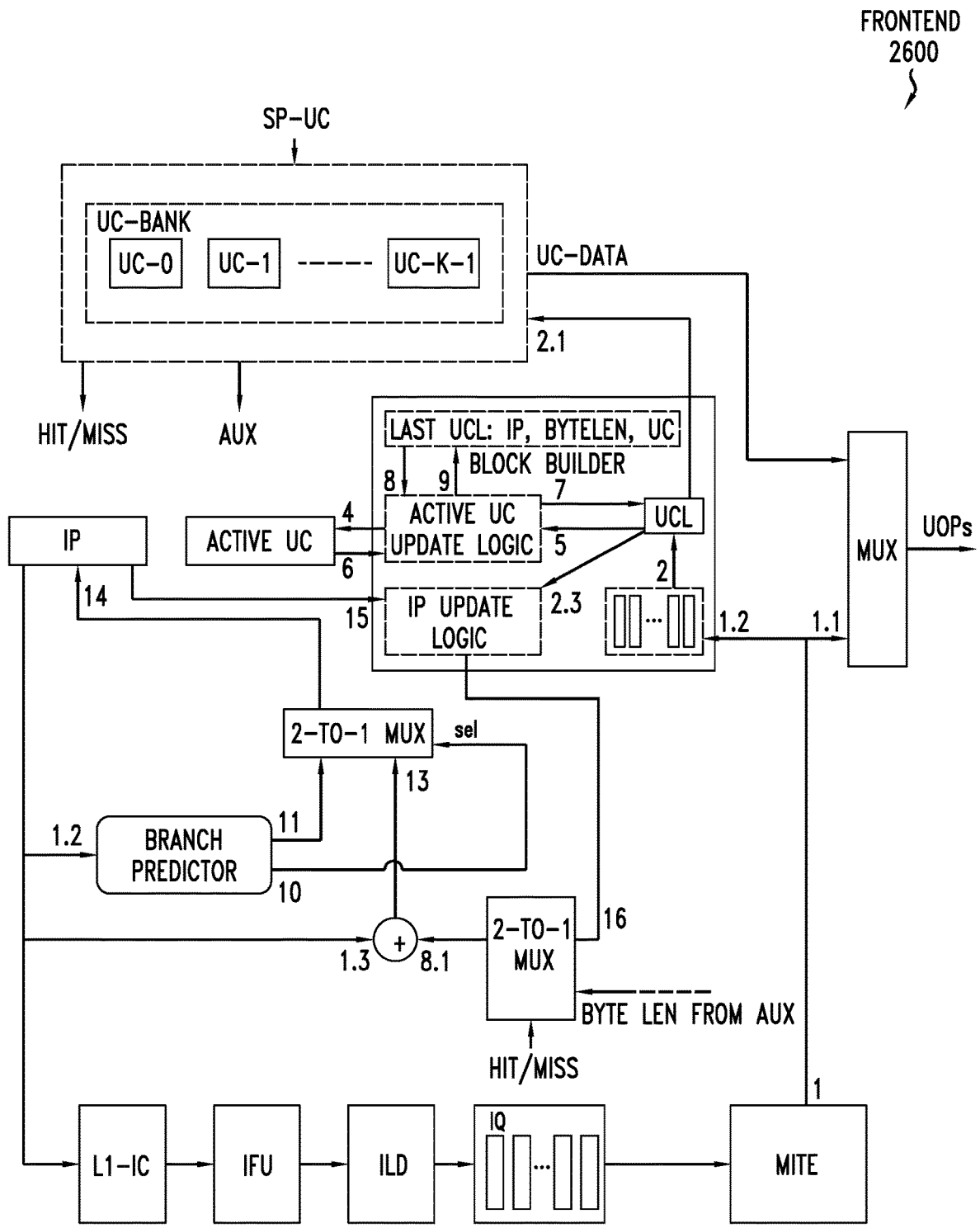
FIG. 26 depicts an example embodiment of a frontend of a processor, illustrating a split programmable micro-operations cache in conjunction with an IC, that is configured to operate in a build mode.

Referring again to FIG. 25, in the SP-UC of FIG. 25, UC lookup may perform a UC-Tag lookup in a first cycle and, if there is a miss in the first cycle, may perform fetching and decoding of instructions through the path L1-IC→IFU→ILD→IQ→MITE and storing them to SP-UC in parallel to supply to IDQ. As discussed further below, these operations may be further understood by considering an example embodiment of the SP-UC of FIG. 25 in conjunction with an IC of a frontend of a processor that is configured to operate in build-mode, as depicted in FIG. 26. It will be appreciated that FIG. 26 may be considered to be a generalized view of FIG. 25, illustrating only the components and signal flows used in build-mode.

In FIG. 26, a block builder is configured to observe the decoded UOPs output from MITE and build UC lines for storage in the SP-UC. In this way, if program flow returns to the IP that caused the miss at the SP-UC, the IP will cause a hit instead. The process, which may be a single-cycle or multi-cycle process, involves the following steps described below (which, it will be appreciated, describe the signal flow across the frontend of FIG. 26):

1. While the decoded UOPs from MITE are supplied towards backend (1.1), in parallel the UOPs are also sent to the UC fill buffer in Block Builder (1.2).

2. In Block Builder, UOPs from consecutive instructions are packed together to fill a UC Line. After the UC Line is built (2), it is prepared to be stored in the SP-UC.

3. The {IP, ByteLen} of the UCL is sent to IP update logic (2.3). The IP update logic reads the IP register (15) to check if the IP of the UC line (2.3) is same as from 15, which is the IP that was miss in UC earlier. If not same, then the UC line is discarded.

4. Before the UC line is stored in SP-UC, it determines the active UC where it should be stored and accordingly update Active UC Register. This determination is made by the Active UC Update Logic, which is performed as follows:

4.1. From the last UC line that was stored into SP-UC, it recorded the tuple {IP, ByteLen, UC-Switch-Info} into a local register. This register is read (8) to complete the steps till 4.4. If UC-Switch-Info is not valid (i.e., Valid-bit is set to 0) then go to step 4.5.

4.2 If the UC-Switch-Info contains B-bit as set to 0, then check if IP+ByteLen (of the previous UC line) equals the IP of the current UC line.

4.2.1. If yes, then that means that the current UC line contains the subsequent UOPs in the sequence, which are to be stored in the UC specified by UC-index in UC-Switch-Info. Then go to step 4.4.

4.2.2. If no, then go to step 4.5.

4.3. If the UC-Switch-Info contains B-bit as set to 1, then check if IP+ByteLen (of the previous UC line) is not equal to the IP of current UC line.

4.3.1. If yes, then that means that the current UC line is the start of the control block to which branch is taken, which is stored in the UC specified by UC-index in UC-Switch-Info. Then go to step 4.4.

4.3.2. If no, then go to step 4.5.

4.4. Update value in Active UC Register with the UC index (4) from UC-Switch-Info. Return that UC index from the stored UC-Switch-Info in the local register as the active UC for the UC line (7). Go to step 4.6.

4.5. Read existing value in Active UC Register (6) and return that value as the active UC for the UC line (7).

4.6. From the current UC line, record the tuple {IP, ByteLen, UC-Switch-Info} into the local register (9). The local register would be referred again while executing step 4.1-4.4 for the next UC line.

5. UC line is now stored in the SP-UC (2.1).

6. While the UC line is stored in SP-UC (2.1), in parallel, the IP Update Logic sends the UC line's Byte Len (16) to compute the next IP in the sequence. Signal 16 is sent as input to a 2-to-1 MUX which takes the other input from the Byte Len of the "aux" output from SP-UC. The selector of the MUX is the Hit/Miss output from UC. In build mode, Hit/Miss sends a miss, so the MUX connects the signal from 16 as output (8.1). Rest of the signal flows for updating the next IP (using BPU and signal 8.1) is same as described in stream mode.

It will be appreciated that the numbering of the foregoing steps is provided for purposes of clarity in describing example embodiments and does not necessarily imply an order in which the steps are performed (e.g., at least some of the steps may be performed in a different order, at least some of the steps may be performed contemporaneously, or the like, as well as various combinations thereof).

It will be appreciated that, in the SP-UC micro-architecture of FIGS. 25 and 26, lookup in the SP-UC is performed in two clock cycles, i.e., in the same number of cycles as in the single UC micro-architecture of FIG. 6. The cycle time and power consumption of the SP-UC may be impacted by the surface area it consumes on the chip. An implementation of SP-UC may consider several approaches in organization of the UC-Bank, to provide comparable or even better power-performance characteristics than single UC micro-architecture. For example, in cases in the SP-UC is fabricated using the same density as of the single UC fabrication (e.g., a 22 nm semiconductor device fabrication node or the like), then an SP-UC with K number of UCs may consume equivalent surface area as that of the single UC case, which may be achieved by keeping the size of each UC in the SP-UC equal to or approximately equal to the size of the UC in the single UC case divided by the number of UCs (K). For example, where the SP-UC is fabricated using a technology of higher density than as in the single UC case, then the size of a UC within the SP-UC may be kept equivalent to or made greater than the size of the UC in the single UC case (e.g., using a 14 nm fabrication node, a 12 nm fabrication node, or the like).

It will be appreciated that a processor that is configured to support split programmability may be configured to support two modes of operation: (1) a unified mode in which the split programmability capabilities, although supported, are not used and (2) a split mode in which the split programmability capabilities are used. For example, in the case of an SP-UC, a processor that supports SP-UC may also support an option to operate the SP-UC as a single non-programmable UC. This provide backwards compatibility for programs that do not support use of split programmability capabilities (e.g., that do not support use of color switch instructions for virtualizing processor frontend resources). In the unified mode of operation, which may be set as the default mode in the processor for backward compatibility, the set of resources which might otherwise be shared and programmable may be bundled together to act as a non-programmable monolithic resource (e.g., in the case of an SP-UC, bundling the individual UCs in the bank of UCs of the SP-UC together to operate as a non-programmable monolithic UC). In the split mode of operation, which may be entered from the unified mode of operation where the unified mode of operation is the default mode, the set of resources are shareable and programmable using the Color Switch Instructions (e.g., in the case of an SP-UC, the individual UCs in the bank of UCs of the SP-UC are operated as a group to support sharing and programmability). The use of mode selection for switching between the unified mode and the split mode may be further understood by way of reference to FIG. 27.

Figure 27:
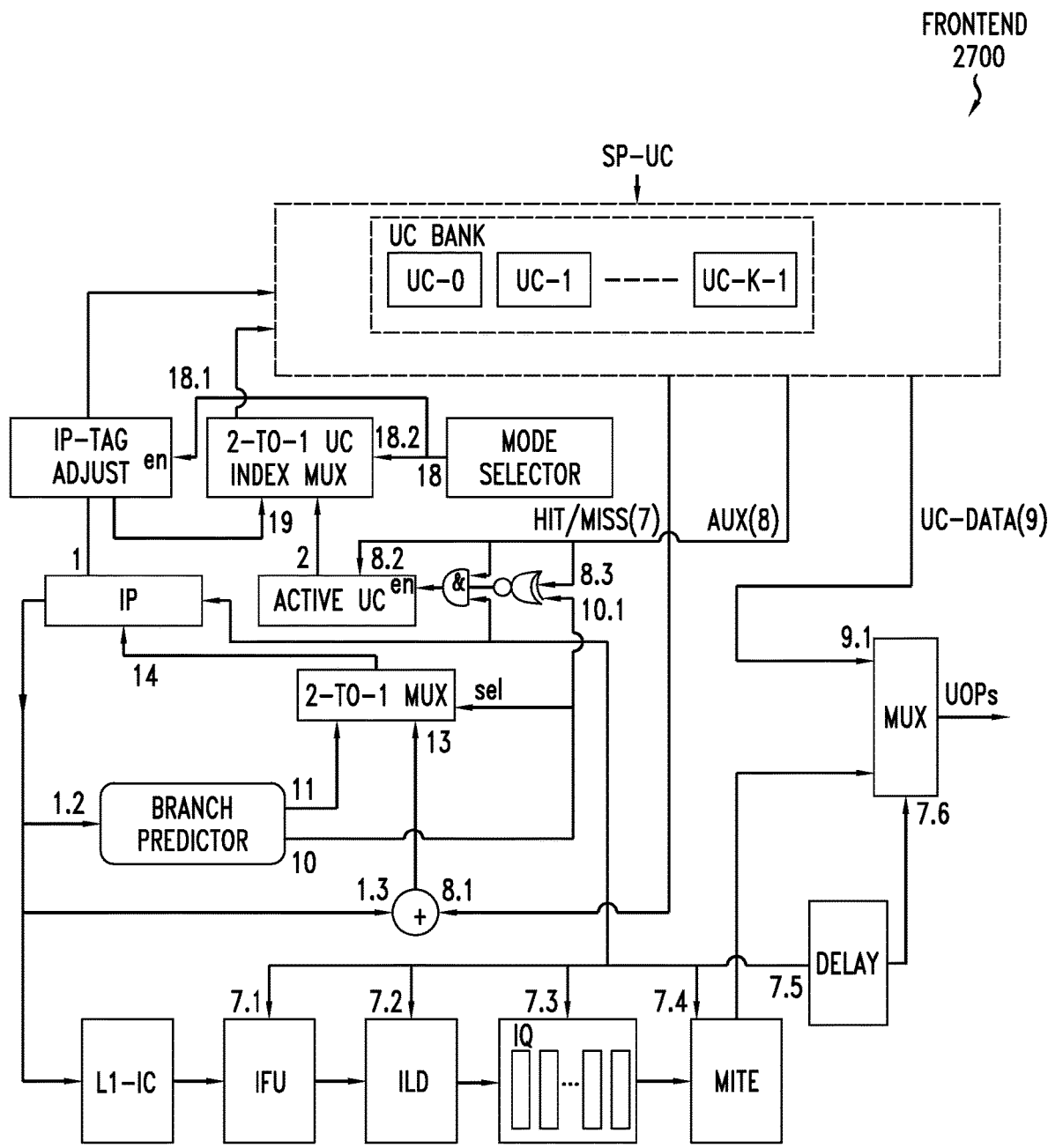
FIG. 27 depicts an example embodiment of a frontend of a processor, for illustrating a micro-architecture for implementation of a split programmable micro-operations cache, configured to support mode selection for switching between non-programmable and programmable modes of operation.

FIG. 27 depicts an example embodiment of a micro-architecture for implementation of a split programmable micro-operations cache in a processor configured to support mode selection for switching between non-programmable and programmable modes of operation. It will be appreciated that the micro-architecture of FIG. 27 is an extension of the micro-architecture of FIG. 25 including additional logic for mode selection, with details within the SP-UC being omitted for purposes of clarity. As depicted in frontend 2700 of FIG. 27, a register referred to as "Mode Selector" (18) is a register where the mode of operation of the SP-UC is set. For example, the value of the "Mode Selector" register may be set to 1 to indicate that the processor is to operate in split mode and set to 0 if the processor is to operate in unified mode (or vice versa, where 0 may be used for split mode and 1 may be used for unified mode). The setting of the "Mode Selector" register may be done through the BIOS setting of the computer system during boot time. The operation of the mode selection based on the "Mode Selector" register may be performed as follows.

The "Mode Selector" register, as indicated above, is configured to support operation of the processor in the unified mode. For purposes of describing operation of the processor in the unified mode, assume that each UC in SP-UC contains S sets and that each set has N ways. While operating in the unified mode, the SP-UC acts as a single UC with (S×K) sets where each set has N ways. For example, UC-0 contains the sets 0 to S−1, UC-1 contains sets S to 2S−1, and so on. To achieve this functionality, an IP is automatically mapped to a specific UC first, and then to a set within that UC. The UC is selected by stealing $\log_2(K)$ bits from the IP-Tag, i.e., the value of the stolen bits is the UC index. Then IP-index, IP-offset, and the remaining bits in IP-Tag are used to lookup the UC line within that UC as discussed with respect to FIG. 15. Extraction of those bits from IP-Tag is performed by the "IP-Tag Adjust" logic. This logic is enabled (en) by the input (18.1) from Mode Selector register (18). In the unified mode, the input (18.1) value is 1, so the logic gets enabled. The extracted $\log_2(K)$ bits are sent as input (19) to a "2-to-1 UC Index" MUX. This "2-to-1 UC Index" MUX takes the other input (2) from the Active UC Register. The "2-to-1 UC Index" MUX outputs either of the inputs based on the selector (18.2), which is fed from the Mode Selector Register (18). In the unified mode, the selector (18.2) value is 1, so the MUX outputs the input 19 that contains the stolen $\log_2(K)$ bits from IP-Tag.

The "Mode Selector" register, as indicated above, also is configured to support operation of the processor in the split mode. While operating in Split Mode, the Mode Selector (18) is set to value 0. So, the IP-Tag Adjust logic is disabled and entire bits in the IP-Tag are sent to the SP-UC. The selector (18.2) value to 2-to-1 UC Index MUX is 0, so the MUX outputs the input 2 from Active UC Register.

It will be appreciated that support for mode selection for switching between non-programmable and programmable modes of operation of a processor may be supported in other ways.

Figure 28:
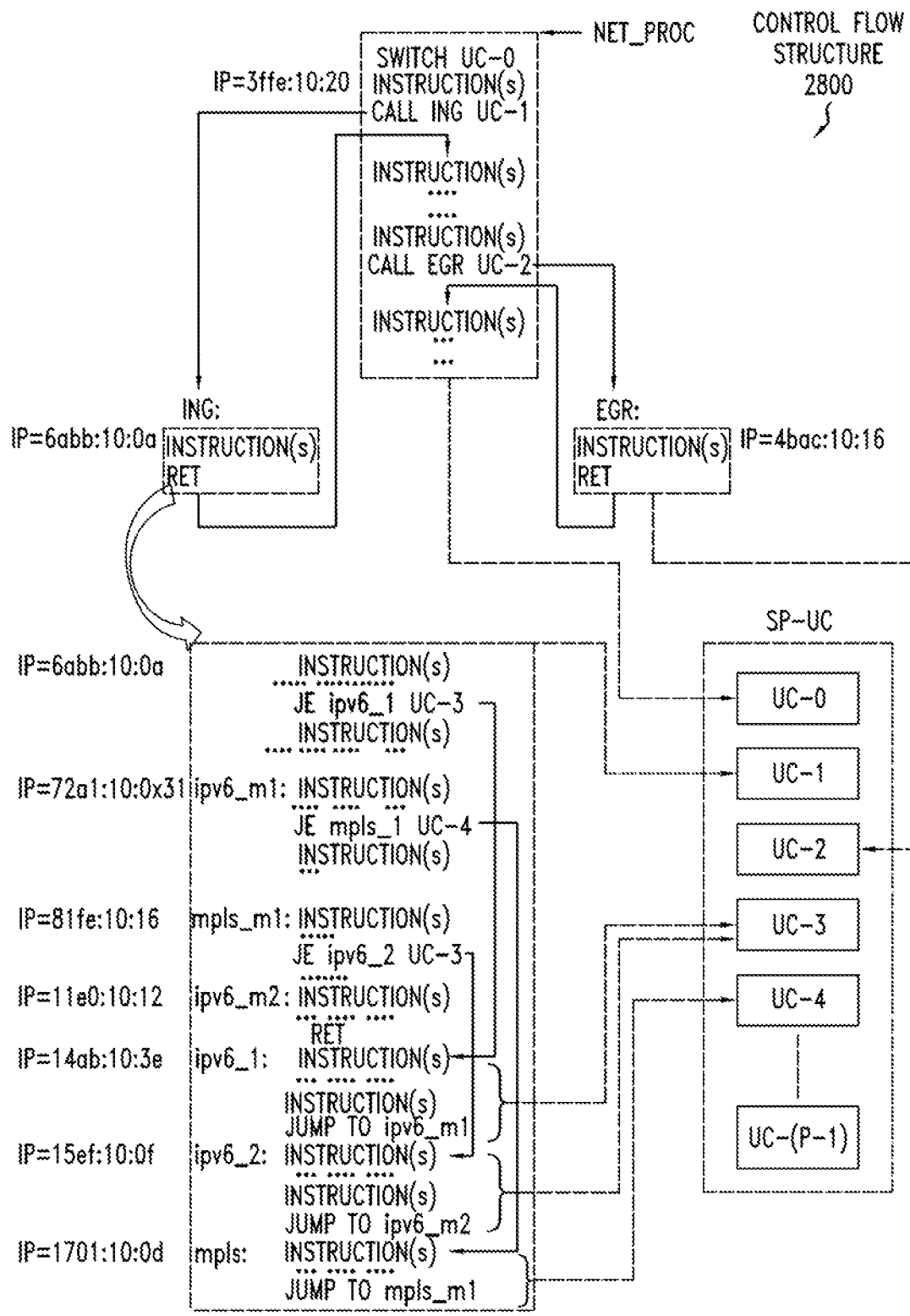
FIG. 28 depicts an example embodiment of the structure of the control flows and resultant control blocks for executing the network packet processing program of FIG. 15 using a split programmable micro-operations cache.

As discussed herein, processors may be used to support execution of programs for various purposes, such as general processing, network packet forwarding processing (e.g., NFV), graphics processing, and so forth. Various example embodiments for split programmability of UC resources of a frontend of a processor may be configured to support NFV. An example of a network packet processing program and associated control flow structure were presented herein with respect to FIGS. 15 and 16. An example embodiment illustrating execution of the network packet processing program 1500 of based on use of a processor having an SP-UC is presented with respect to FIG. 28. FIG. 28 depicts the structure of the control flows and resultant control blocks for executing the network packet processing program of FIG. 15 using a split programmable micro-operations cache. As depicted in the control flow structure 2800 of FIG. 28, the processor executes the instructions in NET_PROC. FIG. 28 also illustrates the UC pinning in the SP-UC. At the beginning of NET_PROC, UC-0 is set as the active UC by an exclusive UC switch instruction, illustrated as SWITCH UC-0 in FIG. 28. The intent is for all instructions in NET_PROC to be pinned to UC-0. When NET_PROC invokes subroutine ING with the instruction CALL ING UC-1, the CALL instruction is enhanced to perform the UC switch, wherein it encodes UC-1 as the active UC. So, all instructions in ING are pinned to UC-1. Upon completion of execution of ING, the RET instruction "automatically" switches the active UC to UC-0, i.e., to the UC that was active before the CALL ING UC-1. It is noted that the RET instruction is not encoded with a UC index, because a subroutine may be called from many different locations and each such called location may have its own pinned UC. So, when CALL instruction is invoked, it also pushes the pinned UC of the called context into the RAS and call stack. When RET is fetched it reads the pinned UC of the called context from the RAS and switches back the UC. Similarly, when NET_PROC invokes subroutine EGR with the instruction CALL EGR UC-2, all instructions within EGR are pinned to UC-2. Thus, the footprints of NET_PROC, ING, and EGR in the SP-UC are mutually exclusive working sets. Within ING, the all IPv6 related conditional control blocks, i.e., ipv6_1 and ipv6_2 are bundled as affinity group that is pinned to UC-3. As shown in FIG. 28, both of the control blocks are made spatially collocated by the program to eliminate conflict misses between them. In this context, the JE instruction is enhanced to perform the UC switch, wherein it encodes UC-3 as the active UC. At the completion of execution of a control block, the JUMP instruction switches the UC back to UC-1. In this context, the JUMP instruction is enhanced to perform the UC switch, wherein it encodes the UC-1 as next active UC. Similarly, the MPLS related control block, mpls_1, is pinned to UC-4. The IPv4 related processing is performed by the default execution sequence of ING (i.e., not IPv6 and not MPLS), which gets pinned to UC-1. Control blocks within EGR can be pinned in same way, i.e., the IPv6 control blocks are pinned in UC-3, the MPLS control blocks are pinned in UC-4, and so forth. Thus, the footprints of the IPv4, IPv6, and MPLS packet processing working sets are mutually exclusive in SP-UC.

Figure 29:
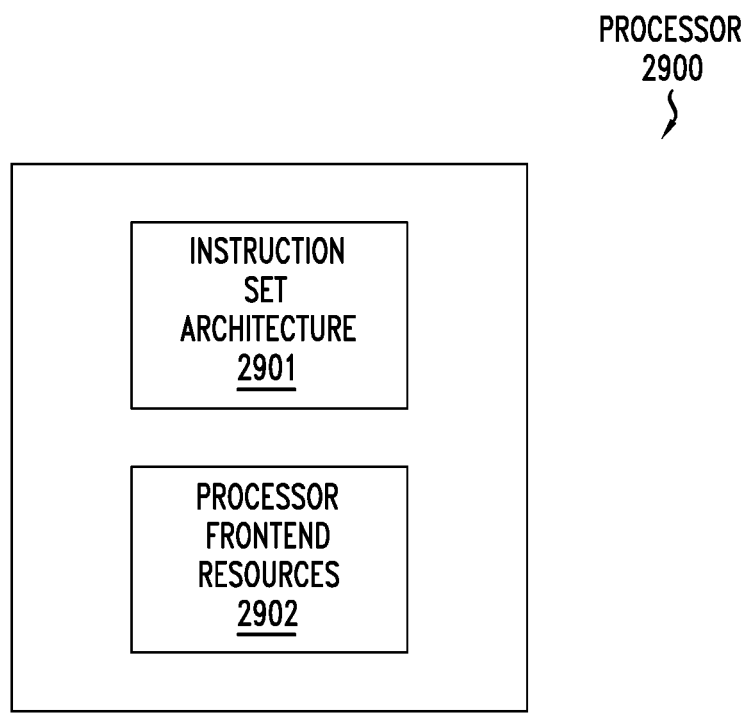
FIG. 29 depicts an example embodiment of a processor configured to support split programmability of processor frontend resources of the processor.

Various example embodiments of a processor are configured to support split programmability of processor frontend resources of the processor. A processor configured to support split programmability of processor frontend resources of the processor is presented with respect to FIG. 29. As depicted in FIG. 29, the processor 2900 includes an ISA 2901 and processor frontend resources 2902. The ISA 2901 is configured to support interaction between software on the processor 2900 and underlying hardware of the processor 2900. The ISA 2901 is configured to support split programmability of the processor frontend resources 2902 (e.g., based on use of various instructions, such as Color Switch instructions or the like). The processor frontend resources 2902 may include UC resources (e.g., thereby providing an SP-UC for the processor 2900), branch prediction unit resources (e.g., thereby providing an SP-BPU for the processor 2900), or the like, as well as various combinations thereof.

Various example embodiments of a processor, such as processor 2900 of FIG. 29, may be configured to support programmability of processor frontend resources of the processor. In at least some embodiments, a processor includes a backend, a frontend having frontend resources, and an instruction set architecture (ISA). The processor is configured to execute a program. The frontend is configured to decode instructions of the program to provide a set of micro-operations to the backend. The backend is configured to receive the micro-operations from the frontend and execute the micro-operations. The ISA is configured to support programmability of the set of frontend resources of the frontend by the program.

Various example embodiments of a processor, such as processor 2900 of FIG. 29, may be configured to support split programmability of UC resources of a processor by providing a processor including a set of at least two micro-operation caches configured to store micro-operations decoded from instructions of a program to be executed by the processor.

Various example embodiments of a processor, such as processor 2900 of FIG. 29, may be configured to support split programmability of UC resources of a processor by providing a processor including an instruction set architecture (ISA) configured to support programmability of a set of two or more UCs of the processor by a program executed by the processor. Various example embodiments of a processor, such as processor 2900 of FIG. 29, may be configured to support split programmability of a UC resources of a processor by providing a processor including a set of at least two UCs configured to store micro-operations decoded from instructions of a program to be executed by the processor and an ISA configured to support programmability of the set of two or more UCs of the processor by the program executed by the processor.

Figure 30:
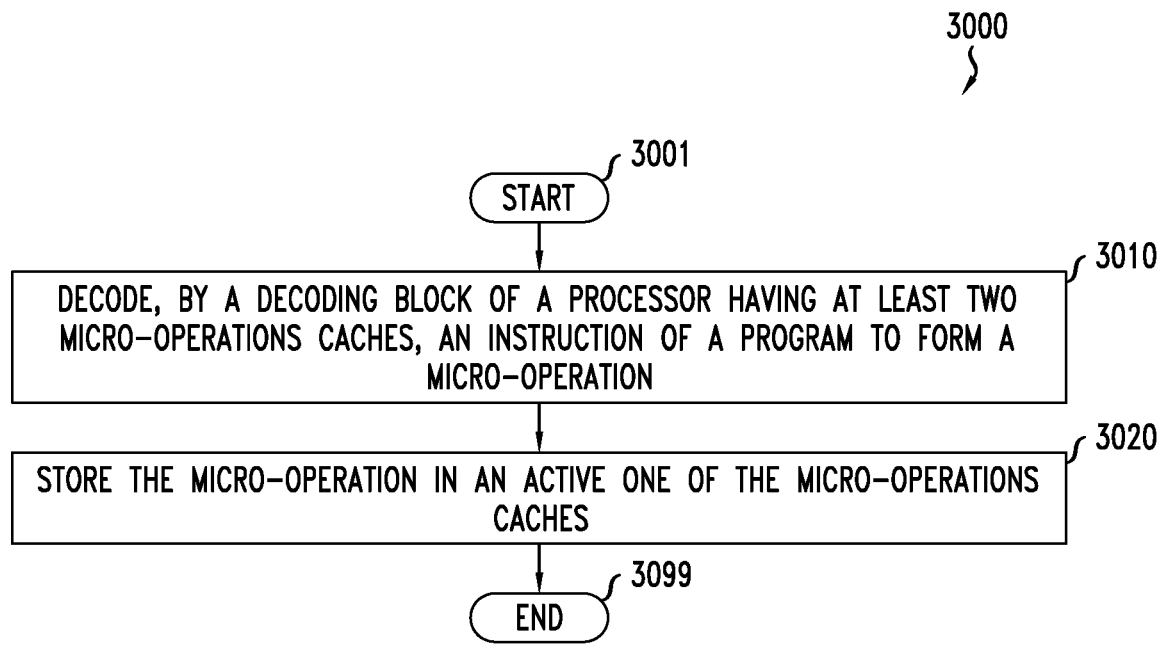
FIG. 30 depicts an example embodiment of a method for use by a processor to support programmability of micro-operations cache resources of a processor.

FIG. 30 depicts an example embodiment of a method for use by a processor to support programmability of micro-operations cache resources of a processor. It will be appreciated that, although primarily presented as being performed serially, at least a portion of the functions of method 3000 may be performed contemporaneously or in a different order than as presented with respect to FIG. 30. At block 3001, method 3000 begins. At block 3010, decode, by a decoding block of a processor having at least two micro-operations caches, an instruction of a program to form a micro-operation. At block 3020, store the micro-operation in an active one of the micro-operations caches. At block 3099, the method 3000 ends.

Figure 31:
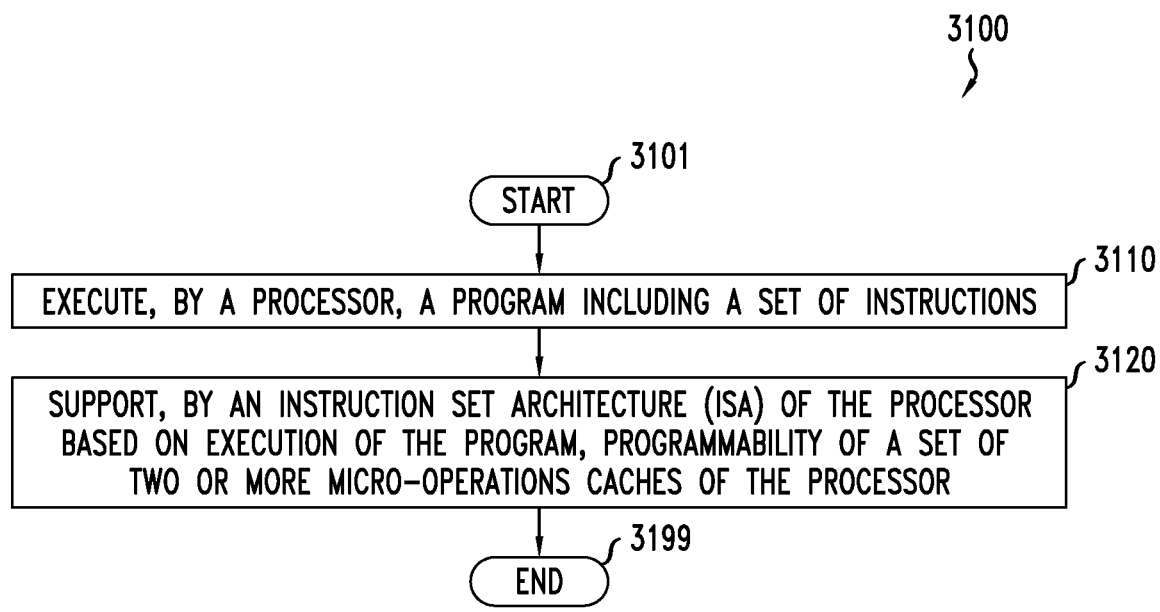
FIG. 31 depicts an example embodiment of a method for use by a processor to support programmability of micro-operations cache resources of a processor.

FIG. 31 depicts an example embodiment of a method for use by a processor to support programmability of micro-operations cache resources of a processor. It will be appreciated that, although primarily presented as being performed serially, at least a portion of the functions of method 3100 may be performed contemporaneously or in a different order than as presented with respect to FIG. 31. At block 3101, method 3100 begins. At block 3110, execute, by a processor, a program including a set of instructions. At block 3120, support, by an instruction set architecture (ISA) of the processor based on execution of the program, programmability of a set of two or more micro-operations caches of the processor. At block 3199, the method 3100 ends.

Figure 32:
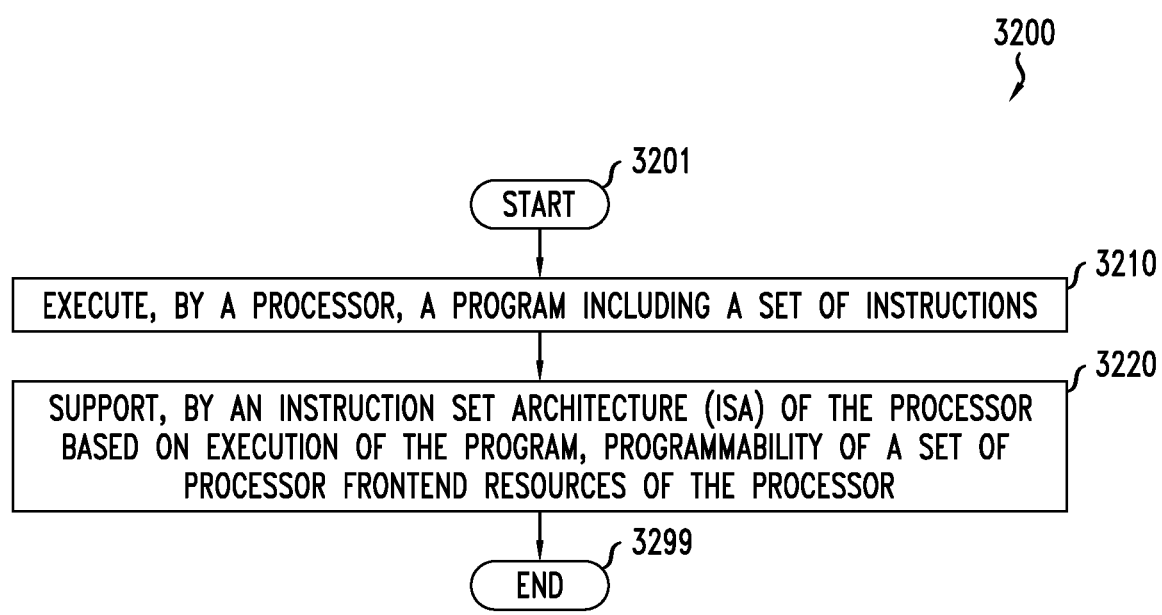
FIG. 32 depicts an example embodiment of a method for use by a processor to support programmability of processor frontend resources.

FIG. 32 depicts an example embodiment of a method for use by a processor to support programmability of processor frontend resources. It will be appreciated that, although primarily presented as being performed serially, at least a portion of the functions of method 3200 may be performed contemporaneously or in a different order than as presented with respect to FIG. 32. At block 3201, method 3200 begins. At block 3210, execute, by a processor, a program including a set of instructions. At block 3220, support, by an instruction set architecture (ISA) of the processor based on execution of the program, programmability of a set of processor frontend resources of the processor. At block 3299, the method 3200 ends.

It will be appreciated that, although primarily presented herein within the context of specific types of processors (e.g., CISC, superscalar, and so forth) supporting specific types of processor architectures (e.g., x86) and micro-architectures, various example embodiments presented herein may be provided within the context of various other types of processors (e.g., RISCs or the like), may be provided within the context of processors supporting various other processor architectures (e.g., ARM, MIPS, or the like), may be provided within the context of processors supporting various other processor microarchitectures, or the like, as well as various combinations thereof.

It will be appreciated that, although primarily presented herein within the context of processors described without reference to processor cores (e.g., single core processors), various example embodiments presented herein may be provided within the context of multi-core processors. It will be appreciated that, in at least some such multi-core processors, some or all of the processor cores may have a frontend and a backend, respectively. Accordingly, in at least some embodiments, references herein to "processor" may be considered to refer to individual "processor cores" of a multi-core processor (and, thus, support for split programmability of frontend resources of individual processor cores of a processor).

Various example embodiments for supporting split programmability of resources of a processor frontend of a processor may provide various advantages or potential advantages. For example, various example embodiments for supporting split programmability of resources of a processor frontend of a processor may improve throughput from the frontend of the processor to the backend of the processor. For example, various example embodiments for supporting split programmability of resources of a processor frontend of a processor may reduce or minimize power consumption by decoding circuitry of the frontend of the processor. For example, various example embodiments for supporting split programmability of resources of a processor frontend of a processor may support more stringent processor performance requirements. For example, various example embodiments for supporting split programmability of resources of a processor frontend of a processor may support improved or optimized packet throughput and power efficiency for processors implementing NFV solutions. Various example embodiments for supporting split programmability of resources of a processor frontend of a processor may provide various other advantages or potential advantages.

Figure 33:
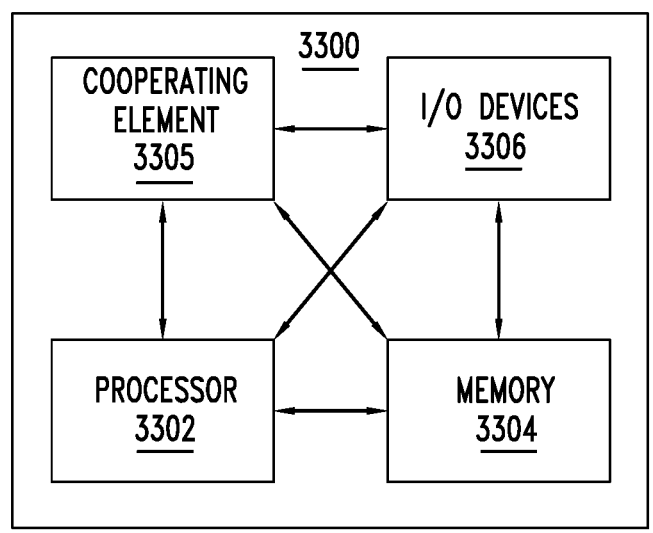
FIG. 33 depicts an example embodiment of a computer which may utilize various functions presented herein.

FIG. 33 depicts an example embodiment of a computer which may utilize various functions presented herein.

The computer 3300 includes a processor 3302 (e.g., a central processing unit, a processor, a processor having a set of processor cores, a processor core of a processor, or the like) and a memory 3304 (e.g., a random access memory, a read only memory, or the like). The processor 3302 and the memory 3304 may be communicatively connected.

The computer 3300 also may include a cooperating element 3305. The cooperating element 3305 may be a hardware device. The cooperating element 3305 may be a process that can be loaded into the memory 3304 and executed by the processor 3302 to implement functions as discussed herein (in which case, for example, the cooperating element 3305 (including associated data structures) can be stored on a non-transitory computer-readable storage medium, such as a storage device or other storage element (e.g., a magnetic drive, an optical drive, or the like)).

The computer 3300 also may include one or more input/output devices 3306. The input/output devices 3306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3300 may represent a general architecture and functionality suitable for implementing functional elements described herein, portions of functional elements described herein, or the like, as well as various combinations thereof. For example, computer 3300 may provide a general architecture and functionality that is suitable for implementing or using a processor as presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a processor including a set of at least two micro-operations caches configured to store micro-operations decoded from instructions of a program to be executed by the processor, wherein the processor is configured to operate using an active micro-operations cache selected from the set of at least two micro-operations caches;
   wherein the processor is configured to, based on a cache switch micro-operation formed based on decoding of a micro-operations cache switch instruction of the program, switch from selecting a first micro-operations cache of the set of at least two micro-operations caches as the active micro-operations cache for the processor to selecting a second micro-operations cache of the set of at least two micro-operations caches as the active micro-operations cache for the processor, wherein the micro-operations cache switch instruction of the program includes an identifier of the second micro-operations cache, wherein the cache switch micro-operation includes the identifier of the second micro-operations cache;
   wherein the processor is configured to, based on the decoding of the micro-operations cache switch instruction, store the cache switch micro-operation in a cache line of the first micro-operations cache and store micro-operations cache switch information in the first micro-operations cache as auxiliary data for the cache line, wherein the micro-operations cache switch information includes the identifier of the second micro-operations cache from the cache switch micro-operation; and
   wherein the processor is configured to, based on determination of the identifier of the second micro-operations cache from the micro-operations cache switch information during accessing of the cache switch micro-operation from the cache line of the first micro-operations cache, switch from selecting the first micro-operations cache as the active micro-operations cache for the processor to selecting the second micro-operations cache as the active micro-operations cache for the processor.

2. The apparatus according to claim 1, wherein the active micro-operations cache is used for storage of or access to micro-operations associated with instructions of the program executed while the active micro-operations cache is selected.

3. The apparatus according to claim 1, wherein the processor includes a set of instruction decoders, wherein, during decoding of one of the instructions of the program, the set of instruction decoders stores micro-operations to the active micro-operations cache.

4. The apparatus according to claim 1, wherein the processor is configured to perform a lookup operation in the active micro-operations cache while fetching an instruction pointer (IP) of an instruction of the program.

5. The apparatus according to claim 1, wherein the processor supports an instruction set architecture (ISA), wherein the micro-operations cache switch instruction is a dedicated switch instruction of the ISA or a modified version of an existing instruction of the ISA.

6. The apparatus according to claim 1, wherein selection of the second micro-operations cache to become the active micro-operations cache is done while fetching the micro-operations cache switch instruction of the program.

7. The apparatus according to claim 1, wherein selection of the second micro-operations cache to become the active micro-operations cache is done while fetching the micro-operations cache switch instruction of the program and before execution of the micro-operations cache switch instruction of the program.

8. The apparatus according to claim 1, wherein selection of the second micro-operations cache to become the active micro-operations cache is based on retrieval of the cache switch micro-operation from the first micro-operations cache.

9. The apparatus according to claim 1, wherein the cache switch micro-operation includes an index field encoding the identifier of the second micro-operations cache.

10. The apparatus of claim 9, wherein the cache switch micro-operation includes a field configured to provide an indication as to whether the active micro-operations cache is switched to the second micro-operations cache or whether the active micro-operations cache is switched to the second micro-operations cache only based on a determination that an execution sequence of the program is branching to a different control block after the cache switch micro-operation.

11. The apparatus of claim 1, wherein the micro-operations cache switch information includes:
    a field encoding the identifier of the second micro-operations cache selected to become the active micro-operations cache; and
    a field configured to indicate that the cache line includes the cache switch micro-operation.

12. The apparatus of claim 11, wherein the micro-operations cache switch information includes:
    a field configured to provide an indication as to whether the active micro-operations cache is switched to the second micro-operations cache or whether the active micro-operations cache is switched to the second micro-operations cache only based on a determination that an execution sequence of the program is branching to a different control block after the cache switch micro-operation.

13. A method, comprising:
    executing, by a processor including a set of at least two micro-operations caches configured to store micro-operations decoded from instructions of a program to be executed by the processor and configured to operate using an active micro-operations cache selected from the set of at least two micro-operations caches, the program, wherein the set of at least two micro-operations caches includes a first micro-operations cache and a second micro-operations cache;
    decoding, by the processor while the first micro-operations cache is selected as the active micro-operations cache for the processor, a micro-operations cache switch instruction of the program to form a cache switch micro-operation, wherein the micro-operations cache switch instruction of the program includes an identifier of the second micro-operations cache, wherein the cache switch micro-operation includes the identifier of the second micro-operations cache;

switching, by the processor based on the cache switch micro-operation formed based on the decoding of the micro-operations cache switch instruction, from selecting the first micro-operations cache as the active micro-operations cache for the processor to selecting the second micro-operations cache as the active micro-operations cache for the processor;

storing, by the processor based on the decoding of the micro-operations cache switch instruction, the cache switch micro-operation in a cache line of the first micro-operations cache and micro-operations cache switch information in the first micro-operations cache as auxiliary data for the cache line, wherein the micro-operations cache switch information includes the identifier of the second micro-operations cache from the cache switch micro-operation; and switching, by the processor based on determination of the identifier of the second micro-operations cache from the micro-operations cache switch information during accessing of the cache switch micro-operation from the cache line of the first micro-operations cache, from selecting the first micro-operations cache as the active micro-operations cache for the processor to selecting the second micro-operations cache as the active micro-operations cache for the processor.

14. An apparatus, comprising:
a processor configured to support an instruction set architecture (ISA) configured to support programmability of a set of at least two micro-operations caches of the processor by a program executed by the processor, wherein, to support programmability of the set of at least two micro-operations caches by the program, the ISA is configured to support a micro-operations cache switch instruction configured to control which of the at least two micro-operations caches is selected to become an active micro-operations cache for the processor;
wherein the processor is configured to, based on a cache switch micro-operation formed based on decoding of the micro-operations cache switch instruction, switch from selecting a first micro-operations cache of the set of at least two micro-operations caches as the active micro-operations cache for the processor to selecting a second micro-operations cache of the set of at least two micro-operations caches as the active micro-operations cache for the processor, wherein the micro-operations cache switch instruction of the program includes an identifier of the second micro-operations cache, wherein the cache switch micro-operation includes the identifier of the second micro-operations cache;
wherein the processor is configured to, based on the decoding of the micro-operations cache switch instruction, store the cache switch micro-operation in a cache line of the first micro-operations cache and store micro-operations cache switch information in the first micro-operations cache as auxiliary data for the cache line, wherein the micro-operations cache switch information includes the identifier of the second micro-operations cache from the cache switch micro-operation; and
wherein the processor is configured to, based on determination of the identifier of the second micro-operations cache from the micro-operations cache switch information during accessing of the cache switch micro-operation from the cache line of the first micro-operations cache, switch from selecting the first micro-operations cache as the active micro-operations cache for the processor to selecting the second micro-operations cache as the active micro-operations cache for the processor.

15. The apparatus according to claim 14, wherein, to support programmability of the set of at least two micro-operations caches by the program, the ISA is configured to support association of a control block of the program with the active micro-operations cache.

16. The apparatus according to claim 14, wherein, to support programmability of the set of at least two micro-operations caches by the program, the ISA is configured to support sharing of the active micro-operations cache by two or more control blocks of the program.

17. The apparatus according to claim 14, wherein the micro-operations cache switch instruction is configured exclusively for selection of ones of the at least two micro-operations caches to become the active micro-operations cache.

18. The apparatus according to claim 14, wherein, to support programmability of the set of at least two micro-operations caches by the program, the ISA is configured to support pinning of a control block of the program with the active micro-operations cache such that micro-operations decoded based on instructions of the control block are accessed from or stored in the active micro-operations cache.

19. An apparatus, comprising:
a processor including a backend, a frontend having a set of frontend resources, and an instruction set architecture (ISA), wherein the processor is configured to execute a program;
wherein the frontend is configured to decode instructions of the program to provide a set of micro-operations to the backend;
wherein the backend is configured to receive the micro-operations from the frontend and execute the micro-operations;
wherein the ISA is configured to support programmability of the set of frontend resources of the frontend by the program;
wherein, to support programmability of the set of frontend resources of the frontend by the program, the ISA is configured to support a micro-operations cache switch instruction configured to switch an active micro-operations cache of the processor from a first micro-operations cache of the processor to a second micro-operations cache of the processor based on inclusion of an identifier of the second micro-operations cache of the processor in the micro-operations cache switch instruction;
wherein, to support programmability of the set of frontend resources of the frontend by the program, the processor is configured to decode the micro-operations cache switch instruction to form a cache switch micro-operation including the identifier of the second micro-operations cache of the processor;
wherein, to support programmability of the set of frontend resources of the frontend by the program, the processor is configured to, based on the decoding of the micro-operations cache switch instruction, store the cache switch micro-operation in a cache line of the first micro-operations cache and store micro-operations cache switch information in the first micro-operations cache as auxiliary data for the cache line, wherein the micro-operations cache switch information includes the identifier of the second micro-operations cache from the cache switch micro-operation; and wherein, to support programmability of the set of frontend resources of the frontend by the program, the processor is configured to, based on determination of the identifier of the second micro-operations cache from the micro-operations cache switch information during accessing of the cache switch micro-operation from the cache line of the first micro-operations cache, switch from selecting the first micro-operations cache as the active micro-operations cache of the processor to selecting the second micro-operations cache as the active micro-operations cache of the processor.

* * * * *